(12) United States Patent
Ohta et al.

(10) Patent No.: US 7,602,679 B2
(45) Date of Patent: Oct. 13, 2009

(54) OPTICAL LENS AND INFORMATION RECORDING AND REPRODUCING DEVICE

(75) Inventors: Tatsuo Ohta, Otsuki (JP); Kunihiko Taka, Musashino (JP)

(73) Assignee: Konica Minolta Opto, Inc., Tokyo (JP)

( * ) Notice: Subject to any disclaimer, the term of this patent is extended or adjusted under 35 U.S.C. 154(b) by 1296 days.

(21) Appl. No.: 10/885,038

(22) Filed: Jul. 7, 2004

(65) Prior Publication Data
US 2005/0007934 A1    Jan. 13, 2005

(30) Foreign Application Priority Data
Jul. 11, 2003    (JP)    ............... 2003-195903

(51) Int. Cl.
*G11B 7/00*    (2006.01)
(52) U.S. Cl. ............... 369/44.23; 369/112.23
(58) Field of Classification Search ............ None
See application file for complete search history.

(56) References Cited

U.S. PATENT DOCUMENTS

| 5,473,594 | A | * | 12/1995 | Miyazawa | ............. | 369/112.03 |
| 6,388,822 | B1 | * | 5/2002 | Kitamura et al. | ............ | 359/793 |
| 6,819,498 | B1 | * | 11/2004 | Watanabe et al. | ........... | 359/656 |
| 2002/0191168 | A1 | * | 12/2002 | Ishizawa et al. | ............... | 355/53 |

\* cited by examiner

*Primary Examiner*—Muhammad N. Edun
(74) *Attorney, Agent, or Firm*—Finnegan, Henderson, Farabow, Garrett & Dunner, L.L.P.

(57) ABSTRACT

An optical lens to be arranged in an optical information recording and/or reproducing apparatus includes at least one lens main body; an antireflective film arranged on a first lens surface which has the largest surface angle on an outer peripheral portion in an effective radius of lens surfaces on the lens main body; wherein for a light entering perpendicularly to a central portion of the first lens surface whose central portion has a surface angle of 0 degree, a spectral reflectance of the antireflective film has one or more regions in which the spectral reflectance is continuously 4% or below and the wavelength includes at least a part of a wavelength region of 300 to 1000 nm, the broadest wavelength region of the one or more wavelength regions extends from wavelength $\lambda 1$ to wavelength $\lambda 2$ and the wavelength $\lambda 1$ is in a range of 348-460 nm.

37 Claims, 15 Drawing Sheets

5 (5B)

OPTICAL LENS AND INFORMATION RECORDING AND REPRODUCING DEVICE

BACKGROUND OF THE INVENTION

The present invention relates to an optical lens to be provided on an information recording and reproducing device capable of conducting at least one of recording of information on an optical recording medium and reproducing of information recorded on an optical recording medium, and to an information recording and reproducing device equipped with the optical lens.

There has been available an optical pickup device (an information recording and reproducing device) as a device to conduct recording of information on an optical recording medium and reproducing of information recorded on an optical recording medium. The optical pickup device is one that converges a ray of light emitted from a semiconductor laser light source on an information recording surface of an optical recording medium with an objective lens (optical lens), and thereby conducts recording and reproducing of information.

On this objective lens, there is provided an antireflection coating, for improving utilization efficiency of light. The antireflection coating is generally formed in a way that a thickness of the coating at a certain position becomes thinner as that position moves from the central portion of the objective lens to the outer peripheral portion thereof, and the layer thickness is established so that the reflectance of the objective lens for light entering vertically the objective lens at its central portion may show the minimum value for the wavelength of the laser beam of the optical pickup device. Namely, the layer thickness of the antireflection coating is set so that an amount of light passing through the central portion may become the greatest.

Incidentally, in the antireflection coating, it is known that the wavelength-dependency of the reflectance for light is shifted more toward the short wave side as an angle of incidence of light grows greater. In the objective lens, an angle of incidence of light grows greater as a position of the incidence moves from the central portion to the outer peripheral portion. In the conventional objective lens, therefore, the wavelength-dependency of the reflectance is more shifted to the short wavelength side than the wavelength-dependency of the reflectance at the central portion, resulting in that the wavelength which makes the reflectance of light entering the outer peripheral portion to be minimum was shorter than the wavelength that makes the reflectance of light entering the central portion to be minimum. Therefore, in the objective lens on which the conventional antireflection coating is provided, the reflectance for a laser beam at the outer peripheral portion is higher though the reflectance for a laser beam at the central portion is low, thus, an amount of light transmitted through the outer peripheral portion becomes smaller relatively than an amount of light transmitted through the central portion, resulting in problems of deterioration of spectral intensity of transmitted light of the total lens, an increase in a beam spot diameter caused by a fall of light-converging functions and of a decline of an amount of beams.

In recent years, there have been made attempts to diminish a diameter of a light beam spot, namely, to diminish a beam spot sufficiently with an objective lens, so that recording and reproducing of information by light may be conducted under the condition of high density recording, for realizing a large capacity of an optical recording medium. Since the beam spot diameter is in inverse proportion to a numerical aperture (NA: Numerical Aperture) of an objective lens, a technology for high NA of an objective lens has been advanced. Recently, a lens wherein an angle made between a normal line on a surface of an effective diameter of the lens and the optical axis is 45° or more, further, 55° or more has come to be used.

However, in the objective lens having high NA, an angle of incidence of light on an outer peripheral portion of the lens is extremely large, because a curvature of the lens surface is great. Therefore, an amount of light transmitted through the outer peripheral portion has been lowered sharply, resulting in problems that an increase in a spot diameter cannot be controlled, and realizing of a large capacity of an optical recording medium is disturbed.

As a technology to solve the problems stated above, there are disclosed technologies to increase an amount of light transmitted through the total lens by increasing an amount of light transmitted through the outer peripheral portions (for example, see Patent Documents 1-3).

(Patent Document 1)
TOKKAIHEI No. 10-160906
(Patent Document 2)
TOKKAIHEI No. 11-222446
(Patent Document 3)
TOKKAI No. 2001-6204

However, when increasing simply an amount of light transmitted through the outer peripheral portion by the technologies disclosed in the Patent Document 1-3, problems of deformation of a beam shape, deterioration of jitter characteristics and of an increase of cross talk are caused, and there has been a possibility of a decline of recording and reproducing functions. As stated above, it has been difficult to optimize a balance between light-converging functions and an amount of light.

In the case of an objective lens of an optical pickup device employing laser beams with two or more types of wavelengths, in particular, it has been extremely difficult to optimize a beam shape while increasing an amount of transmitted light for the rays of light covering all working wavelengths. Incidentally, as the optical pickup device of this kind, there are given an optical pickup device for DVD/CD employing light with wavelength 660 nm and light with wavelength 785 nm, for example, and an optical pickup device for high-density-optical-disc/DVD/CD employing light with wavelength 405 nm, light with wavelength 660 nm and light with wavelength 785 nm. The high density optical disc in this case means those, for example, a blue ray disc and AOD (Advanced Optical Disk).

SUMMARY

Taking the aforesaid problems into consideration, an object of the invention is to provide an optical lens wherein a diameter of a spot can be diminished and an amount of transmitted light can be secured under the well-balanced state, and to provide an information recording and reproducing device equipped with the aforesaid optical lens.

The structure described in Item 1 is an optical lens that is provided on an information recording and reproducing device capable of conducting at least one of recording of information on an optical recording medium and reproducing of information recorded on the optical recording medium and converges light emitted from the first laser light source with wavelength 390-420 nm on the optical recording medium, wherein at least one lens main body is provided, an antireflection coating is provided on the first lens surface where surface angle θ on the peripheral edge portion within an effective diameter is greatest among lens surfaces of the lens main body, the spectral reflectance of the antireflection coating is 4% or less within one or more wavelength areas that is continuous including at least a part within a range of 300-1000 nm, with respect to light entering vertically at the central portion of the first lens surface where surface angle θ is 0°, the broadest wavelength area among one or more wavelength areas has an extension from wavelength λ1 to λ2 and the wavelength λ1 is within a range of 348-460 nm.

The surface angle θ in this case means an angle made between a normal line at a certain position on the lens surface and an optical axis.

In the structure described in Item 1, the reflectance within a range from wavelength λ1 to wavelength λ2 is 4% or less on the central portion where an angle of incidence of light is small among the first lens surface. Therefore, the wavelength that makes the reflectance to be minimum (hereinafter referred to as reflection minimum wavelength) is longer than the wavelength λ1. Since the wavelength λ1 is in a range of 348-460 nm in this case, the reflection minimum wavelength tends to be longer than wavelength 390-420 nm of the first laser light source. On the other hand, in the outer peripheral portion occupying a large area in the first lens surface, the reflectance is minimum for the wavelength shorter than the reflection minimum wavelength, namely, for the wavelength close to wavelength of the first laser light source, because with an angle of incidence of light is great. Therefore, compared with the central portion, the outer peripheral portion transmits relatively more light with wavelength 390-420 nm, thus, compared with the past, a balance between an amount of light transmitted through the outer peripheral portion and an amount of light transmitted through the central portion is improved. Thereby, a diameter of a beam spot of light with wavelength 390-420 nm can be made small, and an amount of transmitted light can be increased.

The reason why the wavelength λ1 is made to be 348 nm or more in this case is that a shape of a spot is worsened, if the wavelength λ1 is smaller than 348 nm, because the transmittance of the central portion is higher than that of the outer peripheral portion, on the first lens surface, for light with wavelength 390-420 nm.

Further, the reason why the wavelength λ1 is made to be 460 nm or less in this case is that the transmittance for light with wavelength 390-420 nm, especially for light with wavelength 405 nm, goes down to be lower than 94%, if the wavelength λ1 is greater than 468 nm, which is not preferable from the viewpoint of practical use. Further reason is that an amount of transmitted light on the central portion of the first lens surface becomes extremely smaller than an amount of transmitted light on the outer peripheral portion, and a ripple-shaped light intensity unevenness is caused on the peripheral portion of a beam spot, which results in deterioration of jitter characteristics and an increase of cross talk.

DETAILED DESCRIPTION OF THE PREFERRED EMBODIMENT

Figure 1:
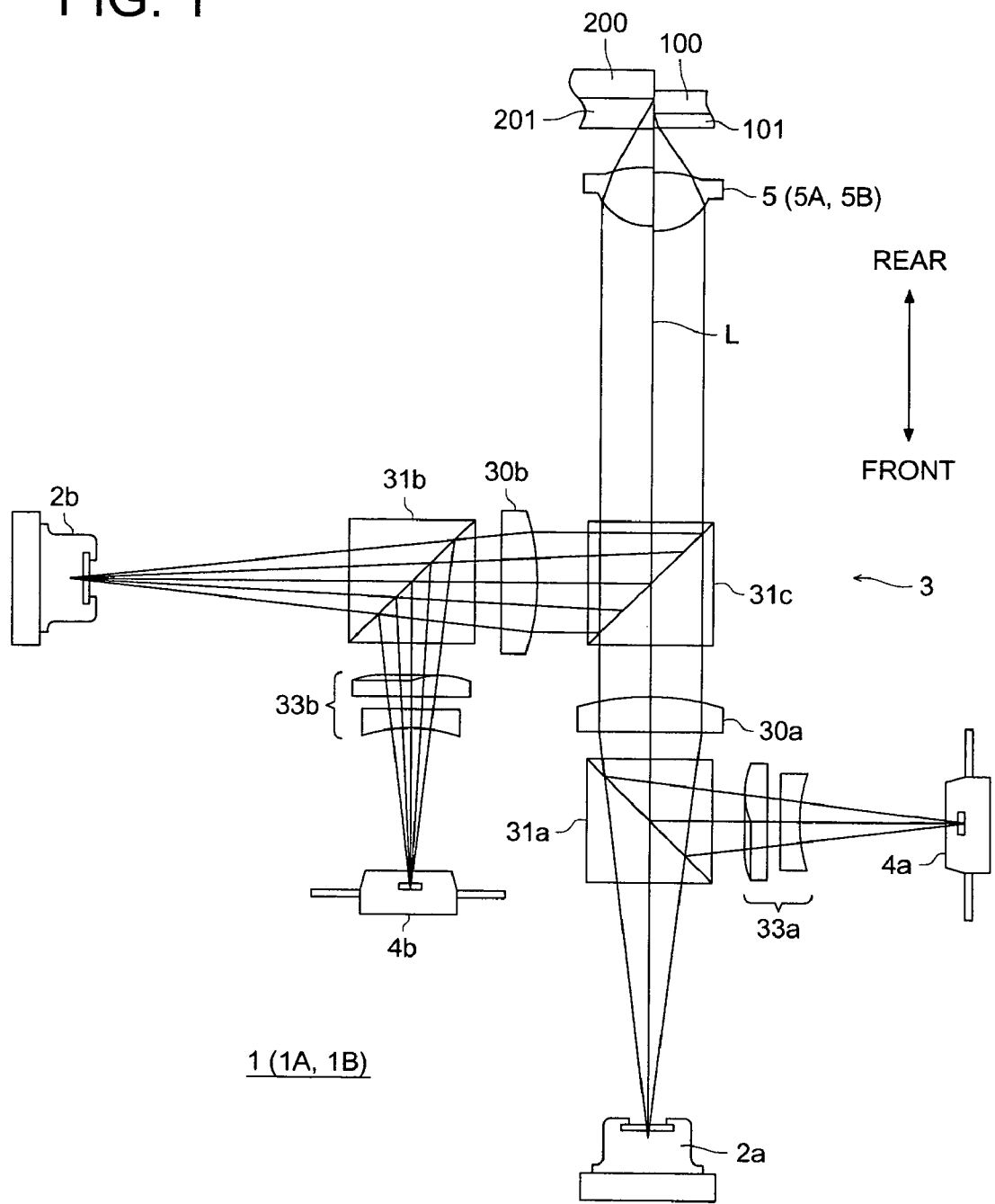
FIG. 1 is a diagram showing a schematic structure of an optical pickup device relating to the invention.

The preferred embodiment of the invention will be explained as follows.

The structure described in Item 2 is the optical lens described in Item 1 wherein the wavelength λ1 is in a range of 375-441 nm.

In the structure described in Item 2, a wavelength for which the reflectance is minimum on the outer peripheral portion of the first lens surface comes nearer to the wavelength of the first laser light source, because the wavelength λ1 is in a range of 375-441 nm. Therefore, it is possible to diminish the beam spot with wavelength 390-420 nm surely and to increase an amount of transmitted light surely.

The structure described in Item 3 is the optical lens described in Item 1 or Item 2 wherein the wavelength λ2 is 1.9×λ1 or more.

In the structure described in Item 3, the reflectance is 4% or less for the wavelength in the relatively broad bandwidth, because the wavelength λ2 is 1.9×λ1 or more. Therefore, it is possible to increase an amount of transmitted light with wavelength 390-420 nm surely, because reflection can be prevented for light with wavelength in a broad bandwidth.

The structure described in Item 4 is the optical lens described in any one of Item 1 - Item 3, wherein, when a plurality of layers included in the antireflection coating are given names of the $1^{st}$ layer-$n^{th}$ layer (n is a natural number of 2 and over) in the order wherein the layer farthest from the first lens surface comes first, the first layer is made of a material with low refractive index to be of the layer thickness of 81.2-113 nm, the second layer is made of a material with high refractive index to be of the layer thickness of 108.7-153 nm, the third layer is made of a material with medium refractive index to be of the layer thickness of 97.6-136 nm, the fourth layer is made of a material with low refractive index to be of the layer thickness of 21.6-30 nm, and the fifth layer is made of a material with medium refractive index to be of the layer thickness of 71.0-99 nm.

In the structure described in Item 4, it is possible to obtain the same effect as in the invention described in any one of Items 1-3.

The structure described in Item 5 is the optical lens described in any one of Item 1-Item 4, wherein, with respect to light that enters vertically the outer peripheral portion of the first lens surface whose surface angle $\theta$ is 45°, the spectral reflectance of the antireflection coating is not more than 4% within an area of continuous one or more wavelengths, the broadest wavelength area among areas of one or more wavelengths has an extension from wavelength $\lambda 1'$ to $\lambda 2'$ and the wavelength $\lambda 1'$ is within a range of 289-382 nm.

In the structure described in Item 5, the reflectance becomes minimum at the wavelength which is closer to the wavelength of the first laser light source, on the outer peripheral portion of the first lens surface, because the wavelength $\lambda 1'$ is within a range of 289-382 nm. Therefore, compared with the central portion, the outer peripheral portion transmits more light with wavelength 390-420 nm, thus, balance between an amount of transmitted light on the outer peripheral portion and an amount of transmitted light on the central portion is further improved, compared with that in the past.

Incidentally, on the outer peripheral portion of the first lens surface, it is preferable that a difference of the reflectance between P polarized light and S polarized light is small. Due to this, in the optical pickup device wherein a ¼ wavelength plate is provided on the optical lens to be closer to the laser light source, conversion from linearly polarized light to circularly polarized light and conversion from circularly polarized light to linearly polarized light are conducted substantially surely in the total area within an effective diameter. Further, even in the case of the optical pickup device wherein a ¼ wavelength plate is not provided and linearly polarized light enters the objective lens, a beam spot can be kept in an excellent form.

The structure described in Item 6 is an optical lens described in any one of Item 1-Item 5, wherein at least two lens main bodies are provided, an antireflection coating is provided on the first lens surface where surface angle $\theta$ on the peripheral edge portion within an effective diameter is greatest among lens surfaces of the lens main body, the spectral reflectance of the antireflection coating is 4% or less within one or more wavelength areas that is continuous including at least a part within a range of 300-1000 nm, with respect to light entering vertically at the central portion of the first lens surface where surface angle $\theta$ is 00, the broadest wavelength area among one or more wavelength areas has an extension from wavelength $\lambda 1$ to $\lambda 2$ and the wavelength $\lambda 1$ is within a range of 350-458 nm.

In the structure described in Item 6, the reflectance within a range from wavelength $\lambda 1$ to wavelength $\lambda 2$ is 4% or less on the central portion where an angle of incidence of light is small among the first lens surface. Therefore, the reflection minimum wavelength is longer than the wavelength $\lambda 1$. Since the wavelength $\lambda 1$ is in a range of 350-458 nm in this case, the reflection minimum wavelength tends to be longer than wavelength 390-420 nm of the first laser light source. On the other hand, in the outer peripheral portion occupying a large area in the first lens surface, the reflectance is minimum for the wavelength shorter than the reflection minimum wavelength, namely, for the wavelength close to wavelength of the first laser light source, because an angle of incidence of light is great.

Therefore, compared with the central portion, the outer peripheral portion transmits relatively more light with wavelength 390-420 nm, thus, compared with the past, a balance between an amount of light transmitted through the outer peripheral portion and an amount of light transmitted through the central portion is improved. Therefore, a beam spot of light with wavelength 390-420 nm can be made smaller in terms of a diameter and an amount of transmitted light can be increased.

The reason why the wavelength $\lambda 1$ is made to be 350 nm or more in this case is that a shape of a spot is worsened, if the wavelength $\lambda 1$ is smaller than 350 nm, because the transmittance of the central portion is higher than that of the outer peripheral portion, on the first lens surface, for light with wavelength 390-420 nm.

Further, the reason why the wavelength $\lambda 1$ is made to be 458 nm or less in this case is that the transmittance for light with wavelength 390-420 nm, especially for light with wavelength 405 nm, goes down to be lower than 94%, if the wavelength $\lambda 1$ is greater than 458 nm, which is not preferable from the viewpoint of practical use. Further reason is that an amount of transmitted light on the central portion of the first lens surface becomes extremely smaller than an amount of transmitted light on the outer peripheral portion, and a ripple-shaped light intensity unevenness is caused on the peripheral portion of a beam spot, which results in deterioration of jitter characteristics and an increase of cross talk.

The structure described in Item 7 is the optical lens described in Item 6 wherein the wavelength $\lambda 1$ is in a range of 375-440 nm.

In the structure described in Item 7, a wavelength for which the reflectance is minimum on the outer peripheral portion of the first lens surface comes nearer to the wavelength of the first laser light source, because the wavelength $\lambda 1$ is in a range of 375-440 nm.

Therefore, it is possible to diminish the beam spot with wavelength 390-420 nm surely and to increase an amount of transmitted light surely.

The structure described in Item 8 is the optical lens described in any one of Item 6 or Item 7 wherein the wavelength $\lambda 2$ is $2.04 \times \lambda 1$ or more.

In the structure described in Item 8, the reflectance is 4% or less for the wavelength in the relatively broad bandwidth, because the wavelength $\lambda 2$ is $2.04 \times \lambda 1$ or more. Therefore, it is possible to increase an amount of transmitted light with wavelength 390-420 nm surely, because reflection can be prevented for light with wavelength in a broad bandwidth.

The structure described in Item 9 is the optical lens described in any one of Item 6-Item 8, wherein, when a plurality of layers included in the antireflection coating are given names of the 1st layer-nth layer (n is a natural number of 2 and over) in the order wherein the layer farthest from the first lens surface comes first, the first layer is made of a material with low refractive index to be of the layer thickness of 91.6-122.2 nm, the second layer is made of a material with high refractive index to be of the layer thickness of 32.0-43.0 nm, the third layer is made of a material with low refractive index to be of the layer thickness of 37.5-50.0 nm, the fourth layer is made of a material with high refractive index to be of the layer thickness of 18.9-25.4 nm, and the fifth layer is made of a material with low refractive index to be of the layer thickness of 16.6-22.2 nm.

In the structure described in Item 9, it is possible to obtain the same effect as that of the structure described in either one of Item 6-Item 8.

The structure described in Item 10 is the optical lens described in any one of Item 6-Item 9, wherein, with respect to light that enters vertically the outer peripheral portion of the first lens surface whose surface angle θ is 45°, the spectral reflectance of the antireflection coating is not more than 4% within an area of continuous one or more wavelengths, the broadest wavelength area among areas of one or more wavelengths has an extension from wavelength $\lambda 1'$ to $\lambda 2'$ and the wavelength $\lambda 1'$ is within a range of 290-375 nm.

In the structure described in Item 10, the reflectance becomes minimum at the wavelength which is closer to the wavelength of the first laser light source, on the outer peripheral portion of the first lens surface, because the wavelength $\lambda 1'$ is within a range of 290-375 nm. Therefore, compared with the central portion, the outer peripheral portion transmits more light with wavelength 390-420 nm, thus, balance between an amount of transmitted light on the outer peripheral portion and an amount of transmitted light on the central portion is further improved, compared with that in the past.

The structure described in Item 11 is an optical lens described in any one of Item 1, wherein an antireflection coating is further provided on a second lens surface which is arranged on the opposite side of the first lens surface, the spectral reflectance of the antireflection coating is 4% or less within one or more wavelength areas that is continuous including at least a part within a range of 300-1000 nm, with respect to light entering vertically at the central portion of the second lens surface where surface angle θ is 0°, the broadest wavelength area among one or more wavelength areas has an extension from wavelength $\lambda 1$ to $\lambda 2$ and the wavelength $\lambda 1$ is within a range of 320-400 nm.

In the structure described in Item 11, the same effect as in the structure described in Item 1 can naturally be obtained, and a beam spot of light with wavelength 390-420 nm can surely be made smaller in terms of a diameter and an amount of transmitted light can surely be increased.

The structure described in Item 12 is the optical lens described in Item 11 wherein the wavelength $\lambda 1$ is in a range of 335-400 nm.

In the structure described in Item 12, it is possible to obtain the same effect as that of the structure described in Item 11.

The structure described in Item 13 is the optical lens described in any one of Items 11-12 wherein the wavelength $\lambda 2$ is $1.9 \times \lambda 1$ or more.

In the structure described in Item 13, it is possible to obtain the same effect as that of the structure described in either one of Item 11-Item 12.

The structure described in Item 14 is the optical lens described in any one of Item 11-Item 13, wherein, when a plurality of layers included in the antireflection coating are given names of the 1st layer-nth layer (n is a natural number of 2 and over) in the order wherein the layer farthest from the second lens surface comes first, the first layer is made of a material with low refractive index to be of the layer thickness of 74.0-95.6 nm, the second layer is made of a material with high refractive index to be of the layer thickness of 95.9-129.8 nm, the third layer is made of a material with medium refractive index to be of the layer thickness of 87.8-115.1 nm, the fourth layer is made of a material with low refractive index to be of the layer thickness of 19.7-25.4 nm, and the fifth layer is made of a material with medium refractive index to be of the layer thickness of 63.9-83.7 nm.

In the structure described in Item 14, it is possible to obtain the same effect as that of the structure described in either one of Item 11-Item 13.

The structure described in Item 15 is the optical lens described in any one of Item 11-Item 14, wherein, when a plurality of layers included in the antireflection coating are given names of the 1st layer-nth layer (n is a natural number of 2 and over) in the order wherein the layer farthest from the second lens surface comes first, the first layer is made of a material with low refractive index to be of the layer thickness of 91.6-122.2 nm, the second layer is made of a material with high refractive index to be of the layer thickness of 32.0-43.0 nm, the third layer is made of a material with low refractive index to be of the layer thickness of 37.5-50.0 nm, the fourth layer is made of a material with high refractive index to be of the layer thickness of 18.9-25.4 nm, and the fifth layer is made of a material with low refractive index to be of the layer thickness of 16.6-22.2 nm.

In the structure described in Item 15, it is possible to obtain the same effect as that of the structure described in either one of Item 11-Item 14.

The structure described in Item 16 is the optical lens described in Item 1, wherein, light emitted from the second laser light source with wavelength 630-680 nm is converged on an optical recording medium and the wavelength $\lambda 1$ is a range of 350-458 nm.

In the structure described in Item 16, light emitted from the first laser light source with wavelength 390-420 nm and light emitted from the second laser light source with wavelength 630-680 nm are converged respectively on optical recording media, and thereby, recording and reproducing of information can be conducted by using a high density optical disc and DVD. Therefore, it is possible to increase surely an amount of transmitted light with wavelength 390-420 nm, and to prevent reflection for light with plural wavelengths including those 630-680 nm.

The structure described in Item 17 is the optical lens described in Item 16 wherein the wavelength $\lambda 1$ is in a range of 373-458 nm.

In the structure described in Item 17, a wavelength for which the reflectance is minimum on the outer peripheral portion of the first lens surface comes nearer to the wavelength of the first laser light source, because the wavelength $\lambda 1$ is in a range of 373-458 nm. Therefore, it is possible to diminish the beam spot with wavelength 390-420 nm surely and to increase an amount of transmitted light surely.

The structure described in Item 18 is the optical lens described in Item 17 wherein the structure converges light emitted by the third light source having wavelength of 770-800 nm on light information recording medium.

In the structure described in Item 18, light emitted from the third laser light source with wavelength 770-800 nm is also converged on the optical recording medium, therefore, recording and reproducing of information can be conducted by further using CD. Further, it is possible to increase surely an amount of transmitted light with wavelength 390-420 nm, and to prevent reflection for light with plural wavelengths including those 630-680 nm or 770-800 nm.

The structure described in Item 19 is the optical lens described in any one of Item 16 or Item 17 wherein the wavelength $\lambda 2$ is $2.3 \times \lambda 1$ or more.

In the structure described in Item 19, the reflectance is 4% or less for the wavelength in the relatively broad bandwidth, because the wavelength λ2 is 2.3×λ1 or more. Therefore, it is possible to increase an amount of transmitted light with wavelength 390-420 nm or wavelength 630-680 nm surely, because reflection can be prevented for light with wavelength in a broad bandwidth.

The structure described in Item 20 is the optical lens described in any one of Item 16-Item 19, wherein, with respect to light that enters vertically the outer peripheral portion of the first lens surface whose surface angle θ is 45°, the spectral reflectance of the antireflection coating is not more than 4% within an area of continuous one or more wavelengths, the broadest wavelength area among areas of one or more wavelengths has an extension from wavelength λ1' to λ2' and the wavelength λ1' is within a range of 294-384 nm.

In the structure described in Item 20, the reflectance becomes minimum at the wavelength which is closer to the wavelength of the first laser light source, on the outer peripheral portion of the first lens surface, because the wavelength λ1' is within a range of 294-384 nm. Therefore, compared with the central portion, the outer peripheral portion transmits more light with wavelength 390-420 nm, thus, balance between an amount of transmitted light on the outer peripheral portion and an amount of transmitted light on the central portion is further improved, compared with that in the past.

The structure described in Item 21 is the optical lens described in any one of Item 16-Item 20 wherein, when a plurality of layers included in the antireflection coating are given names of the 1st layer-nth layer (n is a natural number of 2 and over) in the order wherein the layer farthest from the first lens surface comes first, the first layer is made of a material with low refractive index to be of the layer thickness of 93.3-126.5 nm, the second layer is made of a material with high refractive index to be of the layer thickness of 35.6-49.2 nm, the third layer is made of a material with low refractive index to be of the layer thickness of 18.5-25.1 nm, the fourth layer is made of a material with high refractive index to be of the layer thickness of 54.0-74.7 nm, the fifth layer is made of a material with low refractive index to be of the layer thickness of 29.0-39.4 nm, the sixth layer is made of a material with high refractive index to be of the layer thickness of 16.5-22.8 nm and the seventh layer is made of a material with low refractive index to be of the layer thickness of 18.0-24.4 nm.

In the structure described in Item 21, it is possible to obtain the same effect as that of the structure described in either one of Item 16-Item 20.

The structure described in Item 22 is an optical lens described in any one of Item 16-Item 21, wherein an antireflection coating is further provided on a second lens surface which is arranged on the opposite side of the first lens surface, the spectral reflectance of the antireflection coating is 4% or less within one or more wavelength areas that is continuous including at least a part within a range of 300-1000 nm, with respect to light entering vertically at the central portion of the second lens surface where surface angle θ is 0°, the broadest wavelength area among one or more wavelength areas has an extension from wavelength λ1 to λ2 and the wavelength λ1 is within a range of 350-430 nm.

In the structure described in Item 22, the same effect as in the structure described in any one of Item 16-Item 21 can naturally be obtained, an amount of transmitted light with wavelength 390-420 nm can surely be increased and reflection can be prevented for rays of light for plural wavelengths including wavelength 630-680 nm.

The structure described in Item 23 is the optical lens described in Item 22 wherein the wavelength λ1 is in a range of 360-400 nm.

In the structure described in Item 23, it is possible to obtain the same effect as that of the structure described in Item 22.

The structure described in Item 24 is the optical lens described in Item 23 wherein the structure converges light emitted by the third light source having wavelength of 770-800 nm on light information recording medium.

In the structure described in Item 24, light emitted from the third laser light source with wavelength 770-800 nm is also converged on the optical recording medium, therefore, recording and reproducing of information can be conducted by using further CD. Further, it is possible to increase surely an amount of transmitted light with wavelength 390-420 nm, and to prevent reflection for light with plural wavelengths including those 630-680 nm or 770-800 nm.

The structure described in Item 25 is the optical lens described in any one of Item 22 or Item 24 wherein the wavelength λ2 is 2.3×λ1 or more.

The structure described in Item 25 makes it possible to obtain the same effect as that of the structure described in either one of Item 22-Item 24.

The structure described in Item 26 is the optical lens described in any one of Item 22-Item 25, wherein, when a plurality of layers included in the antireflection coating are given names of the 1st layer-nth layer (n is a natural number of 2 and over) in the order wherein the layer farthest from the second lens surface comes first, the first layer is made of a material with low refractive index to be of the layer thickness of 93.3-118 nm, the second layer is made of a material with high refractive index to be of the layer thickness of 35.6-45.9 nm, the third layer is made of a material with low refractive index to be of the layer thickness of 18.5-23.4 nm, the fourth layer is made of a material with high refractive index to be of the layer thickness of 54.0-69.6 nm, the fifth layer is made of a material with low refractive index to be of the layer thickness of 29.0-36.8 nm, the sixth layer is made of a material with high refractive index to be of the layer thickness of 16.5-21.2 nm and the seventh layer is made of a material with low refractive index to be of the layer thickness of 18.0-22.8 nm.

The structure described in Item 26 makes it possible to obtain the same effect as that of the structure described in either one of Item 22-Item 25.

The structure described in Item 27 is an optical lens of Item 16, wherein at least two lens main bodies are provided, an antireflection coating is provided on the first lens surface where surface angle θ on the peripheral edge portion within an effective diameter is greatest among lens surfaces of the lens main body, the spectral reflectance of the antireflection coating is 4% or less within one or more wavelength areas that is continuous including at least a part within a range of 300-1000 nm, with respect to light entering vertically at the central portion of the first lens surface where surface angle θ is 0°, the broadest wavelength area among one or more wavelength areas has an extension from wavelength λ1 to λ2 and the wavelength λ1 is within a range of 360-458 nm.

The structure described in Item 27 makes it possible to obtain the same effect as that of the structure described in either one of Item 26.

The structure described in Item 28 is the optical lens described in Item 27 wherein the structure converges light emitted by the third light source having wavelength of 770-800 nm on light information recording medium.

In the structure described in Item 28, light emitted from the third laser light source with wavelength 770-800 nm is also converged on the optical recording medium, therefore, recording and reproducing of information can be conducted by using further CD. Further, it is possible to increase surely an amount of transmitted light with wavelength 390-420 nm, and to prevent reflection for light with plural wavelengths including those 630-680 nm or 770-800 nm.

The structure described in Item 29 is the optical lens described in Item 27 wherein the wavelength λ1 is in a range of 400-442 nm.

In the structure described in Item 29, a wavelength for which the reflectance is minimum on the outer peripheral portion of the first lens surface comes nearer to the wavelength of the first laser light source, because the wavelength λ1 is in a range of 400-442 nm. Therefore, it is possible to diminish the beam spot with wavelength 390-420 nm surely and to increase surely an amount of transmitted light.

The structure described in Item 30 is the optical lens described in any one of Item 27-Item 29 wherein the wavelength λ2 is 2.3×λ1 or more.

In the structure described in Item 30, the reflectance is 4% or less for the wavelength in the relatively broad bandwidth, because the wavelength λ2 is 2.3×λ1 or more. Therefore, it is possible to increase surely an amount of transmitted light with wavelength 390-420 nm, and to prevent reflection for light with plural wavelengths including those 630-680 nm.

The structure described in Item 31 is the optical lens described in any one of Item 27-Item 30, wherein, with respect to light that enters vertically the outer peripheral portion of the first lens surface whose surface angle θ is 45°, the spectral reflectance of the antireflection coating is not more than 4% within an area of continuous one or more wavelengths, the broadest wavelength area among areas of one or more wavelengths has an extension from wavelength λ1' to λ2' and the wavelength λ1' is within a range of 306-384 nm.

The structure described in Item 31 makes it possible to obtain the same effect as that of the structure described in either one of Item 27-Item 30.

The structure described in Item 32 is the optical lens described in any one of Item 27-Item 31, wherein, when a plurality of layers included in the antireflection coating are given names of the 1st layer-nth layer (n is a natural number of 2 and over) in the order wherein the layer farthest from the first lens surface comes first, the first layer is made of a material with low refractive index to be of the layer thickness of 97.5-126.5 nm, the second layer is made of a material with high refractive index to be of the layer thickness of 37.3-49.2 nm, the third layer is made of a material with low refractive index to be of the layer thickness of 19.3-25.1 nm, the fourth layer is made of a material with high refractive index to be of the layer thickness of 56.6-74.7 nm, the fifth layer is made of a material with low refractive index to be of the layer thickness of 30.3-39.4 nm, the sixth layer is made of a material with high refractive index to be of the layer thickness of 17.3-22.8 nm and the seventh layer is made of a material with low refractive index to be of the layer thickness of 18.8-24.4 nm.

In the structure described in Item 32, it is possible to obtain the same effect as that of the structure described in either one of Item 27-Item 31.

The structure described in Item 33 is an optical lens described in any one of Item 27, wherein an antireflection coating is further provided on a second lens surface which is arranged on the opposite side of the first lens surface, the spectral reflectance of the antireflection coating is 4% or less within one or more wavelength areas that is continuous including at least a part within a range of 300-1000 nm, with respect to light entering vertically at the central portion of the second lens surface where surface angle θ is 0°, the broadest wavelength area among one or more wavelength areas has an extension from wavelength λ1 to λ2 and the wavelength λ1 is within a range of 360-458 nm.

In the structure described in Item 33, the same effect as in the structure described in Item 27 can naturally be obtained, an amount of transmitted light with wavelength 390-420 nm can surely be increased and reflection can be prevented for rays of light for plural wavelengths including wavelength 630-680 nm or 770-800 nm.

The structure described in Item 34 is the optical lens described in Item 33 wherein the wavelength λ1 is in a range of 387-430 nm.

In the structure described in Item 34, it is possible to obtain the same effect as that of the structure described in either one of Item 33.

The structure described in Item 35 is the optical lens described in any one of Item 33 or Item 34 wherein the wavelength λ2 is 2.3×λ1 or more.

The structure described in Item 35 makes it possible to obtain the same effect as that of the structure described in either one of Item 33 or Item 34.

The structure described in Item 36 is the optical lens described in any one of Item 33-Item 35, wherein, when a plurality of layers included in the antireflection coating are given names of the 1st layer-nth layer (n is a natural number of 2 and over) in the order wherein the layer farthest from the second lens surface comes first, the first layer is made of a material with low refractive index to be of the layer thickness of 97.5-126.5 nm, the second layer is made of a material with high refractive index to be of the layer thickness of 37.3-49.2 nm, the third layer is made of a material with low refractive index to be of the layer thickness of 19.3-25.1 nm, the fourth layer is made of a material with high refractive index to be of the layer thickness of 56.6-74.7 nm, the fifth layer is made of a material with low refractive index to be of the layer thickness of 30.3-39.4 nm, the sixth layer is made of a material with high refractive index to be of the layer thickness of 17.3-22.8 nm and the seventh layer is made of a material with low refractive index to be of the layer thickness of 18.8-24.4 nm.

In the structure described in Item 36, it is possible to obtain the same effect as that of the structure described in either one of Item 33-Item 35.

The structure described in Item 37 is an information recording and reproducing device wherein a laser light source and the optical lens described in any one of Items 1-36 are provided, and light emitted from the laser light source is converged on an optical information recording medium by the optical lens, thus, at least one out of recording of information on the optical information recording medium and reproducing of information recorded on the optical information recording medium can be conducted.

In the structure described in Item 37, it is possible to obtain the same effect as that of the structure described in either one of Item 1-Item 36.

Referring to the drawings, embodiments of the present invention will be described below.

First Embodiment

Initially, an embodiment of the optical pick-up device according to the present invention will be described.

FIG. 1 is an outline structural view of an optical pick-up device 1.

As shown in the drawing, the optical pickup device 1 is provided with first laser light source 2a and second laser light source 2b.

The first laser light source 2a emits a first laser beam having wavelength lambda1 which satisfies 390 nm-420 nm, and the wavelength of the first lasar beam is 405 nm in the present embodiment.

The first laser beams are used for information recording on AOD 100 (optical recording medium) or reproducing information recorded on AOD 100. Incidentally, thickness t1 of protective base board 101 of AOD 100 satisfies 0.5-0.7 mm.

The second laser light source 2b emits a first laser beam having a wavelength which satisfies 630 nm-680 nm, and the wavelength of the second lasar beam is 650 nm in the present embodiment. The second laser beams are used for information recording on DVD 200 (optical recording medium) or reproducing information recorded on DVD 200. Incidentally, thickness of protective base board 201 of DVD 200 satisfies 0.5-0.7 mm.

The first and second laser beams emitted respectively from the first laser light source 2a and the second laser light source 2b are converged by light-converging optical system 3 respectively on AOD 100 and DVD 200.

The light converging optical system 3 has the first and second collimator lenses 30a and 30b, the first-third beam splitters 31a-31c, and an objective lens (optical lens) 5.

Each of the first and second collimator lenses 30a and 30b is arranged to make each of laser beams emitted respectively from the first laser light source 2a and the second laser light source 2b to be collimated light.

The beam splitter 31a is arranged to transmit a first laser beam emitted from the first laser light source 2a toward objective lens 5, and to guide a beam of light reflected on AOD 100, namely, returned light to the first photodetector 4a. A sensor lens group 33a is arranged between the beam splitter 31a and the first light detector 4a.

The beam splitter 31b is arranged to transmit a second laser beam emitted from the second laser light source 2b toward beam splitter 31c, and to guide a beam of light reflected on DVD 200 to the second photodetector 4b. A sensor lens group 33b is arranged between the beam splitter 31b and the second light detector 4b.

The beam splitter 31c is arranged to put both the first laser beam emitted from the first laser light source 2a and the second laser beam emitted from the second laser light source 2b on the same optical path.

Figure 2:
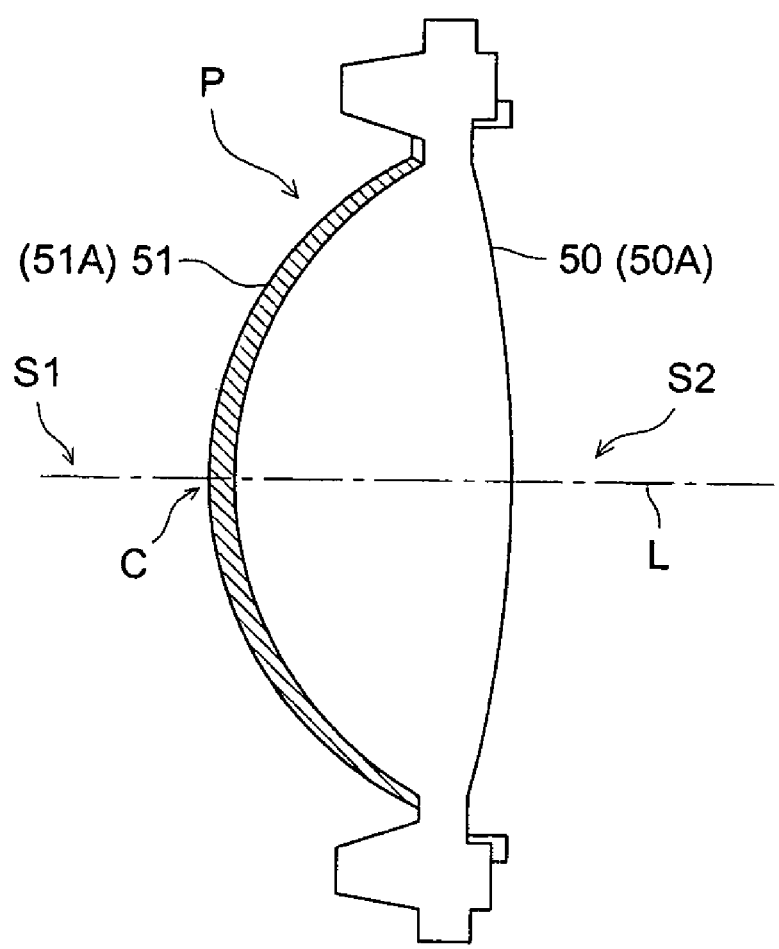
FIG. 2 is a longitudinal section showing an objective lens relating to the invention.

The objective lens 5 is, as shown in FIG. 2, provided with a lens main body (optical element main body) 50, and mounted on the second dimensional actuator (not shown) which can move in a predetermined direction.

A numerical aperture of the objective lens 5 is 0.65.

Lens main body 50 has lens surface S1 and lens surface S2, and the maximum surface angle θ on the outer peripheral edge portion within an effective diameter, in the other words, maximum surface angle is 66° on the lens surface S1 and 3° on the lens surface S2. The lens main body 50 is arranged under the condition that the lens surface S1 having the greater maximum surface angle among these lens surfaces S1 and S2 faces the first and second laser light sources 2a and 2b. Incidentally, in the present embodiment, an effective diameter of the lens surface S1 is 3.2 mm.

The lens main body 50 comprises a plastic material, a glass material or these complex, and is formed by injection molding of a plastic material and glass molding, polishing, cutting.

For a plastic material, for example, there is transparent resin material such as acryl resin, polycarbonate resin, polyolefin resin (ZEONEX resin made of Nippon Zeon company), and cyclic olefin copolymer resin. Further, for example, for a glass material, well-known optical glass such as M-BaCD5N (a brand name, a product made in HOYA Co., Ltd.) is used.

Antireflection coating (antireflective film) 51 having antireflection function is arranged on the lens surface S1 for the first laser beam and the second laser beam.

The spectral reflectance of antireflection coating 51 is 4% or less within one or more wavelength areas that is continuous including at least a part within a range of 300-1000 nm, with respect to light entering vertically at the central portion of the first lens surface where surface angle θ is 0°, the broadest wavelength area among one or more wavelength areas has an extension from wavelength λ1 to λ2 and the wavelength λ1 is within a range of 348-460 nm, preferably 375-441 nm and the wavelength λ2 becomes λ1×1.9 or more.

Moreover, with respect to light that enters vertically the outer peripheral portion of the first lens surface whose surface angle θ is 45°, the spectral reflectance of antireflection coat 51 is not more than 4% within an area of continuous one or more wavelengths, the broadest wavelength area among areas of one or more wavelengths has an extension from wavelength λ1' to λ2' and the wavelength λ1' is within a range of 289-382 nm, preferably 312-366 nm. Further the wavelength λ1' is a range of 289-382 nm, and preferably is in a range of 312-366 nm.

By these, in a central portion of the lens surface S1 where an incident angle of light is very small, a wavelength having local minimum reflectance, that is, reflection minimum wavelength becomes longer than the wavelength 390-420 nm of a light from the first laser light source. Moreover, in a outer peripheral portion P of the lens surface S1 where an incident angle of light is large, reflection minimum wavelength becomes longer than the wavelength lambda' and shorter than the reflection minimum wavelength, that is, it is close to the wavelength 405 nm of a light from the first laser light source.

The antireflection coats 51 is made by laminating a plurality of layers are laminated. When a plurality of layers included in the antireflection coating are given names of the $1^{st}$ layer-nth layer (n is a natural number of 2 and over) in the order wherein the layer farthest from the first lens surface comes first, the first layer is made of a material with low refractive index to be of the layer thickness of 81.2-113 nm, the second layer is made of a material with high refractive index to be of the layer thickness of 108.7-153 nm, the third layer is made of a material with medium refractive index to be of the layer thickness of 97.6-136 nm, the fourth layer is made of a material with low refractive index to be of the layer thickness of 21.6-30 nm, and the fifth layer is made of a material with medium refractive index to be of the layer thickness of 71.0-99 nm.

Further, for example, as a high refractive index material, cerium oxide, titanium oxide, tantalum oxide, zirconia, oxidation aluminum, silicon nitride, oxygen component silicon nitride are given. As a middle refractive index material, for example, oxidation aluminum and yttrium oxide, lead fluoride, fluorination cerium are given. As a low index of refraction material, for example, silicon oxide, magnesium fluoride, fluorination aluminum, cryolite are given. Further a layer comprising single components may be composed by using one kind of these materials, and a layer comprising plural number of components may be composed by using a plural kind of these materials. When a plurality of material is used, a mixture of them is used for an evaporation material or these materials which are prepared separately are used for an evaporation materials at the same time.

It is preferable that such an antireflection coating 51 is laminated as layers using technique, for example, disclosed in above described Patent Document 1, and it may be laminated by conventionally known laminating technique such as vacuum evaporation method, sputter method, CVD method and atmospheric pressure plasma method (Tokkai No. 2001-100008 bulletin and Tokkai No. 2000-147209 bulletin).

In addition, a protective layer may be arranged on a surface of the antireflection coating 51 and it is not illustrated in FIG. 2. For a protective layer, for example, there is a water-repellant coating containing silicon or fluorine. By the protective layer with the water-repellency, dirt adhesion can be prevented. Furthermore, it is preferable to make the surface treatment layer such as an under-coating layer arranged between the lens main body 50 and the antireflective coating 51. As an under-coating layer, a layer made of the silicon oxide layer with a thickness from several nanometers to decades nanometers or a layer made of ultraviolet curing resin or heat curing resin may be given. By the under-coating layer, laminating process and mar proof of the antireflection coating can be enhanced.

Since the operations of optical pickup device 1 structured as stated above are known, detailed explanation for them will be omitted here, and the first laser beam emitted from the first laser light source 2a passes through the first beam splitter 31a, and then, is made to be collimated light in the first collimator lens 30a, to pass through the third beam splitter 31c.

Figure 3:
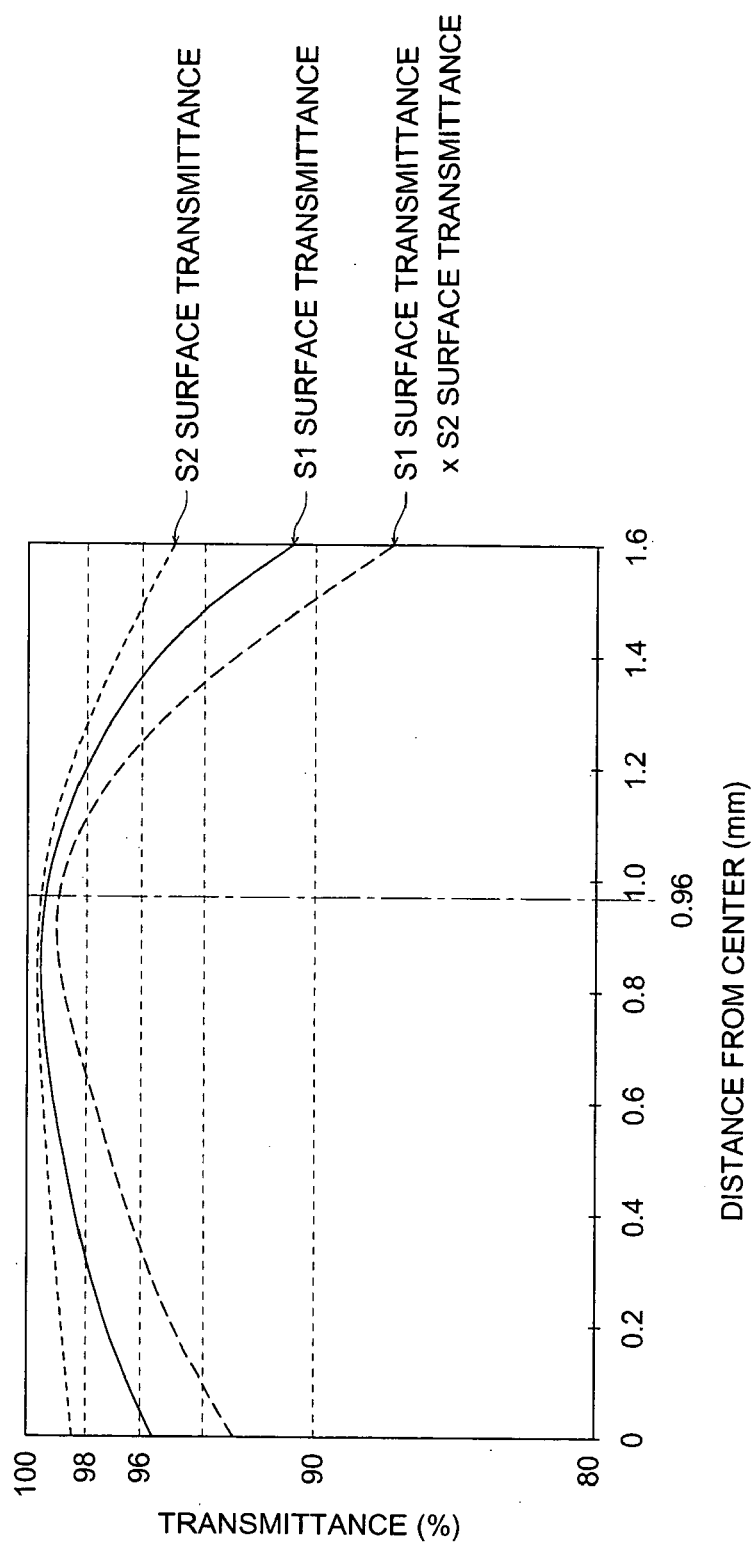
FIG. 3 is a diagram showing transmittance distribution on the lens surface.

Next, the first laser beam is converged by objective lens 5 on an information recording surface of AOD 100, and forms a spot on optical axis L. Because, in outer periphery potion occupying a large area in lens surface S1, the reflectance is minimum for the wavelength close to wavelength 405 nm of the first laser light source, because an angle of incidence of light is great, transmittance of the first laser beam in lens surface S1 becomes greatest on 0.5R-0.7R, preferably, 0.6R for the effective diameter R (=ϕ/2) of lens surface S1 as shown in FIG. 3. Therefore, compared with the central portion C of the lens surface S1, the outer peripheral portion P transmits relatively more light with for the first laser beam, thus, compared with the past, a balance between an amount of light transmitted through the outer peripheral portion P and an amount of light transmitted through the central portion C is improved and a shape of a spot becomes excellence. Herein, "CENTER" in FIG. 3 means an intersecting point with lens surface S1 and optical axis L.

Next, the first laser beam which has formed a spot is modulated on an information recording surface by information pits and is reflected to pass again through objective lens 5, third beam splitter 31c and first collimator lens 30a, to be reflected on the first beam splitter 31a to be branched.

Then, the first laser beam thus branched passes through sensor lens group 33a to enter the first photodetector 4a.

The first light detector 4a detects the spot of the incident light and outputs a signal, and the reading signal of the information recorded in AOD 100 is obtained by using the outputted signal.

Further, a shape change of the spot on the first light detector 4a, or a light amount change by the position change is detected, and the focusing detection or track detection is conducted. Based on results of the detections, the two-dimensional actuator makes the objective lens 5 to move in the focusing direction and the tracking direction so that the first laser beam may form a spot accurately on the information recording surface.

On the other hand, the second laser beam emitted from the second laser light source 2b passes through the second beam splitter 31b, and then, is made to be collimated light in the second collimator lens 30b, and is reflected on third beam splitter 31c to arrive at objective lens 5.

Next, the second laser beam is converged by objective lens 5 on an information recording surface of DVD 200, and forms a spot on optical axis L.

Next, the second laser beam which has formed a spot is modulated on an information recording surface by information pits and is reflected to pass again through objective lens 5, and is reflected on the third beam splitter 31c to be branched.

Then, the second laser beam thus branched passes through the second collimator lens 30b to be reflected on the second beam splitter 31b to be branched, and it enters the second photodector 4b after passing through sensor lens group 33a. After that, it follows the same way as in the case of the first laser beam.

By the above described optical pickup device 1, the balance between an amount of transmitted light on the outer peripheral portion P and an amount of transmitted light on the central portion C is improved. Therefore, a beam spot of light with wavelength 390-420 nm can be made smaller in terms of a diameter and an amount of transmitted light can be increased and can make transmitted light dosage increase.

Furthermore, it is possible to prevent reflection of various light including the second laser beam, because reflection can be prevented for light with wavelength in a relatively broad bandwidth.

Though the optical pickup device 1 has been explained as one to conduct recording and reproducing by using AOD 100 and DVD 200, it is possible to employ the one to conduct recording and reproducing by using AOD 100 individually.

Second Embodiment

Next, the second embodiment of the present invention will be described. Hereupon, the same component as in the above first embodiment is denoted by the same sign and the description will be neglected.

Optical pickup device 1A (1) in the present embodiment comprises objective lens 5A (5).

The objective lens 5A is, as shown in FIG. 2, provided with a lens main body 50A (optical element main body 50).

Lens main body 50A has lens surface S1 and lens surface S2, and the maximum surface angle of the lens surface S1 within an effective diameter is 55° and the maximum surface angle of the lens surface S1 is 50. The lens main body 50 is arranged under the condition that the lens surface S1 having the greater maximum surface angle among these lens surfaces S1 and S2 faces the first and second laser light sources 2a and 2b. Incidentally, in the present embodiment, an effective diameter of the lens surface S1 is 4 mm.

The antireflection coating 51A (51) is arranged on the lens surface S1.

Antireflection coating 51A are composed of seven layers and, the first layer that is farthest from the lens surface S1 is made of low refractive index material, the second layer is made of high refractive index material, the third layer is made of low refractive index material, the fourth layer is made of high refractive index material, the fifth layer is made of low refractive index material, the sixth layer is made of high refractive index material and the seventh layer is made of low refractive index material. With respect to a range of thickness of each of these layers, the range of 93.3-126.5 nm is for the first layer, the range of 35.6-49.2 nm is for the second layer, the range of 18.5-25.1 nm is for the third layer, the range of 54.0-74.7 nm is for the fourth layer, the range of 29.0-39.4 nm is for the fifth layer, the range of 16.5-22.8 nm is for the sixth layer and the range of 18.0-24.4 nm is for the seventh layer.

The spectral reflectance of antireflection coating 51A is 4% or less within one or more wavelength areas that is continuous including at least a part within a range of 300-1000 nm, with respect to light entering vertically at the central portion C of the lens surface S1 where surface angle θ is 0°, the broadest wavelength area among one or more wavelength areas has an extension from wavelength λ1 to λ2 and the wavelength λ1 is within a range of 350-458 nm and the wavelength λ2 becomes λ1×2.3 or more, preferably becomes λ1×2.35 or more.

Moreover, with respect to light that enters vertically the outer peripheral portion of the lens surface S1 whose surface angle θ is 45°, the spectral reflectance of antireflection coat 51A is not more than 4% within an area of continuous one or more wavelengths, the broadest wavelength area among areas of one or more wavelengths has an extension from wavelength λ1' to λ2' and the wavelength λ1' is within a range of 294-384 nm, preferably 317-384 nm.

Also in the optical pickup device 1A stated above, it is possible to obtain the same effect as in the optical pickup device 1.

Third Embodiment

Next, the third embodiment of the present invention will be described. Hereupon, the same component as in the above first embodiment is denoted by the same sign and the description will be neglected.

Optical pick-up device 1B (1) in this embodiment comprises objective lens 5B (5).

Figure 4:
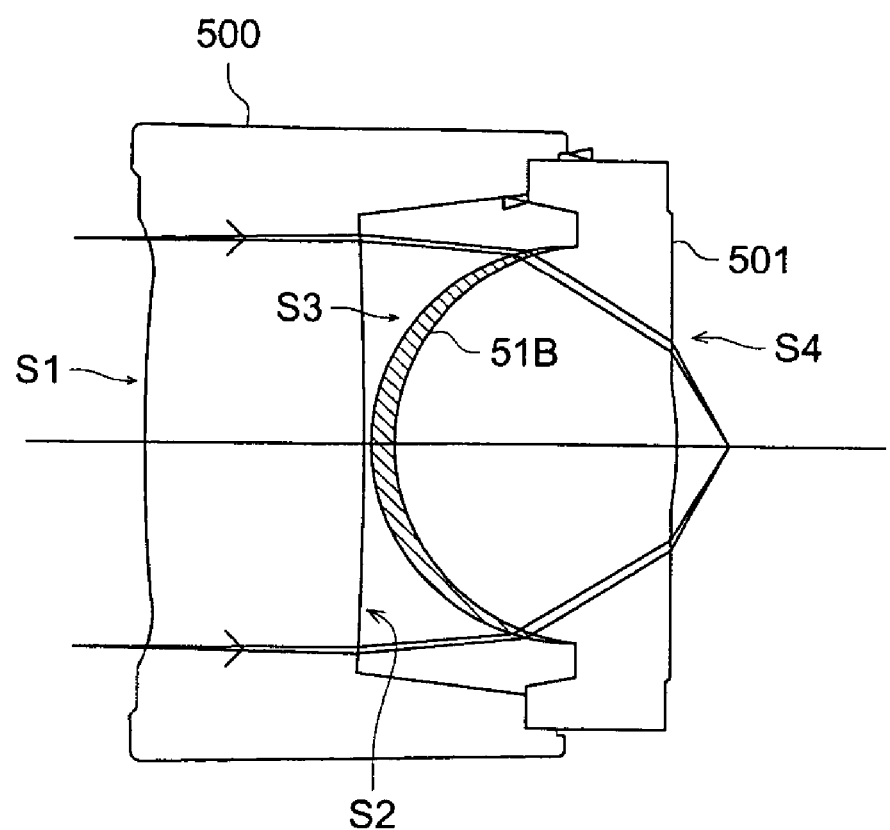
FIG. 4 is a diagram showing another embodiment of an objective lens relating to the invention.

Objective lens 5B comprises lens main body (the optical element main body) of the light incidence side 500 (50) and lens main body (the optical element main body) of the light entering side 501 (50) as shown in FIG. 4.

Lens main body 500 has lens surface S1 and lens surface S2, and the maximum surface angle of the lens surface S1 within an effective diameter is 12° and the maximum surface angle of the lens surface S1 is 5°. The lens main body 500 is arranged under the condition that the lens surface S1 having the greater maximum surface angle among these lens surfaces S1 and S2 faces the first and second laser light sources 2a and 2b. Incidentally, in the present embodiment, an effective diameter of the lens surface S1 is 3.8 mm.

Lens main body 501 has lens surface S3 and lens surface S4, and the maximum surface angle of the lens surface S3 within an effective diameter is 65° and the maximum surface angle of the lens surface S4 is 12°. The lens main body 501 is arranged under the condition that the lens surface S3 having the greater maximum surface angle among these lens surfaces S3 and S4 faces the first and second laser light sources 2a and 2b. Incidentally, in the present embodiment, effective diameters of the lens surfaces S3 and S4 are respectively 3.5 mm and 2.0 mm.

On the lens surface S3, there is provided antireflection coating 51B (51).

The antireflection coating 51B is composed of seven layers. Among these layers, the first layer that is farthest from the lens surface S3 is made of low refractive index material, the second layer is made of high refractive index material, the third layer is made of low refractive index material, the fourth layer is made of high refractive index material, the fifth layer is made of low refractive index material, the sixth layer is made of high refractive index material and the seventh layer is made of low refractive index material. With respect to a range of thickness of each of these layers, the range of 97.5-126.5 nm is for the first layer, the range of 37.3-49.2 nm is for the second layer, the range of 19.3-25.1 nm is for the third layer, the range of 56.6-74.7 nm is for the fourth layer, the range of 30.3-39.4 nm is for the fifth layer, the range of 17.3-22.8 nm is for the sixth layer and the range of 18.8-24.4 nm is for the seventh layer.

The spectral reflectance of antireflection coating 51B is 4% or less within one or more wavelength areas that is continuous including at least a part within a range of 300-1000 nm, with respect to light entering vertically at the central portion C of the lens surface S3 where surface angle θ is 0°, the broadest wavelength area among one or more wavelength areas has an extension from wavelength λ1 to λ2 and the wavelength λ1 is within a range of 360-458 nm, preferably 400-422 nm and the wavelength λ2 becomes λ1×2.3 or more, preferably becomes λ1×2.58 or more.

Moreover, with respect to light that enters vertically the outer peripheral portion of the lens surface S3 whose surface angle θ is 45°, the spectral reflectance of antireflection coat 51B is not more than 4% within an area of continuous one or more wavelengths, the broadest wavelength area among areas of one or more wavelengths has an extension from wavelength λ1' to λ2' and the wavelength λ1' is within a range of 306-384 nm, preferably 339-373 nm.

Hereupon, the above described embodiment describes that the antireflection coating 51B (51) comprises seven layers but it may comprises five layers. In this case, it is preferable that the layer farthest from the lens surface S3 comes first, the first layer is made of low refractive index material, the second layer is made of high refractive index material, the third layer is made of low refractive index material, the fourth layer is made of high refractive index material, the fifth layer is made of low refractive index material. With respect to a range of thickness of each of these layers, the range of 91.6-122.2 nm is for the first layer, the range of 32.0-43.0 nm is for the second layer, the range of 37.5-50.0 nm is for the third layer, the range of 18.9-25.4 nm is for the fourth layer, the range of 16.6-22.2 nm is for the fifth layer.

In this case, the spectral reflectance of antireflection coating 51B is 4% or less within one or more wavelength areas that is continuous including at least a part within a range of 300-1000 nm, with respect to light entering vertically at the central portion C of the lens surface S3 where surface angle θ is 00, the broadest wavelength area among one or more wavelength areas has an extension from wavelength λ1 to λ2 and the wavelength λ1 is within a range of 350-458 nm, preferably 375-440 nm and the wavelength λ2 becomes λ1×2.04 or more.

Moreover, with respect to light that enters vertically the outer peripheral portion of the lens surface S3 whose surface angle θ is 45°, the spectral reflectance of antireflection coat 51B is not more than 4% within an area of continuous one or more wavelengths, the broadest wavelength area among areas of one or more wavelengths has an extension from wavelength λ1' to λ2' and the wavelength λ1' is within a range of 290-375 nm, preferably 318-360 nm Also in the optical pickup device 1B stated above, it is possible to obtain the same effect as in the optical pickup device 1.

Figure 5:
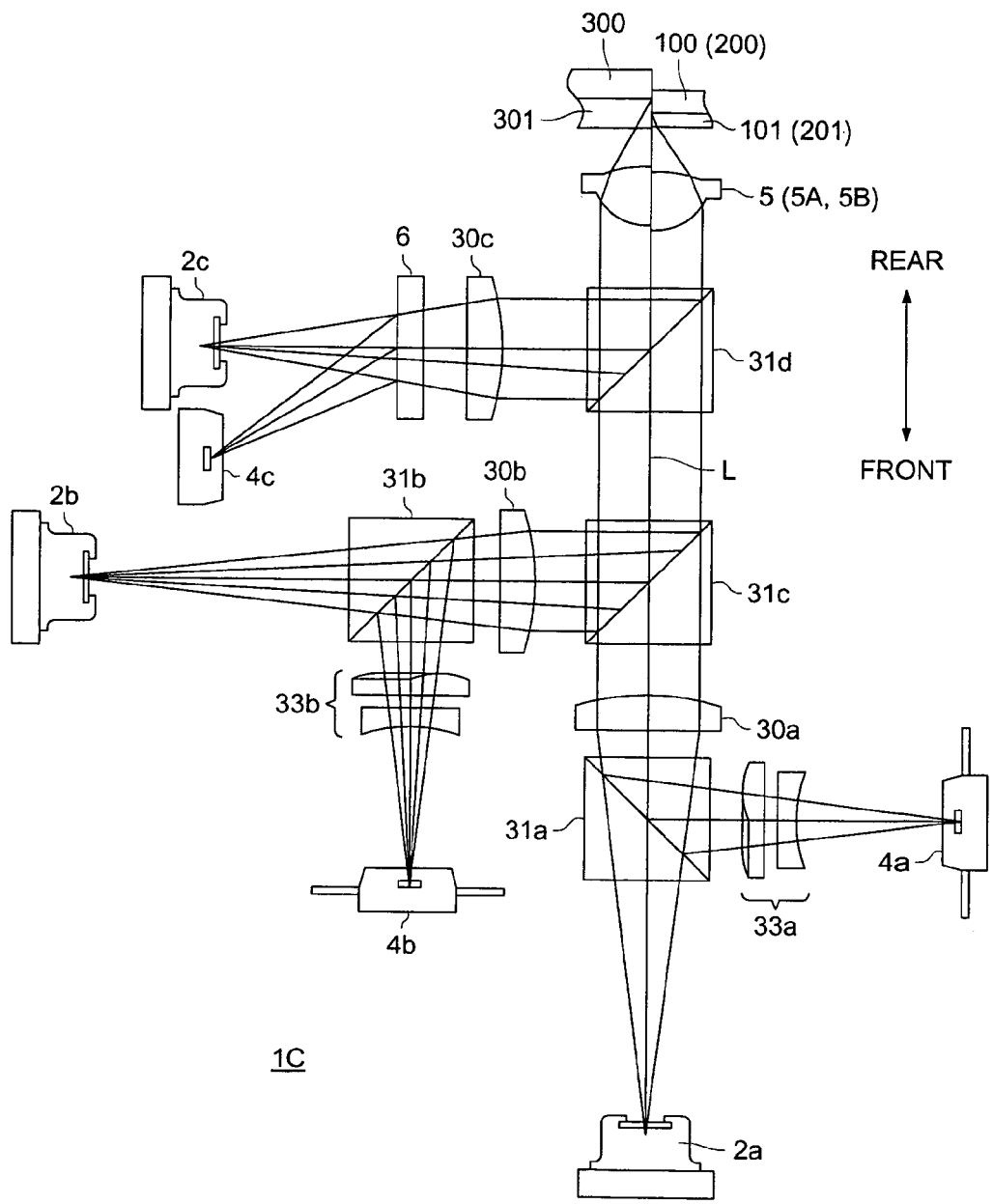
FIG. 5 is a diagram showing a schematic structure of another embodiment of an optical pickup device.

Though the optical pickup device 1 has been explained as one to conduct recording and reproducing by using AOD 100 and DVD 200, in the embodiment state above, it is further possible to employ the one to conduct recording and reproducing by using also CD like optical pickup device 1C shown in FIG. 5, without being limited to the optical pickup device 1. The optical pickup device 1C is equipped with third laser light source 2c emitting third laser beam with wavelength 750-850 nm, collimator lens 30c that collimates the third laser beam emitted from the third laser light source 2c, beam splitter 31d that makes the first-third laser beams to be on the same optical path and with diffractive plate 6 that leads reflected light from CD 300 to third optical detector 4c, which is different from the optical pickup device 1. It is also possible to obtain the same effect as in the aforementioned optical pickup device 1, even by the optical pickup device 1C of this kind.

Further, though the objective lens 5 is equipped with one or two lens main bodies in the explanation above, the objective lens 5 may further be equipped with three or more lens main bodies.

Though the laser beam represented by a linearly polarized light enters the objective lens 5 in the explanation above, any type of polarization may be used provided that recording or reproducing can be carried out, and a laser beam converted into a circularly polarized light by a ¼ wavelength plate, for example, may also enter.

Further, a numerical aperture of objective lens 5 may also be 0.85-0.90, although it was 0.65 in the aforesaid explanation. In this case, a blue ray disc having protective base board thickness 0.1 mm can be used in place of AOD 100 as an optical recording medium.

Though the antireflection coating 51 is provided only on lens surfaces S1 and S3 of the lens main body 50 in the explanation, it may also be provided on other lens surfaces.

An effective diameter and the maximum surface angle for each of lens surfaces S1, S2, S3 and S4 may also take other values.

Further, the optical lens may further be a beam shrinker or a beam expander, though it was objective lens 5 in the explanation.

EXAMPLES

The invention will be explained specifically as follows, referring to the examples to which, however, the invention is not limited.

1. Lens in First Embodiment (Evaluation of Transmittance of Lens and Spot Forms)

As objective lens 5 in the aforesaid First Embodiment, there were formed ones wherein antireflection coatings 51 having respectively layer structures shown in Table 1 are provided respectively on lens surfaces S1 and S2.

Incidentally, the numerical aperture of the objective lens 5 was made to be 0.6. The maximum value of surface angle θ of the lens surface S1 was made to be 53°. "OA-600" (trade name, made by Optron Inc.) in the drawing is a mixture of tantalum oxide and titanium oxide. Each antireflection coating 51 will be specified by the number shown on the uppermost column in the drawing in the explanation below.

TABLE 1

| Layer No. | | Material | No. 1 $\lambda 1$ 290 | No. 2 $\lambda 1$ 310 | No. 3 $\lambda 1$ 320 | No. 4 $\lambda 1$ 335 | No. 5 $\lambda 1$ 348 | No. 6 $\lambda 1$ 360 | No. 7 $\lambda 1$ 375 | No. 8 $\lambda 1$ 380 |
|---|---|---|---|---|---|---|---|---|---|---|
| 1 | | $M_gF_2$ | 66.9 | 70.4 | 74.0 | 77.6 | 81.2 | 84.8 | 88.4 | 92.0 |
| 2 | | OA600 | 85.0 | 90.5 | 95.9 | 11.2 | 108.7 | 114.0 | 119.3 | 124.6 |
| 3 | | $Al_2O_3$ | 78.8 | 83.3 | 87.8 | 92.3 | 97.6 | 101.9 | 106.3 | 110.7 |
| 4 | | $M_gF_2$ | 17.8 | 18.7 | 19.7 | 20.6 | 21.6 | 22.5 | 23.5 | 24.5 |
| 5 | | $Al_2O_3$ | 57.3 | 60.6 | 63.9 | 67.1 | 71.0 | 74.2 | 77.3 | 80.5 |
| | | $\lambda 1'$ | 241 | 257 | 266 | 278 | 289 | 310 | 312 | 316 |
| | | $\lambda 2'$ | 465 | 497 | 524 | 553 | 582 | 600 | 636 | 661 |
| | | Substrate material Glass M-BaCD5N (n = 1.6) | | | | | | | | |
| | | $\lambda 2$ | 560 | 600 | 630 | 665 | 700 | 730 | 765 | 722 |
| | | $\lambda 2/\lambda 1$ | 1.93 | 1.93 | 1.96 | 1.98 | 2.00 | 2.02 | 2.04 | 1.90 |

| Layer No. | | Material | No. 9 $\lambda 1$ 400 | No. 10 $\lambda 1$ 415 | No. 11 $\lambda 1$ 428 | No. 12 $\lambda 1$ 441 | No. 13 $\lambda 1$ 453 | No. 14 $\lambda 1$ 460 | No. 15 $\lambda 1$ 480 |
|---|---|---|---|---|---|---|---|---|---|
| 1 | | $M_gF_2$ | 95.6 | 99.2 | 102.8 | 106 | 110 | 113 | 117 |
| 2 | | OA600 | 129.8 | 135.1 | 140.2 | 142.7 | 148 | 153 | 158 |
| 3 | | $Al_2O_3$ | 115.1 | 119.4 | 123.8 | 127.5 | 132 | 136 | 141 |
| 4 | | $M_gF_2$ | 25.4 | 26.4 | 27.3 | 28.3 | 29 | 30 | 31 |
| 5 | | $Al_2O_3$ | 83.7 | 86.8 | 90.0 | 92.7 | 95.9 | 99 | 102 |
| | | $\lambda 1'$ | 340 | 345 | 355 | 366 | 376 | 382 | 399 |
| | | $\lambda 2'$ | 680 | 715 | 744 | 764 | 798 | 823 | 850 |

TABLE 1-continued

Substrate material Glass M-BaCD5N (n = 1.6)

| | | | | | | | |
|---|---|---|---|---|---|---|---|
| λ2 | 830 | 860 | 895 | 930 | 960 | 874 | 1023 |
| λ2/λ1 | 2.07 | 2.07 | 2.09 | 2.10 | 2.11 | 1.9 | 2.13 |

Transmittances (minimum value-maximum value) of each objective lens 5 formed in the aforesaid manner for light with wavelength 390-420 nm are shown on the upper sections of each column in Table 2. Transmittances for light with wavelength 405 nm are shown in parentheses on each column in the drawing. Further, evaluation of the transmittance and evaluation of a beam spot form are shown with marks A, B and C on the lower sections of each column in the drawing. For the measurement of the reflectance, reflection spectral layer thickness meter (FE-3000) (made by Ohtsuka Denshi Co.) was

TABLE 2

| | S1 | | | | | | |
|---|---|---|---|---|---|---|---|
| | No. 3 | No. 4 | No. 5 | No. 6 λ1 | No. 7 | No. 8 | No. 9 |
| S2 | 320 | 335 | 348 | 360 | 375 | 380 | 400 |
| No. 1 | (91.2) CC CC | (92.2) CC CC | (92.9) CC CC | 93.4-95.5 (93.5) CC CC | 93.7-95.8 (93.8) CC AA | 93.4-95.7 (93.9) CC AA | 93.4-95.8 (93.9) CC AA |
| No. 2 | (92.1) CC CC | 92.8-94.8 (93.1) CC CC | 93.7-95.1 (93.9) CC BB | 94.3-95.9 (94.5) BB CC | 94.5-96.0 (94.8) BB AA | 94.5-96.1 (94.9) BB AA | 94.5-96.2 (94.9) BB AA |
| No. 3 | (92.7) CC CC | 93.2-95.1 (93.7) CC CC | 94.3-95.8 (94.5) BB BB | 95.0-96.8 (95.1) AA BB | 95.4-96.7 (95.5) AA AA | 95.5-96.8 (95.6) AA AA | 95.5-96.9 (95.6) AA AA |
| No. 4 | 92.7-94.8 (93.1) CC CC | 93.8-95.5 (94.1) CC CC | 94.7-95.9 (94.9) BB BB | 95.3-96.5 (95.5) AA BB | 95.8-96.8 (95.9) AA AA | 96.0-96.8 (96.0) AA AA | 96.0-96.7 (96.0) AA AA |
| No. 5 | 92.8-95.3 (93.3) CC CC | 94.1-95.9 (94.3) BB CC | 95.0-96.2 (95.1) AA BB | 95.5-96.7 (95.7) AA BB | 96.0-97.0 (96.1) AA AA | 96.0-97.1 (96.2) AA AA | 96.0-97.2 (96.3) AA AA |
| No. 6 | 93.0-95.3 (93.3) CC CC | 94.2-95.6 (94.4) BB CC | 95.1-96.3 (95.2) AA BB | 95.6-96.8 (95.8) AA BB | 96.0-97.0 (96.1) AA AA | 96.0-97.2 (96.6) AA AA | 96.1-97.3 (96.6) AA AA |
| No. 7 | 93.1-95.4 (93.4) CC CC | 94.2-95.7 (94.4) BB CC | 95.3-96.4 (95.2) AA BB | 95.7-96.9 (95.8) AA BB | 96.0-97.1 (96.2) AA AA | 96.1-97.2 (96.6) AA AA | 96.1-97.3 (96.6) AA AA |
| No. 8 | 93.2-95.4 (93.4) CC CC | 94.2-95.7 (94.4) BB CC | 95.4-96.5 (95.2) AA BB | 95.7-96.9 (95.8) AA BB | 96.0-97.2 (96.2) AA AA | 96.1-97.2 (96.6) AA AA | 96.1-97.3 (96.6) AA AA |
| No. 9 | 93.2-95.5 (93.3) CC CC | 94.2-95.8 (94.3) BB CC | 95.4-96.5 (95.2) AA BB | 95.6-96.8 (95.7) AA BB | 96.1-97.2 (96.1) AA AA | 96.1-97.2 (96.5) AA AA | 96.1-97.2 (96.5) AA AA |

| | S1 | | | | | |
|---|---|---|---|---|---|---|
| | No. 10 | No. 11 | No. 12 | No. 13 λ1 | No. 14 | No. 15 |
| S2 | 415 | 428 | 441 | 453 | 460 | 480 |
| No. 1 | 93.3-95.6 (93.7) CC AA | 92.9-95.5 (93.6) CC AA | 92.7-95.5 (92.8) CC CC | 92.5-95.1 (92.5) CC BB | 92.4-95.0 (92.5) CC BB | 92.1-94.9 (92.5) CC CC |
| No. 2 | 94.4-96.4 (94.7) BB AA | 94.4-96.2 (94.6) BB BB | 94.4-96.2 (94.5) BB BB | 94.3-96.1 (94.4) BB BB | 93.7-95.8 (94.2) CC BB | 93.5-95.1 (94.3) CC CC |
| No. 3 | 95.2-96.7 (95.3) AA AA | 95.2-96.7 (95.3) AA AA | 95.1-96.7 (95.2) AA AA | 95.0-96.6 (95.1) AA BB | 94.4-95.9 (94.5) BB BB | 94.0-94.9 (94.3) BB CC |
| No. 4 | 96.0-96.8 (96.0) AA AA | 96.0-96.8 (96.1) AA AA | 96.0-96.7 (96.0) AA AA | 95.5-96.5 (95.2) AA AA | 94.9-96.1 (95.1) BB BB | 94.4-95.8 (94.5) BB CC |

TABLE 2-continued

| No. 5 | 96.1-97.3 | 96.1-97.2 | 96.0-97.0 | 95.4-96.6 | 95.0-96.3 | 94.6-96.1 |
|---|---|---|---|---|---|---|
|  | (96.3) | (96.3) | (96.0) | (95.2) | (95.1) | (94.7) |
|  | AA AA | AA AA | AA AA | AA AA | AA BB | BB CC |
| No. 6 | 96.2-97.3 | 96.1-97.2 | 96.1-97.0 | 95.4-96.7 | 95.1-96.4 | 94.6-95.8 |
|  | (96.5) | (96.3) | (96.1) | (95.2) | (95.1) | (94.7) |
|  | AA AA | AA AA | AA AA | AA AA | AA BB | BB CC |
| No. 7 | 96.2-97.3 | 96.1-97.3 | 96.0-97.1 | 95.3-96.7 | 95.1-96.5 | 94.5-96.5 |
|  | (96.5) | (96.3) | (96.1) | (95.2) | (95.1) | (94.7) |
|  | AA AA | AA AA | AA AA | AA AA | AA BB | BB CC |
| No. 8 | 96.2-97.4 | 96.1-97.3 | 96.0-97.2 | 95.2-96.6 | 95.0-96.5 | 94.5-96.4 |
|  | (96.5) | (96.3) | (96.0) | (95.1) | (95.0) | (94.7) |
|  | AA AA | AA AA | AA AA | AA AA | AA BB | BB CC |
| No. 9 | 96.1-97.3 | 96.1-97.3 | 96.0-97.2 | 95.1-96.7 | 94.8-96.3 | 93.8-96.2 |
|  | (96.4) | (96.2) | (96.0) | (95.1) | (95.0) | (94.1) |
|  | AA AA | AA AA | AA AA | AA AA | BB BB | CC CC |

In this case, with respect to the evaluation of transmittance in each of Table 2, mark AA is shown as an extremely excellent level in practical use on the column corresponding to the antireflection coating 51 by which the transmittance of 95% or higher is obtained constantly for light having wavelength of 390-420 nm, mark BB is shown as an excellent level in practical use on the column corresponding to the antireflection coating 51 which is not on the level AA but gives constantly the transmittance of 94% or higher, and mark CC is shown as a level which is problematic in practical use on the column corresponding to antireflection coating 51 other than the aforesaid antireflection coating 51.

Figure 6:
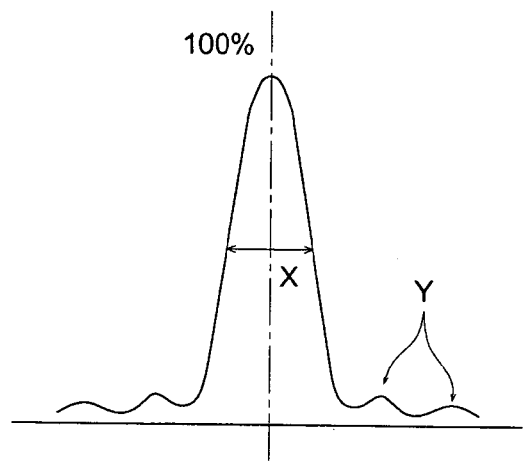
FIG. 6 is a diagram for illustrating criteria for evaluation of a beam spot form.
Figure 6:
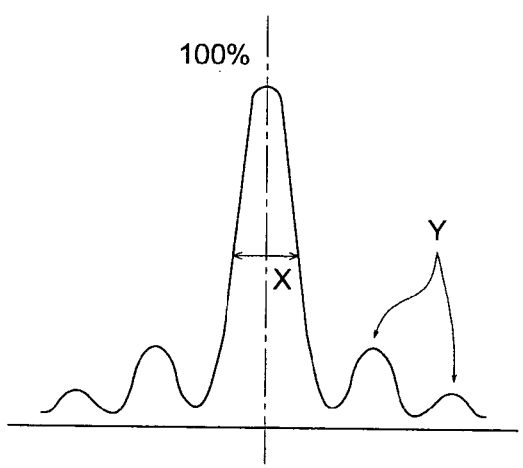
Figure 6:
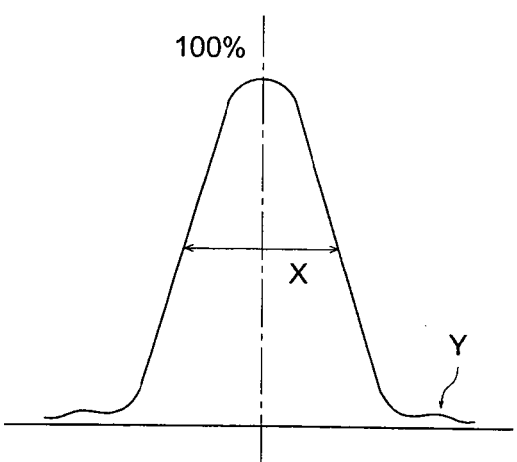

The evaluation of a beam spot form will be explained as follows, referring to FIG. 6. In FIG. 6, the y-axis represents an amount of light and the x-axis represents a spot diameter.

In the evaluation of a beam spot form, an ordinary spot inspecting machine is used, and a size of spot diameter X corresponding to an amount of light of 50% and noise Y of an amount of light on the periphery of the spot are measured, and mark AA is shown on the column corresponding to the antireflection coating 51, for one (see FIG. 6(*a*)) where spot diameter X and noise Y representing an amount of light on the periphery of a spot are both small. Further, for those where one out of spot diameter X and noise Y of an amount of light on the periphery of the spot is small and the other is relatively large, mark BB is shown on the column corresponding to the antireflection coating 51. Further, for those where at least one of noise Y of an amount of light on the periphery of the spot and spot diameter X is large (see FIGS. 6(*b*) and 6(*c*)), mark CC is shown on the column corresponding to its antireflection coating 51.

Incidentally, superiority or inferiority of these transmittances and spot forms is influenced by relationship between transmittance on the central portion of objective lens 5 and that on the outer peripheral portion, as shown in Table 3. In this case, on the column of "transmittance" in the table, there is shown the evaluation of the transmittance of light transmitted through the total objective lens 5.

TABLE 3

| Transmittance on the central portion of lens S1 surface θ = 0 | Transmittance on the outer peripheral portion of lens θ = 30°-45° (Distance from optical axis: 0.6-1.0 mm) | Transmittance (Amount of light) | Evaluation of spot form |
|---|---|---|---|
| Large | Large | AA | BB |
| Large | Medium-Small | BB | CC |
| Medium | Large | AA | AA |
| Medium | Large-Medium | AA | AA |
| Medium | Small | CC | BB |
| Small | Large | BB | CC |
| Small | Medium-Small | CC | AA |

After the transmittance and the beam spot form are evaluated, if the transmittance is on the level AA or the level BB and the spot form is on the level AA or the level BB, operations of recording and reproducing can be judged to be conducted without any problem. If the transmittance is on the level AA and the spot form is on the level AA, operations of recording and reproducing can be judged to be conducted more stably and properly to be preferable. If at least one of the transmittance and the spot form is on the level CC, operations of recording and reproducing are judged to be unstable and problematic.

Therefore, it is possible to infer, from the aforesaid Table 2, a layer structure which is preferable to be applied to antireflection coating 51 of objective lens 5.

Namely, it is understood that an application of the layer structure wherein the wavelength λ1 is in a range of 348-460 nm is preferable, as a layer structure of the antireflection coating 51 provided on lens surface S1, for obtaining the transmittance on level AA or level BB and a spot form on level AA or level BB in optical pickup device 1 that employs a laser beam having a wavelength ranging from 390 nm to 420 nm. It is further understood that an application of the layer structure wherein the wavelength λ1 is in a range of 375-441 nm is preferable, for obtaining the transmittance on level AA and a spot form on level AA. Incidentally, when the wavelength λ1 is in a range of 348-460 nm, the wavelength λ1' is in a range of 289-382 nm and λ2 is λ1×1.9 or more, and when the wavelength λ1 is in a range of 375-441 nm, the wavelength λ1' is in a range of 312-366 nm and λ2 is λ1×1.9 or more.

It is understood that an application of the layer structure of the antireflection coating 51 arranged in the lens surface S2 wherein the wavelength λ1 is in a range of 320-400 nm is preferable. It is further understood that an application of the layer structure is in a range of 335-400 nm is preferable for obtaining transmittance on level AA and a spot form on level AA. Incidentally, when the wavelength $\lambda 1$ is in a range of 320-400 nm, wavelength $\lambda 1'$ is in a range of 266-340 nm and $\lambda 2$ is $\lambda 1 \times 1.9$ or more, and when the wavelength $\lambda 1$ is in a range of 335-400 nm, wavelength $\lambda 1'$ is in a range of 278-340 nm and $\lambda 2$ is $\lambda 1 \times 2.35$ or more.

From the foregoing, it is understood that an application of No. 5-No. 14 shown in Table 1 is preferable, and an application of No. 7-No. 12 is more preferable, as a layer structure of the antireflection coating 51 provided on lens surface S1.

Incidentally, as a layer structure of the antireflection coating 51 provided on lens surface S2, it is understood that an application of No. 3-No. 9 wherein the wavelength $\lambda 1$ is in a range of 320-400 nm is preferable, and an application of No. 4-No. 9 wherein the wavelength $\lambda 1$ is in a range of 335-400 nm is more preferable.

(Evaluation of Lens)

Objective lenses 5 were prepared (Examples 1-3 and Comparative Examples 1 and 2) by forming, through a vacuum deposition method, antireflection coatings 51 each having a layer structure (numbers of the layer structure shown on each column correspond to Table 1) shown in the following Table 2 on lens surfaces S1 and S2 of lens main body 50 that is made to be in a lens form through processing.

TABLE 4

|  |  | Example 1 | Example 2 | Example 3 | Comparative Example 1 | Comparative Example 2 |
|---|---|---|---|---|---|---|
|  | Laser beam wavelength (nm) | 407 | 405 | 405 | 405 | 405 |
| S1 surface | Surface angle θ Effective diameter | 0 to 66° | 0 to 66° | 0 to 66° | 0 to 66° | 0 to 66° |
|  | Antireflection coating | No. 13 | No. 9 | No. 6 | No. 3 | V coating |
| S2 surface | Surface angle θ Effective diameter | 0 to 3° | 0 to 3° | 0 to 3° | 0 to 3° | 0 to 3° |
|  | Antireflection coating | No. 5 | No. 7 | No. 7 | No. 5 | No. 5 |

In the column of "Laser beam wavelength" in Table 4, there is shown a wavelength of laser light source 2a used in optical pickup device 1. In the column of "Surface angle θ", there is shown a range of angle θ which each of lens surfaces S1 and S2 has.

Further, "V coating" in the Table is an antireflection coating which is of a three-layer structure in which the first layer is made of silicon oxide, the second layer is made of OA-600 and the third layer is made of silicon oxide. With respect to a thickness of each layer of the antireflection coating, the first layer is 91 nm, the second layer is 19 nm and the third layer is 8 nm.

In the objective lens with high NA in Example 1, when parallel light having wavelength 407 nm enters the lens, transmittance for the light was 95.2% and the evaluation was on level AA, and a beam spot form was extremely excellent and the evaluation was on level AA, as shown in Table 2.

Figure 7:
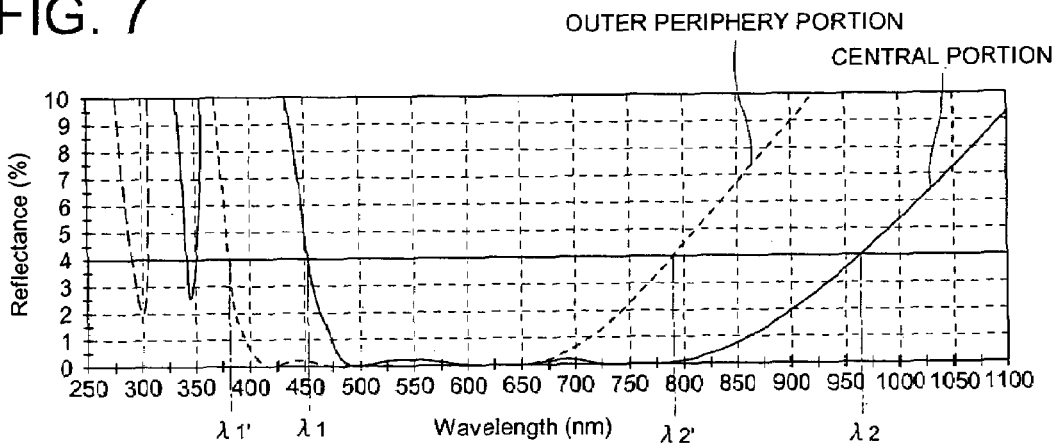
FIG. 7 is a diagram showing a spectral reflection curve on the central portion of the objective lens in Example 1.
Figure 8:
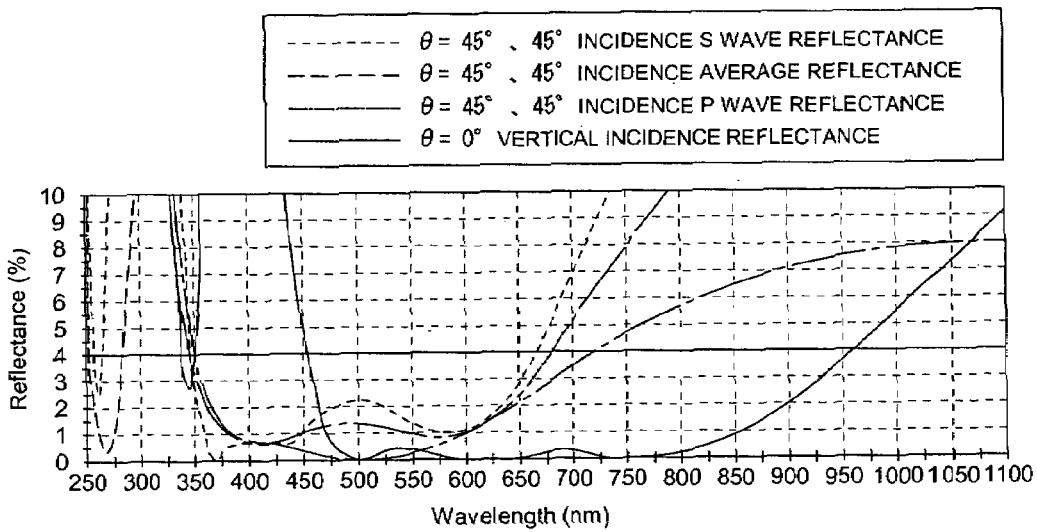
FIG. 8 is a diagram showing a spectral reflection curve on the outer peripheral portion of the objective lens in Example 1.

When the spectral reflectance at central portion C on lens surface S1 was measured, it proved to be one shown in FIG. 7. As is shown in this diagram, the wavelength $\lambda 1$ was 453 nm, the wavelength $\lambda 2$ was 960 (=2.11×$\lambda 1$) nm, the wavelength $\lambda 1'$ was 376 nm and the wavelength $\lambda 2'$ was 798 (=2.12×$\lambda 1'$) nm. The reflectance was 0.5% or less for light with wavelength (($\lambda 1 + \lambda 2$)/2).

When the spectral reflectance on outer peripheral portion P on lens surface S1 on which surface angle θ is 45° was measured, it proved to be one shown in Table 8. As shown in this figure, a difference between reflectance of P polarized light and reflectance of S polarized light was 0.5 or less on the outer peripheral portion P on the lens surface S1, and the difference was especially small in the vicinity of wavelength 453 nm.

Incidentally, when the spectral reflectance on lens surface S2 was measured, the wavelength $\lambda 1$ was 348 nm and the wavelength $\lambda 2$ was 700 (=2.01×$\lambda 1$) nm.

In the objective lens with high NA in Example 2, when parallel light having wavelength 405 nm enters the lens, transmittance for the light was 96.6% and the evaluation was on level AA, and a beam spot form was extremely excellent and the evaluation was on level AA, as shown in Table 2.

Figure 9:
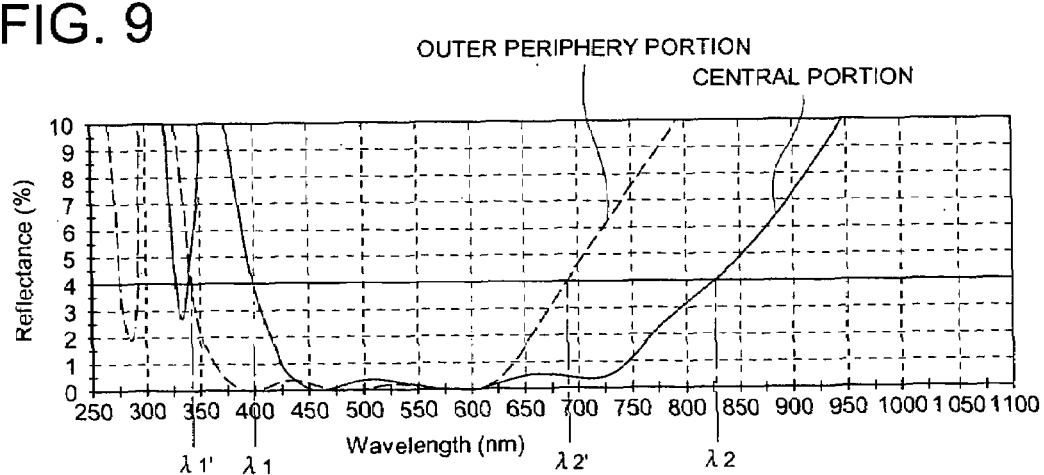
FIG. 9 is a diagram showing a spectral reflection curve on the central portion of the objective lens in Example 2.

When the spectral reflectance on lens surface S1 was measured, it proved to be one shown in FIG. 9. As is shown in this diagram, the wavelength $\lambda 1$ was 400 nm, the wavelength $\lambda 2$ was 830 (=2.07×$\lambda 1$) nm, the wavelength $\lambda 1'$ was 340 nm and the wavelength $\lambda 2'$ was 680 (=2.07×$\lambda 1'$) nm.

Incidentally, when the spectral reflectance on lens surface S2 was measured, the wavelength $\lambda 1$ was 375 nm and the wavelength $\lambda 2$ was 765 (=2.04×$\lambda 1$) nm.

In the objective lens with high NA in Example 3, when parallel light having wavelength 405 nm enters the lens, transmittance for the light was 95.8% and the evaluation was on level AA, and a beam spot form was excellent and the evaluation was on level BB, as shown in Table 2.

Figure 10:
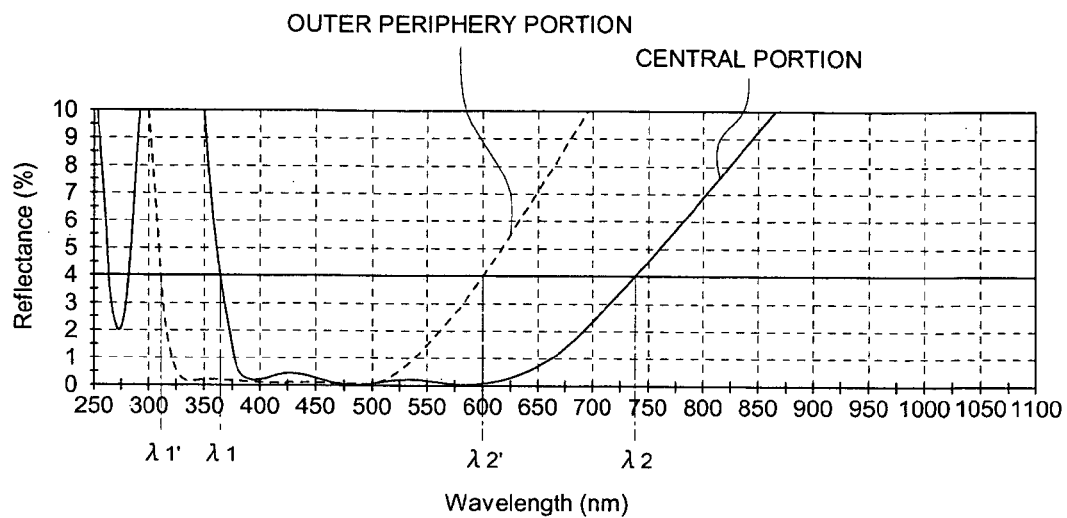
FIG. 10 is a diagram showing a spectral reflection curve on the central portion of the objective lens in Example 3.

When the spectral reflectance on lens surface S1 was measured, it proved to be one shown in FIG. 10. As is shown in this diagram, the wavelength $\lambda 1$ was 360 nm, the wavelength $\lambda 2$ was 730 (=2.02×$\lambda 1$) nm, the wavelength $\lambda 1'$ was 310 nm and the wavelength $\lambda 2'$ was 600 (=1.93×$\lambda 1'$) nm.

Incidentally, when the spectral reflectance on lens surface S2 was measured, the wavelength $\lambda 1$ was 375 nm and the wavelength $\lambda 2$ was 765 (=2.04×$\lambda 1$) nm.

From the foregoing, it is understood that Examples 1-3 can provide an objective lens having a high numerical aperture and an excellent light-converging function. It is further understood that a large capacity for information recording can be realized by using lenses in Examples 1-3 as an objective lens in optical pickup device 1.

On the other hand, in the objective lens in Comparative Example 1, when parallel light having wavelength 405 nm enters the lens, transmittance for the light was 93.3% and the evaluation was on level CC, and much noise light was included in the beam spot, and the evaluation for the spot form was on level CC, as shown in Table 2.

Figure 11:
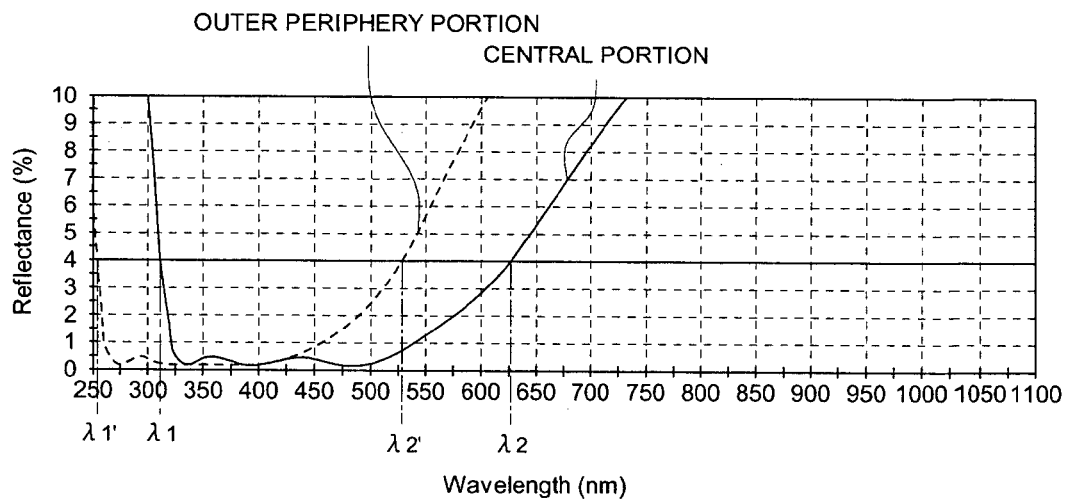
FIG. 11 is a diagram showing a spectral reflection curve on the central portion of the objective lens in Comparative Example 1.

When the spectral reflectance on lens surface S1 was measured in this case, it proved to be one shown in FIG. 11. As is shown in this diagram, the wavelength $\lambda 1$ was 320 nm, the wavelength $\lambda 2$ was 630 (=1.96×$\lambda 1$) nm, the wavelength $\lambda 1'$ was 266 nm and the wavelength $\lambda 2'$ was 524 (=1.97×$\lambda 1'$) nm.

Incidentally, when the spectral reflectance on lens surface S2 was measured, the wavelength $\lambda 1$ was 348 nm and the wavelength $\lambda 2$ was 700 (=2.01×$\lambda 1$) nm.

In the objective lens in Comparative Example 2, when parallel light having wavelength 405 nm enters the lens, transmittance for the light was 93.5% and the evaluation was on level CC, and the evaluation for the beam spot form was on level CC.

When the spectral reflectance on lens surface S1 was measured in this case, the wavelength $\lambda 1$ was 360 nm, the wavelength $\lambda 2$ was 610 (=1.69×$\lambda 1$) nm, the wavelength $\lambda 1'$ was 300 nm and the wavelength $\lambda 2'$ was 507 (=1.69×$\lambda 1'$) nm.

From the foregoing, it is understood that lenses in Comparative Examples 1 and 2 are inappropriate to be used as objective lens 5 for optical pickup device 1 employing light with wavelength 405 nm, and that the lenses in Comparative Examples 1 and 2 make it difficult to realize large capacity for recording in high density optical discs.

2. Lens in Second Embodiment (Evaluation of Transmittance of Lens and Spot Forms)

As objective lens 5A in the aforesaid Second Embodiment, there were formed ones wherein antireflection coatings 51A having respectively layer structures shown in Table 15 are provided respectively on lens surfaces S1 and S2 of lens main body 50A. Incidentally, "OH-5" (trade name, made by Optron Inc.) in the drawing is a mixture of zirconium oxide and titanium.

TABLE 5

| | | | | No. | | | | |
|---|---|---|---|---|---|---|---|---|
| | | 1' | 2' | 3' | 4' | 5' | 6' | 7' | 8' |
| | | | | | $\lambda 1$ | | | | |
| Layer No. | | 300 | 332 | 350 | 360 | 373 | 387 | 400 | 420 |
| | Material | | | | | | | | |
| 1 | SiO$_2$ | 81.0 | 89.1 | 93.3 | 97.5 | 101.6 | 105.8 | 109.9 | 114 |
| 2 | OH$_5$ | 30.7 | 33.8 | 35.6 | 37.3 | 39.0 | 40.7 | 42.5 | 44.2 |
| 3 | SiO$_2$ | 16.1 | 17.7 | 18.5 | 19.3 | 20.2 | 21.0 | 21.8 | 22.6 |
| 4 | OH$_5$ | 46.6 | 51.3 | 54.0 | 56.6 | 59.2 | 61.8 | 64.4 | 67.0 |
| 5 | SiO$_2$ | 24.7 | 27.7 | 29.0 | 30.3 | 31.6 | 32.9 | 34.2 | 35.5 |
| 6 | OH$_5$ | 14.1 | 15.6 | 16.5 | 17.3 | 18.1 | 18.9 | 19.6 | 20.4 |
| 7 | SiO$_2$ | 15.6 | 17.2 | 18.0 | 18.8 | 19.6 | 20.4 | 21.2 | 22.0 |
| | $\lambda 1'$ | 254 | 280 | 294 | 306 | 317 | 328 | 339 | 351 |
| | $\lambda 2'$ | 627 | 690 | 723 | 755 | 795 | 826 | 860 | 890 |
| | Substrate material | | | | | | | | |
| | $\lambda 2$ | 767 | 844 | 910 | 828 | 962 | 1002 | 1050 | 1085 |
| | $\lambda 2/\lambda 1$ | 2.56 | 2.54 | 2.60 | 2.30 | 2.57 | 2.58 | 2.62 | 2.58 |

| | | | No. | | | | |
|---|---|---|---|---|---|---|---|
| | | 9' | 10' | 11' | 12' | 13' | 14' | 15' |
| | | | | $\lambda 1$ | | | | |
| Layer No. | | 430 | 442 | 458 | 468 | 483 | 496 | 512 |
| | Material | | | | | | | |
| 1 | SiO$_2$ | 118 | 122 | 126.5 | 130.6 | 134.8 | 138.9 | 143.0 |
| 2 | OH$_5$ | 45.9 | 47.6 | 49.2 | 50.9 | 52.6 | 54.3 | 55.9 |
| 3 | SiO$_2$ | 23.4 | 24.3 | 25.1 | 25.9 | 26.7 | 27.6 | 28.4 |
| 4 | OH$_5$ | 69.6 | 72.2 | 74.7 | 77.3 | 79.8 | 82.4 | 84.9 |
| 5 | SiO$_2$ | 36.8 | 38.1 | 39.4 | 40.6 | 41.9 | 43.2 | 44.5 |
| 6 | OH$_5$ | 21.2 | 22.0 | 22.8 | 23.6 | 24.3 | 25.1 | 25.9 |
| 7 | SiO$_2$ | 22.8 | 23.6 | 24.4 | 25.2 | 26.0 | 26.8 | 27.6 |
| | $\lambda 1'$ | 361 | 373 | 384 | 395 | 407 | 419 | 430 |
| | $\lambda 2'$ | 926 | 961 | 993 | 1032 | 1063 | 1098 | 1131 |
| | Substrate material | | | | | | | |
| | $\lambda 2$ | 1126 | 1167 | 1076 | 1244 | 1288 | 1324 | 1367 |
| | $\lambda 2/\lambda 1$ | 2.62 | 2.64 | 2.35 | 2.66 | 2.67 | 2.67 | 2.67 |

Transmittances (minimum value-maximum value) of each objective lens 5A formed in the aforesaid manner for light with wavelength 390-420 nm are shown on the upper sections of each column in Table 6. Transmittances for light with wavelength 405 nm are shown in parentheses on each column in the table. Transmittances (minimum value-maximum value) for wavelength 630-680 nm are shown on the medium section of each column in the table. Further, evaluation of the transmittance and evaluation of a beam spot form are shown on the lower section of each column with marks AA, BB and CC.

TABLE 6

| | \multicolumn{6}{c}{S1} | | | | | |
|---|---|---|---|---|---|---|
| | No. 2' | No. 3' | No. 4' | No. 5' λ1 | No. 6' | No. 7' |
| | 332 | 350 | 360 | 373 | 387 | 400 |
| No. 1' | CC CC | CC CC | CC CC | CC CC | CC CC | 93.7-94.1<br>CC CC |
| No. 2' | CC CC | 93.5-94.1<br>(93.7)<br>93.8-94.4<br>CC BB | 93.5-94.2<br>(93.7)<br>93.8-94.5<br>CC BB | 93.5-94.2<br>(93.7)<br>93.9-94.6<br>CC BB | 93.5-94.3<br>(93.8)<br>94.1-94.7<br>BB BB | 94.0-94.8<br>(94.2)<br>94.3-94.8<br>BB AA |
| No. 3' | 93.2-93.9<br>(93.4)<br>93.5-94.2<br>CC CC | 93.7-94.4<br>(93.8)<br>94.1-94.5<br>BB BB | 94.4-95.0<br>(94.5)<br>94.2-94.6<br>BB BB | 94.4-95.1<br>(94.6)<br>94.3-94.7<br>BB AA | 94.4-95.1<br>(94.6)<br>94.4-94.9<br>BB AA | 94.3-95.0<br>(94.5)<br>94.6-95.0<br>BB AA |
| No. 4' | 93.3-94.0<br>(93.5)<br>95.7-96.1<br>BB CC | 94.0-94.7<br>(94.2)<br>96.2-96.8<br>AA BB | 94.4-95.1<br>(94.5)<br>96.6-96.8<br>AA BB | 94.5-95.2<br>(94.7)<br>96.6-97.0<br>AA AA | 94.5-95.2<br>(94.7)<br>96.7-97.1<br>AA AA | 94.7-95.4<br>(94.8)<br>96.8-97.2<br>AA AA |
| No. 5' | 93.5-94.8<br>(93.7)<br>95.7-96.2<br>BB CC | 94.1-95.1<br>(94.3)<br>96.3-97.0<br>AA BB | 94.3-95.3<br>(94.7)<br>96.8-97.6<br>AA BB | 95.1-95.6<br>(95.1)<br>96.9-97.6<br>AA AA | 95.2-95.8<br>(95.5)<br>97.1-97.7<br>AA AA | 95.3-95.9<br>(95.7)<br>97.2-97.7<br>AA AA |
| No. 6' | (93.8)<br>95.7-96.2<br>CC CC | 94.2-95.3<br>(94.6)<br>96.3-97.0<br>AA BB | 94.4-95.4<br>(94.7)<br>96.8-97.5<br>AA BB | 95.0-95.6<br>(95.2)<br>96.8-97.5<br>AA AA | 95.3-95.9<br>(95.7)<br>97.1-97.7<br>AA AA | 95.4-96.1<br>(95.7)<br>97.1-97.8<br>AA AA |
| No. 7' | 93.6-94.5<br>(93.7)<br>95.6-96.0<br>BB CC | 94.2-95.2<br>(94.6)<br>96.2-97.0<br>AA BB | 94.3-95.2<br>(94.6)<br>96.7-97.4<br>AA BB | 94.9-95.5<br>(95.3)<br>96.3-97.2<br>AA AA | 95.2-95.8<br>(95.6)<br>96.3-97.2<br>AA AA | 95.2-95.9<br>(95.6)<br>96.7-97.6<br>AA AA |
| No. 8' | 93.4-94.5<br>(93.2)<br>95.5-95.9<br>BB CC | 94.1-94.7<br>(94.4)<br>96.1-96.9<br>AA BB | 94.3-94.9<br>(94.5)<br>96.3-97.1<br>AA BB | 94.3-95.1<br>(94.6)<br>96.2-97.1<br>AA AA | 94.4-95.2<br>(94.7)<br>96.3-97.2<br>AA AA | 94.5-95.2<br>(94.8)<br>96.4-97.3<br>AA AA |
| No. 9' | 92.9-93.6<br>(93.1)<br>95.4-95.9<br>CC CC | 93.7-94.5<br>(93.8)<br>95.7-96.3<br>BB BB | 93.8-94.4<br>(94.0)<br>95.8-96.5<br>BB BB | 94.0-95.2<br>(94.0)<br>96.1-97.1<br>AA BB | 94.0-95.1<br>(94.1)<br>96.1-97.2<br>AA AA | 94.1-95.1<br>(94.1)<br>96.3-97.3<br>AA AA |
| No. 10' | (92.5)<br>95.4-95.8<br>CC CC | (92.8)<br>95.6-96.2<br>CC CC | (93.3)<br>95.8-96.4<br>CC CC | 93.2-94.5<br>(93.4)<br>96.1-96.8<br>BB BB | 93.4-94.7<br>(93.5)<br>96.1-97.2<br>BB BB | 93.7-94.8<br>(93.6)<br>96.3-97.2<br>BB AA |
| No. 11' | CC CC | CC CC | CC CC | 91.5-92.1<br>(91.8)<br>96.0-96.7<br>CC CC | 91.7-92.6<br>(92.0)<br>96.1-97.2<br>CC BB | 91.8-92.7<br>(92.0)<br>96.3-97.2<br>CC BB |

| | \multicolumn{6}{c}{S1} | | | | | |
|---|---|---|---|---|---|---|
| | No. 8' | No. 9' | No. 10' | No. 11' λ1 | No. 12' | No. 13' |
| | 420 | 430 | 442 | 458 | 468 | 483 |
| No. 1' | 93.2-93.8<br>(93.4)<br>93.8-94.3<br>CC CC | 93.4-93.9<br>(93.5)<br>93.9-94.6<br>CC BB | 93.2-93.9<br>(93.4)<br>94.1-94.8<br>BB BB | CC CC | CC CC | CC CC |
| No. 2' | 94.2-94.8<br>(94.4)<br>94.4-95.0<br>BB AA | 94.2-94.8<br>(94.5)<br>95.0-95.8<br>AA AA | 94.2-94.8<br>(94.4)<br>95.0-95.8<br>AA AA | 94.1-95.2<br>(94.4)<br>95.1-95.8<br>AA BB | 92.2-93.3<br>(92.5)<br>95.2-96.0<br>CC CC | CC CC |
| No. 3' | 94.4-95.1<br>(94.6)<br>94.7-95.1<br>BB AA | (94.7)<br>95.1-95.9<br>AA AA | 94.4-94.9<br>(94.6)<br>95.1-95.8<br>AA AA | 94.2-95.3<br>(94.4)<br>95.2-95.8<br>AA AA | 92.3-93.4<br>(92.5)<br>95.3-96.1<br>CC BB | CC CC |

TABLE 6-continued

| No. | | | | | | |
|---|---|---|---|---|---|---|
| No. 4' | 95.2-95.9 (95.3) 96.8-97.2 AA AA | 95.2-95.9 (95.3) 97.1-97.8 AA AA | 95.3-95.8 (95.4) 97.2-97.9 AA AA | 94.2-95.4 (94.4) 97.2-97.9 AA AA | 92.4-93.4 (92.5) 97.4-98.0 CC BB | 89.7-90.5 (89.8) 97.5-98.1 CC CC |
| No. 5' | 95.3-96.0 (95.7) 97.2-97.8 AA AA | 95.2-95.8 (95.5) 97.3-97.9 AA AA | 95.2-95.7 (95.3) 97.3-98.0 AA AA | 94.3-95.5 (94.5) 97.4-98.1 AA AA | 92.4-93.5 (92.5) 97.5-98.1 CC BB | 89.8-90.4 (90.1) 97.5-98.2 CC CC |
| No. 6' | 95.4-96.1 (95.8) 97.1-97.8 AA AA | 95.3-94.1 (95.5) 97.3-98.0 AA AA | 95.2-95.6 (95.3) 97.3-97.9 AA AA | 94.4-95.6 (94.6) 97.4-98.0 AA AA | 92.5-93.4 (92.6) 97.5-98.2 CC BB | CC CC |
| No. 7' | 95.2-96.0 (95.4) 96.8-97.8 AA AA | 95.2-96.0 (95.3) 97.2-97.9 AA AA | 95.0-95.6 (95.1) 97.2-97.9 AA AA | 94.3-95.5 (94.5) 97.3-97.9 AA AA | 92.4-93.3 (92.6) 97.4-98.1 CC BB | CC CC |
| No. 8' | 94.5-95.3 (94.8) 96.7-97.5 AA AA | 94.4-95.2 (94.8) 97.2-97.9 AA AA | 94.5-95.3 (94.7) 97.2-97.8 AA AA | 94.2-95.3 (94.4) 97.3-97.8 AA AA | 92.3-93.2 (92.5) 97.4-98.0 CC BB | CC CC |
| No. 9' | 94.0-94.8 (94.1) 96.7-97.3 AA AA | 94.0-94.7 (94.5) 97.1-97.8 AA AA | 94.0-94.8 (94.3) 97.1-97.7 AA AA | 94.0-95.1 (94.2) 97.2-97.7 AA AA | 92.1-93.1 (92.3) 97.3-98.0 CC BB | CC CC |
| No. 10' | 93.7-94.5 (93.8) 96.7-97.2 BB AA | 93.6-93.9 (93.8) 97.1-97.7 BB AA | 93.5-94.1 (93.7) 97.0-97.6 BB AA | 93.4-93.7 (93.6) 97.2-97.7 BB AA | 91.9-92.5 (92.1) 97.2-97.8 CC CC | CC CC |
| No. 11' | 92.1-93.3 (92.2) 96.6-97.2 CC AA | 92.1-93.0 (92.3) 97.0-97.7 CC AA | 91.8-92.7 (92.1) 96.9-97.5 CC AA | 91.3-92.1 (91.5) 97.1-97.7 CC AA | 91.5-92.4 (91.8) 97.1-97.9 CC BB | CC CC |

In the evaluation of transmittance in Table 6 in this case, on the column corresponding to the antireflection coating 51A that makes it possible to obtain transmittance of 94% or more constantly for light with wavelength 390-420 nm and makes it possible to obtain transmittance of 95% or more constantly for light with wavelength 630-680 nm, there is shown mark AA as a level extremely excellent in practical use. Further, on the column corresponding to antireflection coating 51A that makes it possible to obtain transmittance of 93% or more constantly for light with wavelength 390-420 nm and makes it possible to obtain transmittance of 94% or more constantly for light with wavelength 630-680 nm and is not on level AA, there is shown mark BB as a level excellent in practical use. Further, on the column corresponding to antireflection coating 51A which is on neither level AA nor level BB, there is shown mark CC as a level problematic in practical use.

From Table 6, it is possible to learn the layer structure which is preferable to be applied to antireflection coating 51 of objective lens 5A.

Namely, when a wavelength of a laser beam used in optical pickup device 1 is within a range of 390-420 nm and within a range of 630-680 nm, it is understood that an application of the layer structure wherein the wavelength $\lambda 1$ is in a range of 350-458 nm as a layer structure for antireflection coating 51 to be provided on lens surface S1 is preferable for obtaining transmittance on level BB or level AA and a spot form on level BB or level AA. Further, it is understood that an application of the layer structure wherein the wavelength $\lambda 1$ is in a range of 373-458 nm is preferable for obtaining transmittance on level AA and a spot form on level AA. Incidentally, when wavelength $\lambda 1$ is in a range of 350-458 nm, wavelength $\lambda 1'$ is in a range of 294-384 nm and $\lambda 2$ is $\lambda 1 \times 2.3$ or more, and when wavelength $\lambda 1$ is in a range of 373-442 nm, wavelength $\lambda 1'$ is in a range of 317-373 nm and $\lambda 2$ is $\lambda 1 \times 2.3$ or more.

On the other hand, when lens surface S1 is provided with antireflection coating 51A having a layer structure wherein the wavelength $\lambda 1$ is smaller than 350 nm, transmittance for light having wavelength 390-420 nm on the central portion of the first lens is higher than that on the outer peripheral portion, resulting in the evaluation of transmittance that is on level CC. When the antireflection coating 51A laminated such that the wavelength $\lambda 1$ is larger than 458 nm, is arranged on the lens surface S1, transmittance for the light having a wavelength of 390-420 nm, preferably 405 nm becomes 93% or lower, and the transmission evaluation was on level CC. Further, an amount of transmitted light at the central portion on the first lens surface is much less than an amount of transmitted light at the outer peripheral portion, and a ripple-shaped light intensity unevenness is caused on the peripheral portion of a beam spot, which results in deterioration of jitter characteristics and an increase of cross talk.

It is understood that an application of the layer structure of the antireflection coating 51A arranged in the lens surface S2 wherein the wavelength $\lambda 1$ is in a range of 350-430 nm is preferable. It is further understood that an application of the layer structure is in a range of 360-400 nm is preferable for obtaining transmittance on level AA and a spot form on level AA. Incidentally, when the wavelength $\lambda 1$ is in a range of 350-430 nm, wavelength $\lambda 1'$ is in a range of 294-361 nm and $\lambda 2$ is $\lambda 1 \times 2.3$ or more, and when the wavelength $\lambda 1$ is in a range of 360-400 nm, wavelength $\lambda 1'$ is in a range of 306-339 nm and $\lambda 2$ is $\lambda 1 \times 2.3$ or more.

From the foregoing, as a layer structure of the antireflection coating 51 provided on lens surface S1, it is preferable to apply No. 3'-No. 11' shown in Table 5, and it is more preferable to apply No. 5'-No. 10'.

Moreover, as a layer structure of the antireflection coating 51 provided on lens surface S2, it is preferable to apply No. 3'-No. 9' whose wavelength $\lambda 1$ is 350-430 nm, and it is more preferable to apply No. 4'-No. 7' whose wavelength is 360-400 nm.

Further, if this embodiment has a layer structure which realizes AA level of transmittance and AA level of spot forms, it also realize practically good transmittance and spot forms in a optical pickup device which conducts information recording and/or reproducing using AOD, DVD and CD.

(Evaluation of Lens)

Objective lenses 5A were prepared (Examples 4 and 5 and Comparative Examples 3-5) by forming, through a vacuum deposition method, antireflection coatings 51 each having a layer structure (numbers of the layer structure shown on each column correspond to Table 1 and 2) shown in the following Table 7 on lens surfaces S1 and S2 of lens main body 50 that is made to be in a lens form through processing.

TABLE 7

|  |  | Example 4 | Example 5 | Comparative Example 3 | Comparative Example 4 | Comparative Example 5 |
|---|---|---|---|---|---|---|
|  | Laser beam wavelength (nm) | 405 650 | 406 635 | 405 650 | 405 650 | 405 650 |
| S1 surface | Surface angle θ | 0 to 55° | 0 to 55° | 0 to 55° | 0 to 55° | 0 to 55° |
|  | Effective diameter | 4 mmφ | 4 mmφ | 4 mmφ | 4 mmφ | 4 mmφ |
|  | Antireflection coating | No. 4' | No. 8' | No. 2' | No. 12' | No. 12' |
| S2 surface | surface angle θ | 0 to 5° | 0 to 5° | 0 to 5° | 0 to 5° | 0 to 5° |
|  | Antireflection coating | No. 7' | No. 7' | No. 7' | No. 7' | No. 10' |

In the objective lens with high NA in Example 4, when parallel rays of light having wavelength 405 nm and 650 nm enter the lens, the transmittance for the light with wavelength 405 nm was 94.6% and the transmittance for the light with wavelength 650 nm was 96.8%, and evaluation of transmittance was on level AA as shown in Table 6. Further, a beam spot form was excellent for each of both rays of light having respectively both wavelengths, and evaluation was on level BB.

When the spectral reflectance at the central portion C on lens surface S1 was measured in this case, the wavelength $\lambda_1$ was 360 nm, the wavelength $\lambda_2$ was 828 (=2.3×$\lambda_1$) nm, the wavelength $\lambda_1'$ was 306 nm and the wavelength $\lambda_2'$ was 755 (=2.46×$\lambda_1'$) nm.

Incidentally, when the spectral reflectance on lens surface S2 was measured, the wavelength $\lambda_1$ was 400 nm and the wavelength $\lambda_2$ was 1050 (=2.62×$\lambda_1$) nm.

In the objective lens with high NA in Example 5, when parallel rays of light having respectively wavelength 405 nm and wavelength 650 enter the lens, transmittance for the light having a wavelength of 405 nm was 95.4%, transmittance for the light having a wavelength of 650 nm was 97.1% and the transmission evaluation was on level AA, as shown in Table 6.

Further, a beam spot form was extremely excellent for both rays of light respectively having both wavelengths, and the evaluation was on level AA.

Figure 12:
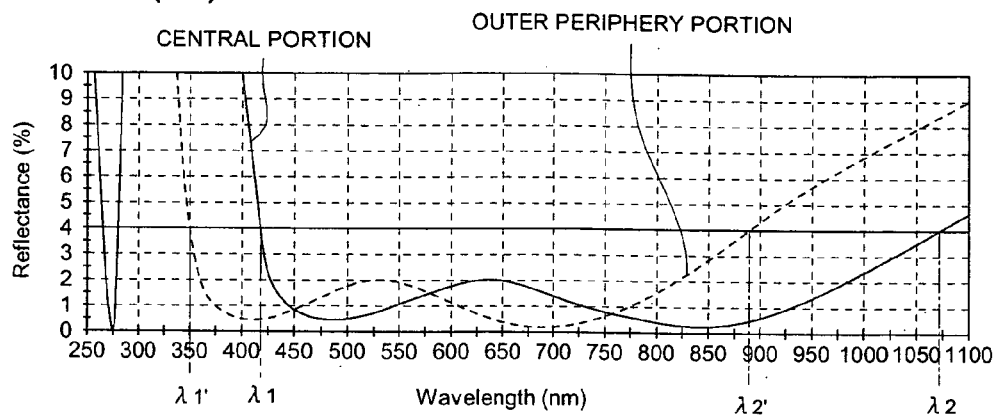
FIG. 12($a$) is a diagram showing a spectral reflection curve on the central portion of the objective lens in Example 5, and FIG. 12($b$) and FIG. 12($c$) are diagrams showing respectively reflectance distribution and transmittance distribution on lens surface S1.
Figure 12:
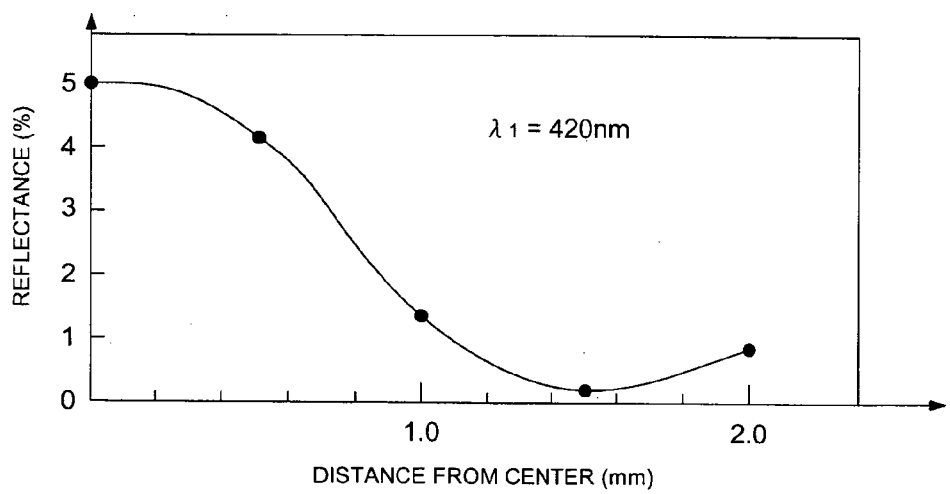
Figure 12:
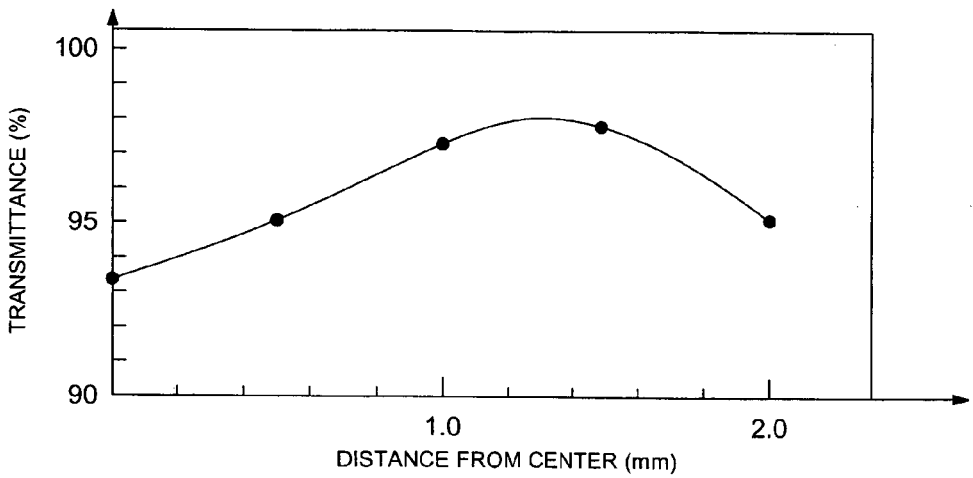

When the spectral reflectance on lens surface S1 was measured in this case, it proved to be one shown in FIG. 12 (a). As is shown in this diagram, the wavelength $\lambda_1$ was 420 nm, the wavelength $\lambda_2$ was 1082 (=2.58×$\lambda_1$) nm, the wavelength $\lambda_1'$ was 351 nm and the wavelength $\lambda_2'$ was 890 (=2.53×$\lambda_1'$) nm.

Incidentally, when the spectral reflectance on lens surface S2 was measured, the wavelength $\lambda_1$ was 400 nm and the wavelength $\lambda_2$ was 1050 (=2.62×$\lambda_1$) nm.

Further, reflectance distribution and transmittance distribution on lens surface S1 for light with wavelength 405 nm are shown in FIGS. 12(b) and 12(c). As shown in these figures, an area where the reflectance was minimum and the transmittance was maximum on the lens surface S1 was at the position that is 0.5R-0.7R away from the center of the lens surface S1.

The foregoing shows that the Examples 4 and 5 can provide an objective lens having a high numerical aperture and an excellent light-converging function. It is also understood that a large capacity of information recording can be realized by using objective lenses in Examples 4 and 5 in optical pickup device 1A.

On the other hand, in the objective lens in Comparative Example 3, when parallel rays of light having respectively wavelength 405 nm and wavelength 650 enter the lens, transmittance for the light having a wavelength of 405 nm was 93.7%, transmittance for the light having a wavelength of 650 nm was 95.7% and the transmission evaluation was on level BB, as shown in Table 6. Further, a beam spot form was inferior for both rays of light respectively having both wavelengths, and the evaluation was on level CC.

When the spectral reflectance on lens surface S1 was measured in this case, it proved to be one shown in FIG. 25 (a). As is shown in this diagram, the wavelength $\lambda_1$ was 332 nm, the wavelength $\lambda_2$ was 844 (=2.54×$\lambda_1$) nm, the wavelength $\lambda_1'$ was 280 nm and the wavelength $\lambda_2'$ was 690 (=2.46×$\lambda_1'$) nm.

Incidentally, when the spectral reflectance on lens surface S2 was measured, the wavelength λ1 was 400 nm and the wavelength λ2 was 1050 (=2.62×λ1) nm.

Figure 13:
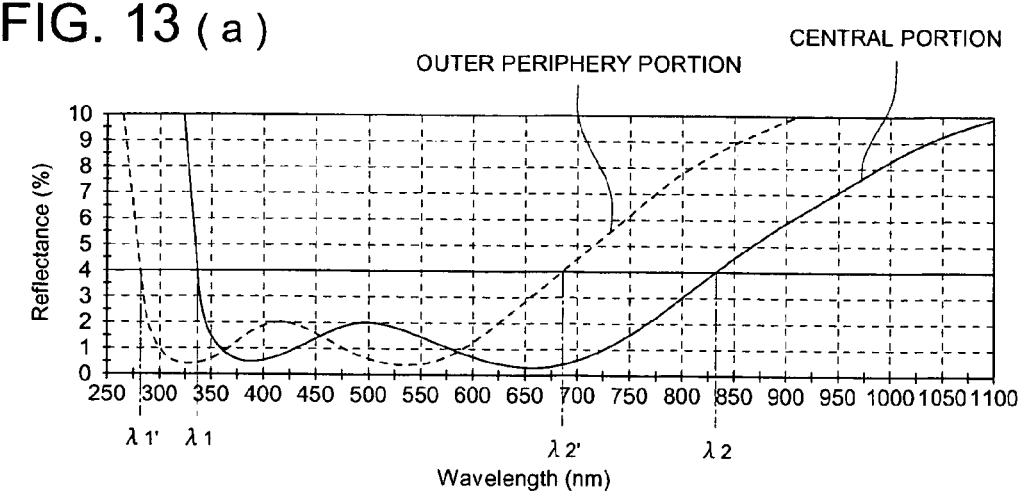
FIG. 13($a$) is a diagram showing a spectral reflection curve on the central portion of the objective lens in Comparative Example 3, and FIG. 13($b$) and FIG. 13($c$) are diagrams showing respectively reflectance distribution and transmittance distribution on lens surface S1.
Figure 13:
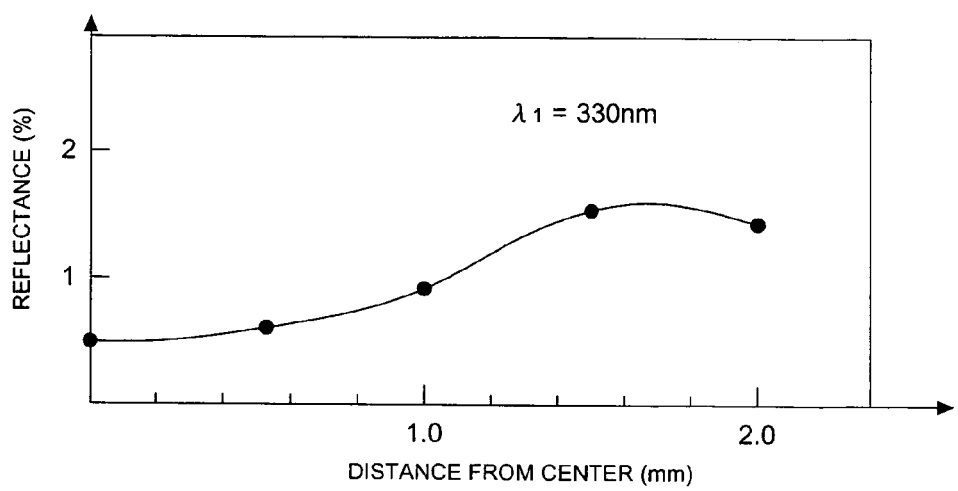
Figure 13:
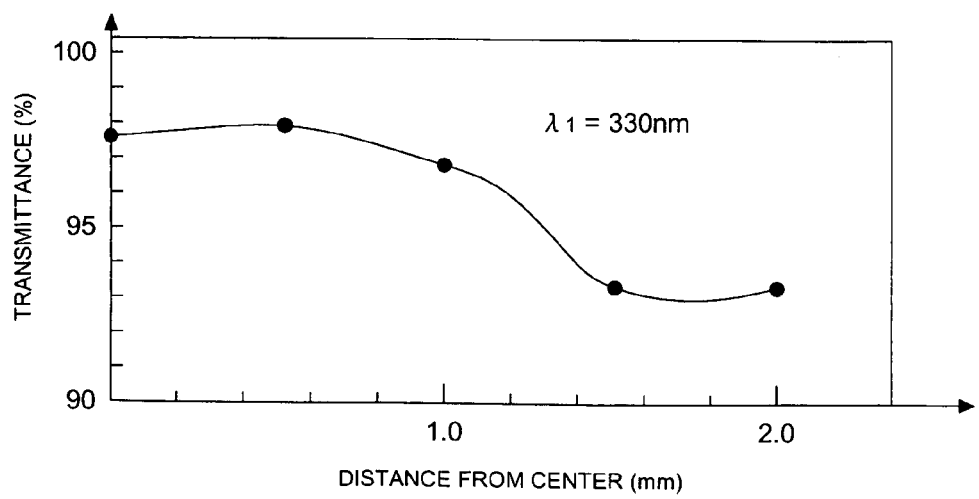

Further, reflectance distribution and transmittance distribution on lens surface S1 for light with wavelength 405 nm are shown in FIGS. 13. As shown in these figures, an area where the reflectance was minimum and the transmittance was maximum on the lens surface S1 was at the position that is close to the center of the lens surface S1.

In the objective lens with high NA in Example 4, when parallel rays of light having respectively wavelength 405 nm and wavelength 650 enter the lens, transmittance for the light having a wavelength of 405 nm was 92.6%, transmittance for the light having a wavelength of 650 nm was 97.5% and the transmission evaluation was on level CC, as shown in Table 6. Further, a beam spot form was inferior for both rays of light respectively having both wavelengths, and the evaluation was on level BB.

Figure 14:
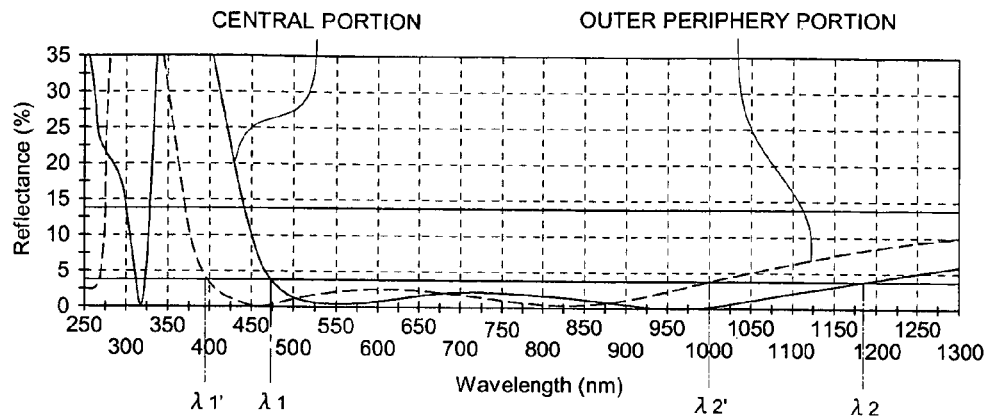
FIG. 14($a$) is a diagram showing a spectral reflection curve on the central portion of the objective lens in Comparative Example 4, and FIG. 14($b$) and FIG. 14($c$) are diagrams showing respectively reflectance distribution and transmittance distribution on lens surface S1.
Figure 14:
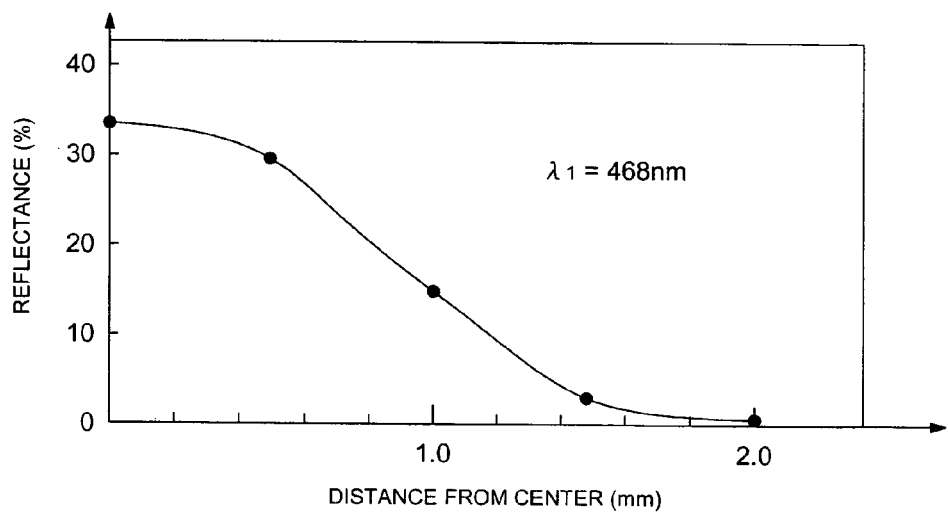
Figure 14:
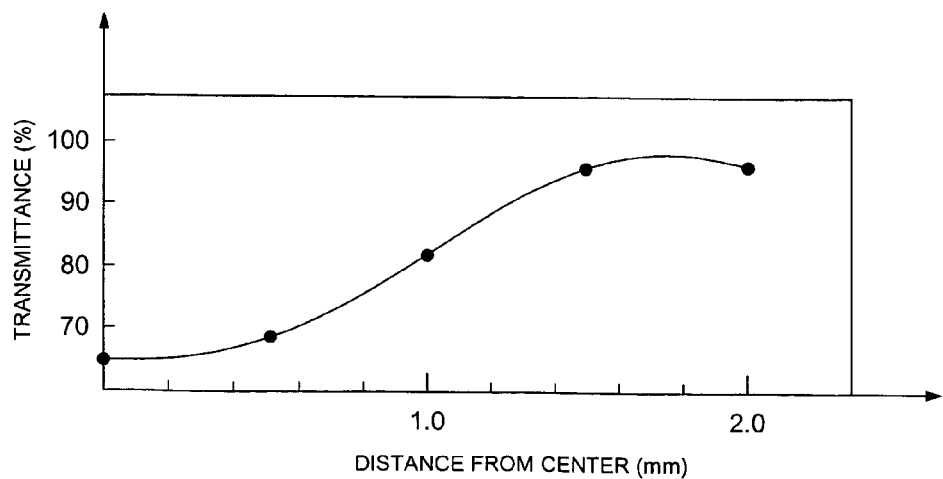

When the spectral reflectance on lens surface S1 was measured in this case, it proved to be one shown in FIG. 14 (a). As is shown in this diagram, the wavelength k1 was 468 nm, the wavelength λ2 was 1244 (=2.66×λ1) nm, the wavelength λ1' was about 395 nm and the wavelength λ2' was about 1032 (=2.61×λ1') nm.

Further, reflectance distribution and transmittance distribution on lens surface S1 for light with wavelength 405 nm are shown in FIGS. 14(b) and 14(c). As shown in these figures, an area where the reflectance was minimum and the transmittance was maximum on the lens surface S1 was at the position that is close to the outermost peripheral portion on the lens surface S1.

In the objective lens in Example 5, when parallel rays of light having respectively wavelength 405 nm and wavelength 650 nm enter the lens, transmittance for the light having a wavelength of 405 nm was 92.1%, transmittance for the light having a wavelength of 650 nm was 97.3% and the transmission evaluation was on level CC. Further, the evaluation of a beam spot form was on level CC.

When the spectral reflectance on lens surface S1 was measured in this case, the wavelength λ1 was 468 nm and the wavelength λ2 was 1244 (=2.66×λ1) nm.

The foregoing shows that lenses in the comparative Examples 3-5 are not suitable to be used as objective lens 5A for optical pickup device 1 that employs rays of light having respectively wavelength 405 nm and wavelength 650, and that it is difficult to realize large capacity of recording on an optical recording medium with lenses in Comparative Examples 3-5

3. Lens in Third Embodiment (1)

(Evaluation of Transmittance of Lens and Spot Forms)

Figure 15:
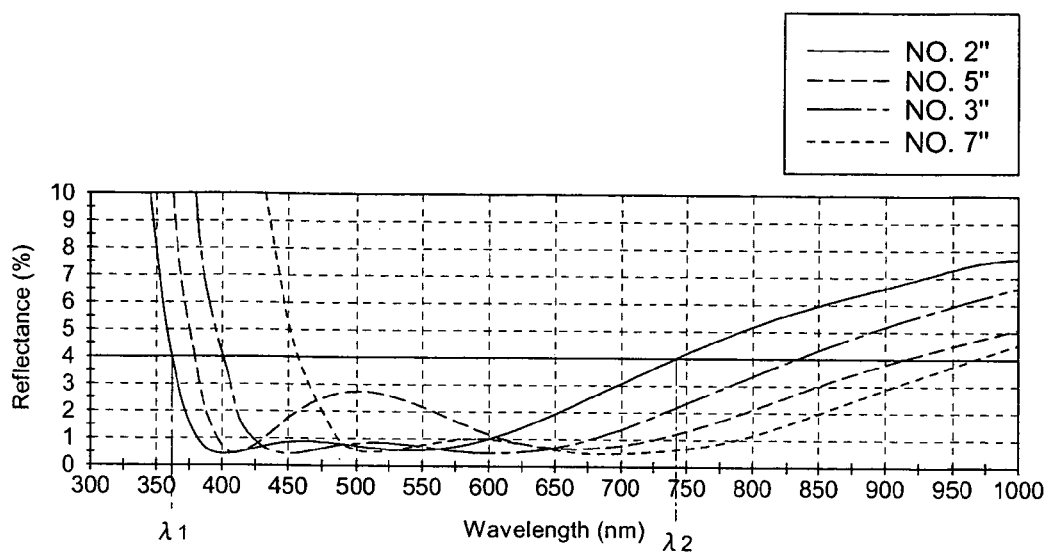
FIG. 15 is a diagram showing a spectral reflection curve of the antireflection coating shown in Table 8.

As objective lens 5B in the aforesaid Third Embodiment, there were formed ones wherein antireflection coatings 51B of No. 4" shown in Table 8 are provided respectively on lens surfaces S1 and S2 of lens main body 500, and antireflection coatings 51B having respectively layer structures shown in Table 5 are provided respectively on lens surfaces S3 and S4 of lens main body 501. In this case, spectral reflection characteristics of each antireflection coating 51B shown in Table 8 are shown in FIG. 15. Incidentally, this diagram illustrates the aforesaid wavelength λ1 and wavelength λ2 about antireflection coating 51B of No. 2".

TABLE 8

| | | 1" | 2" | 3" | 4" | No. 5" | 6" | 7" | 8" |
|---|---|---|---|---|---|---|---|---|---|
| | | | | | | λ1 | | | |
| | | 350 | 360 | 370 | 375 | 400 | 440 | 458 | 480 |
| 1 | SiO$_2$ | 91.6 | 94.3 | 111.7 | 112.2 | 105.3 | 118.2 | 122.2 | 128.0 |
| 2 | OA600 | 32.0 | 32.9 | 25.4 | 26.0 | 36.9 | 41.6 | 43.0 | 45.1 |
| 3 | SiO$_2$ | 37.5 | 38.4 | 46.4 | 47.4 | 43.1 | 48.4 | 50.0 | 52.3 |
| 4 | OA600 | 18.9 | 19.4 | 22.8 | 24.9 | 21.8 | 24.5 | 25.4 | 26.6 |
| 5 | SiO$_2$ | 16.6 | 17.1 | 14.6 | 175.9 | 19.1 | 21.5 | 22.2 | 23.2 |
| | λ2 | 730 | 740 | 770 | 780 | 820 | 900 | 936 | 980 |
| | λ2/λ1 | 2.08 | 2.1 | 2.08 | 2.08 | 2.05 | 2.04 | 2.04 | 2.04 |
| | λ1' | 290 | 310 | 320 | 318 | 340 | 360 | 375 | 400 |
| | λ2' | 752 | 774 | 796 | 806 | 860 | 946 | 984 | 1030 |

Transmittances (minimum value-maximum value) of each objective lens 5B formed in the aforesaid manner for light with wavelength 390-420 nm are shown on the upper sections of each column in Table 9. Further, transmittances (minimum value-maximum value) for rays of light with wavelength 630-680 nm and with wavelength 770-800 nm are shown on medium sections on each column in the drawing. Further, evaluation of the transmittance and evaluation of a beam spot form are shown on the lower sections of each column with marks AA, BB and CC.

TABLE 9

| | S1 | | | | | |
|---|---|---|---|---|---|---|
| | No. 2' | No. 3' | No. 4' | No. 5' | No. 6' | No. 7' |
| | | | | λ1 | | |
| S4 | 332 | 350 | 360 | 373 | 387 | 400 |
| No. 1' | 90.1-91.6 | 90.8-91.8 | 91.3-92.4 | 91.5-92.5 | 91.4-92.5 | 91.3-92.4 |
| | CC CC | CC CC | CC CC | CC CC | CC CC | CC CC |
| No. 2' | | 90.7-91.8 | | | 91.4-92.4 | 91.3-92.3 |
| | | 91.8-93.5 | | | 93.0-94.5 | 93.1-94.6 |
| | | CC CC | | | 89.5-91.0 | CC CC |
| | | | | | CC CC | |
| No. 3' | 90.0-91.4 | | 91.2-92.3 | 91.4-92.4 | 91.3-92.4 | 91.2-92.2 |
| | CC CC | | 91.8-92.3 | 92.5-94.0 | 94.2-95.7 | 94.3-95.8 |
| | | | 88.8-90.3 | 89.3-90.8 | 89.7-91.3 | 90.1-91.6 |
| | | | CC CC | CC CC | CC CC | BB CC |
| No. 4' | | 90.6-91.5 | | | 91.3-92.3 | |
| | | 92.0-93.5 | | | 94.6-96.1 | |
| | | 89.2-90.7 | | | 90.9-92.4 | |
| | | CC CC | | | BB BB | |
| No. 5' | 89.9-91.2 | 90.5-91.4 | | 91.4-92.4 | 91.3-92.3 | 91.2-92.1 |
| | 91.9-93.4 | 92.3-93.8 | | 93.6-95.1 | 94.8-96.3 | 94.9-96.4 |
| | CC CC | 89.8-91.3 | | 90.5-93.0 | 91.2-93.7 | 92.8-94.3 |
| | | CC CC | | BB BB | BB BB | AA BB |
| No. 6' | CC CC | 90.4-91.4 | 90.8-91.7 | BB BB | 91.2-92.2 | 91.1-92.0 |
| | | 92.5-94.0 | 92.8-94.6 | | 94.8-96.3 | 94.8-96.3 |
| | | 90.0-91.5 | 91.0-92.6 | | 93.1-94.6 | 93.5-95.1 |
| | | BB BB | BB BB | | AA BB | AA AA |
| No. 7' | 89.8-91.1 | 89.9-91.4 | 90.8-91.8 | 91.0-92.0 | 91.1-92.1 | 91.0-92.1 |
| | 92.4-93.9 | 92.5-94.5 | 92.9-94.7 | 93.8-95.3 | 94.7-96.2 | 94.9-96.3 |
| | 90.1-91.6 | 90.5-92.0 | 91.0-92.6 | 92.4-93.9 | 93.2-94.7 | 93.7-95.2 |
| | BB CC | BB BB | BB BB | AA BB | AA BB | AA AA |
| No. 8' | 89.8-91.0 | 90.3-91.2 | 90.5-91.7 | 90.8-91.9 | 91.0-92.1 | 91.1-92.1 |
| | 91.5-93.0 | 91.7-93.2 | 92.5-94.0 | 92.5-94.1 | 93.2-94.7 | 93.7-95.2 |
| | BB CC | 90.5-92.1 | 91.2-92.7 | 92.7-94.2 | 93.5-95.0 | 93.8-95.3 |
| | | BB BB | BB BB | AA BB | AA BB | AA AA |
| No. 9' | 89.7-91.0 | 90.2-91.2 | | 90.7-91.9 | | 90.4-91.8 |
| | BB CC | 91.5-93.0 | | 92.1-93.6 | | 93.5-95.0 |
| | | 90.5-92.0 | | 92.8-94.3 | | 94.2-95.7 |
| | | BB BB | | AA BB | | AA AA |
| No. 10' | 89.8-91.0 | 90.1-91.2 | 90.2-91.3 | 90.5-91.8 | 90.4-91.7 | 90.2-91.3 |
| | BB CC | 91.4-92.9 | 91.5-93.0 | 92.0-93.5 | 92.8-94.3 | 93.2-94.7 |
| | | 90.7-92.2 | 91.3-92.8 | 91.9-93.4 | 94.4-95.9 | 94.5-96.0 |
| | | BB CC | BB BB | BB BB | AA BB | AA AA |
| No. 11' | 89.5-90.8 | 89.8-91.1 | 89.9-91.2 | 89.9-91.2 | 89.8-91.3 | 89.5-90.9 |
| | 91.0-92.5 | 91.3-92.8 | 91.3-92.8 | 91.9-93.4 | 92.7-94.2 | 93.1-94.6 |
| | 90.6-92.1 | 90.8-92.3 | 91.5-93.0 | 92.0-93.5 | 94.6-96.1 | 94.7-96.2 |
| | BB | BB CC | BB BB | BB BB | AA BB | AA AA |
| No. 12' | 87.0-89.5 | | 87.2-89.8 | 87.6-90.1 | 87.9-90.7 | 87.8-90.3 |
| | 90.8-92.3 | | 91.2-92.7 | 91.8-93.3 | 92.1-93.6 | 92.5-94.0 |
| | 90.7-92.2 | | 91.5-93.0 | 92.1-93.6 | 94.8-95.3 | 94.9-96.4 |
| | CC CC | | CC BB | CC BB | CC BB | CC BB |

| | S1 | | | | | |
|---|---|---|---|---|---|---|
| | No. 8' | No. 9' | No. 10' | No. 11' | No. 12' | No. 13' |
| | | | | λ1 | | |
| S4 | 420 | 430 | 442 | 458 | 468 | 483 |
| No. 1' | 91.0-92.2 | 90.5-92.1 | 90.3-91.9 | 90.1-91.8 | 89.8-91.5 | 87.8-89.3 |
| | CC CC | CC CC | 92.5-94.0 | BB CC | CC CC | CC CC |
| | | | 90.1-91.5 | | | |
| | | | BB CC | | | |
| No. 2' | 91.0-92.3 | 90.5-92.1 | 90.4-92.0 | 90.1-91.9 | 89.8-91.4 | 87.8-89.4 |
| | 93.2-94.6 | 93.3-94.8 | 93.5-95.0 | 93.8-95.3 | 94.8-96.3 | 95.2-96.7 |
| | 90.1-91.6 | 90.4-91.5 | 90.5-92.0 | BB CC | BB CC | 90.8-92.3 |
| | BB CC | BB CC | BB CC | | | CC CC |
| No. 3' | 90.9-92.3 | 90.5-92.0 | 90.2-91.7 | 90.1-91.8 | 89.2-91.2 | 87.9-89.4 |
| | 94.5-95.0 | 94.6-96.1 | 94.8-96.3 | 95.4-96.9 | 95.4-96.8 | 95.4-96.8 |
| | 90.5-92.0 | 90.8-92.3 | 90.8-92.3 | 90.8-92.3 | 90.9-92.4 | 90.9-92.5 |
| | BB CC | BB CC | BB CC | BB BB | BB CC | CC CC |
| No. 4' | 90.9-92.4 | 90.5-92.0 | 90.3-91.9 | 89.9-91.3 | 89.1-90.6 | 87.9-89.4 |
| | 94.6-96.1 | 94.7-96.2 | 94.8-96.3 | 95.3-96.8 | 95.4-96.9 | 95.5-97.0 |
| | 91.8-93.3 | 92.7-94.2 | 92.8-94.3 | 92.9-94.4 | 93.0-94.5 | 93.1-94.6 |
| | BB BB | AA BB | AA BB | AB BB | BB BB | CC CC |

TABLE 9-continued

| | | | | | | |
|---|---|---|---|---|---|---|
| No. 5' | 90.8-92.0 | 90.5-91.9 | 90.4-91.9 | 89.7-91.1 | 88.7-90.2 | 87.8-90.1 |
| | 95.0-96.5 | 95.0-96.6 | 95.0-96.5 | 95.2-96.8 | 95.5-97.2 | 95.8-97.7 |
| | 93.4-94.9 | 93.8-95.3 | 94.3-95.8 | 94.5-96.0 | 94.8-96.3 | 95.2-96.7 |
| | AA AA | AA AA | AA BB | AA BB | BB BB | CC CC |
| No. 6' | 90.7-92.2 | 90.5-91.8 | 90.3-91.8 | 89.5-91.0 | 88.5-90.0 | 87.8-89.2 |
| | 94.8-96.2 | 94.9-96.1 | 95.1-96.6 | 95.3-96.8 | 95.5-97.0 | 95.6-97.2 |
| | 93.8-95.3 | 94.5-96.0 | 94.7-96.2 | 94.9-96.4 | 95.1-96.6 | 96.0-97.0 |
| | AA AA | AA AA | AA AA | AA BB | BB BB | CC CC |
| No. 7' | 90.7-91.8 | 90.5-91.4 | AA AA | 89.5-90.9 | | 87.7-89.2 |
| | 94.8-96.1 | 94.8-95.9 | | 95.2-96.7 | | 95.4-97.0 |
| | 94.1-96.6 | 94.7-96.2 | | 95.0-96.5 | | 95.9-97.4 |
| | AA AA | AA AA | | AA BB | | CC CC |
| No. 8' | 91.0-92.0 | 90.5-91.3 | 90.4-91.2 | 89.5-90.9 | | 87.6-89.1 |
| | 94.2-95.7 | 94.5-95.8 | 94.8-96.3 | 95.1-96.6 | | 95.2-96.8 |
| | 94.2-95.7 | 94.8-96.3 | 95.0-96.5 | 95.2-96.7 | | 95.4-96.9 |
| | AA AA | AA AA | AA AA | AA BB | | CC CC |
| No. 9' | 90.2-91.7 | 90.3-91.1 | 89.5-90.3 | | | 87.6-89.0 |
| | 93.9-95.4 | 94.2-95.7 | 94.5-96.0 | | | 95.1-96.6 |
| | 94.6-96.1 | 94.7-96.2 | 95.0-96.5 | | | 95.5-97.1 |
| | AA AA | AA AA | AA AA | | | CC CC |
| No. 10' | 90.1-91.2 | 89.8-90.3 | 88.2-89.4 | | | 87.5-88.9 |
| | 93.8-94.9 | 94.1-95.6 | 94.3-95.8 | | | 94.8-96.3 |
| | 94.7-96.2 | 94.8-95.3 | 94.9-96.4 | | | 95.4-96.9 |
| | AA AA | AA AA | BB AA | | | CC CC |
| No. 11' | 89.4-90.5 | 88.3-89.8 | 88.1-89.3 | | 87.8-89.3 | 87.1-88.6 |
| | 93.4-94.9 | 93.6-95.1 | 93.6-95.1 | | 93.7-95.2 | 93.8-95.3 |
| | 95.0-96.5 | 95.0-96.5 | 94.8-96.3 | | 95.2-96.7 | 95.4-96.9 |
| | AA AA | BB AA | BB BB | | CC CC | CC CC |
| No. 12' | 87.7-90.4 | 87.6-90.5 | CC | 87.5-90.2 | | 86.5-89.8 |
| | 92.8-94.3 | 93.1-94.6 | | 93.1-94.6 | | 93.2-94.7 |
| | 95.1-96.6 | 95.2-96.7 | | 95.3-96.8 | | 95.6-97.2 |
| | CC BB | CC BB | | CC CC | | CC CC |

In the evaluation of transmittance in Table 9 in this case, on the column corresponding to the antireflection coating 51B that makes it possible to obtain transmittance of 89% or more constantly for light with wavelength 390-420 nm then makes it possible to obtain transmittance of 92% or more constantly for light with wavelength 630-680 nm, and makes it possible to obtain transmittance of 92% or more constantly for light with wavelength 770-800 nm, there is shown mark AA as a level extremely excellent in practical use. Further, on the column corresponding to the antireflection coating 51B that makes it possible to obtain transmittance of 88% or more constantly for light with wavelength 390-420 nm then makes it possible to obtain transmittance of 90% or more constantly for light with wavelength 630-680 nm, and makes it possible to obtain transmittance of 90% or more constantly for light with wavelength 770-800 nm, and is not on level AA, there is shown mark BB as a level excellent in practical use. Further, on the column corresponding to antireflection coating 51B which is on neither level AA nor level BB, there is shown mark CC as a level problematic in practical use.

Therefore, it is possible to infer, from the aforesaid Table 9, a layer structure which is preferable to be applied to antireflection coating 51B of objective lens 5B.

Namely, it is understood that an application of the layer structure wherein the wavelength $\lambda 1$ is in a range of 360-458 nm is preferable, as a layer structure of the antireflection coating 51B provided on lens surface S3, for obtaining the transmittance on level BB or level AA and a spot form on level BB or level AA, when the wavelength of the laser beam used in optical pickup device 1 is in each of a range of 390-420 nm, a range of 630-680 nm and a range of 770-800 nm. It is further understood that an application of the layer structure wherein the wavelength $\lambda 1$ is in a range of 400-442 nm is preferable for obtaining transmittance on level AA and a spot form on level AA. Incidentally, when the wavelength $\lambda 1$ is in a range of 360-384 nm, wavelength $\lambda 1'$ is in a range of 306-384 nm and $\lambda 2$ is $\lambda 1 \times 2.3$ or more, and when the wavelength $\lambda 1$ is in a range of 400-442 nm and $\lambda 2$ is $\lambda 1 \times 2.58$ or more, wavelength $\lambda 1'$ is in a range of 339-373 nm and $\lambda 2$ is $\lambda 1 \times 2.58$ or more.

On the other hand, when lens surface S3 is provided with antireflection coating 51B having a layer structure wherein the wavelength $\lambda 1$ is smaller than 360 nm, transmittance for light having wavelength 630-680 nm turns out to be inferior although transmittance for light having wavelength 390-420 nm was sometimes excellent in practical use, resulting in the evaluation of transmittance that is on level CC. Further, transmittance on the central portion on lens surface S3 for light with wavelength 390-420 nm becomes the same as or greater than that on the outer peripheral portion, resulting in the spot form on level BB or level CC.

When antireflection coating 51B with the layer structure wherein the wavelength $\lambda 1$ is greater than 458 nm is provided on lens surface S3, transmittance for light with wavelength 390-420 nm becomes inferior, resulting in transmission evaluation on level CC. Further, the transmittance of the outer peripheral portion on lens surface S3 grows greater sharply for light with wavelength 390-420 nm, compared with transmittance on the central portion, which generates noise on the periphery of a spot, and makes evaluation of spot form to be on level CC.

It is understood that an application of the layer structure of the antireflection coating 51B arranged in the lens surface S4 wherein the wavelength $\lambda 1$ is in a range of 360-458 nm is preferable. It is further understood that an application of the layer structure is in a range of 387-430 nm is preferable for obtaining transmittance on level AA and a spot form on level AA. Incidentally, when the wavelength $\lambda 1$ is in a range of 360-458 nm, wavelength $\lambda 1'$ is in a range of 306-384 nm and $\lambda 2$ is $\lambda 1 \times 2.3$ or more, and when the wavelength $\lambda 1$ is in a range of 387-430 nm, wavelength 1' is in a range of 328-361 nm and $\lambda 2$ is $\lambda 1 \times 2.58$ or more.

The foregoing shows that it is preferable to apply No. 4'-No. 11' shown in Table 5, as a layer structure of antireflection coating 51B provided on lens surface S3, and it is more preferable to apply No. 7'-No. 10'.

Incidentally, from Table 9, it is also understood that evaluation of transmittance and evaluation of a spot form are not lower than level BB when the wavelength λ1 is in a range of 387-430 nm and evaluation of transmittance and evaluation of a spot form are on level AA, with respect to antireflection coating 51B provided on lens surface S4.

Further, this embodiment also realize practically good transmittance and spot forms in a optical pickup device which conducts information recording and/or reproducing using AOD, DVD and CD naturally.

(Evaluation of Lens)

Objective lenses 5B were prepared (Examples 6 and 7 and Comparative Examples 6-8) by forming, through a vacuum deposition method, antireflection coatings 51B each having a layer structure (numbers of the layer structure shown on each column correspond to Table 1 and 5) shown in the following Table 10 on lens surfaces S3 and S4 of lens main body 501 that is made to be in a lens form through processing.

In the objective lens with high NA in Example 7, when parallel rays of light having respectively wavelengths 405 nm, 650 nm and 780 nm enter the lens, transmittance for the light with wavelength 405 nm was 89.8%, transmittance for the light with wavelength 650 nm was 95.8% and transmittance for the light with wavelength 780 nm was 95.0%, and the transmittance evaluation was on level AA as shown in Table 9. A beam spot form was excellent and the evaluation was on level BB for light with each wavelength.

When the spectral reflectance on lens surface S3 was measured, the wavelength λ1 was 458 nm, the wavelength λ2 was 1076 (=2.35×λ1) nm, the wavelength λ1' was 384 nm and the wavelength λ2' was 993 (=2.58×λ1') nm.

Incidentally, when the spectral reflectance on lens surface S4 was measured, the wavelength λ1 was 373 nm and the wavelength λ2 was 962 (=2.57×λ1) nm.

The foregoing shows that the Examples 6 and 7 can provide an objective lens having a high numerical aperture and an excellent light-converging function. It is also understood that a large capacity of information recording can be realized by using objective lenses in Examples 6 and 7 in optical pickup device 1B.

TABLE 10

| | | Example 6 | Example 7 | Comparative Example 6 | Comparative Example 7 | Comparative Example 8 |
|---|---|---|---|---|---|---|
| | Laser beam wavelength (nm) | 405 650 780 | 407 660 785 | 405 650 780 | 405 650 780 | 405 650 780 |
| S3 surface | Interfacial angle θ | 0 to 65° | 0 to 65° | 0 to 65° | 0 to 65° | 0 to 65° |
| | Effective diameter | 3.5 nmφ | 3.5 nmφ | 3.5 nmφ | 3.5 nmφ | 3.5 nmφ |
| | Antireflection coating | No. 8' | No. 11' | No. 2' | No. 13' | No. 12' |
| S4 surface | Interfacial angle θ | 0 to 12° | 0 to 12° | 0 to 12° | 0 to 12° | 0 to 12° |
| | Antireflection coating | No. 7' | No. 5' | No. 7' | No. 7' | No. 11' |

In the objective lens with high NA in Example 6, when parallel rays of light having wavelength 405 nm, 650 nm and 780 nm enter the lens, the transmittance for the light with wavelength 40.5 nm was 90.9%, the transmittance for the light with wavelength 650 nm was 95.0% and the transmittance for the light with wavelength 780 nm was 94.4,% and evaluation of transmittance was on level AA as shown in Table 9. Further, a beam spot form was extremely excellent for light of each wavelength and evaluation was on level AA.

Figure 16:
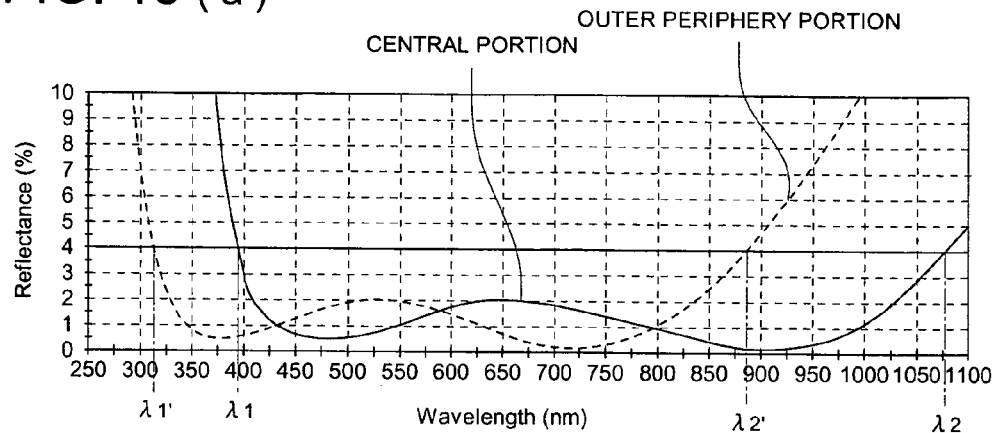
FIG. 16($a$) is a diagram showing a spectral reflection curve on the central portion of the objective lens in Example 6, and FIG. 16($b$) and FIG. 16($c$) are diagrams showing respectively reflectance distribution and transmittance distribution on lens surface S1.
Figure 16:
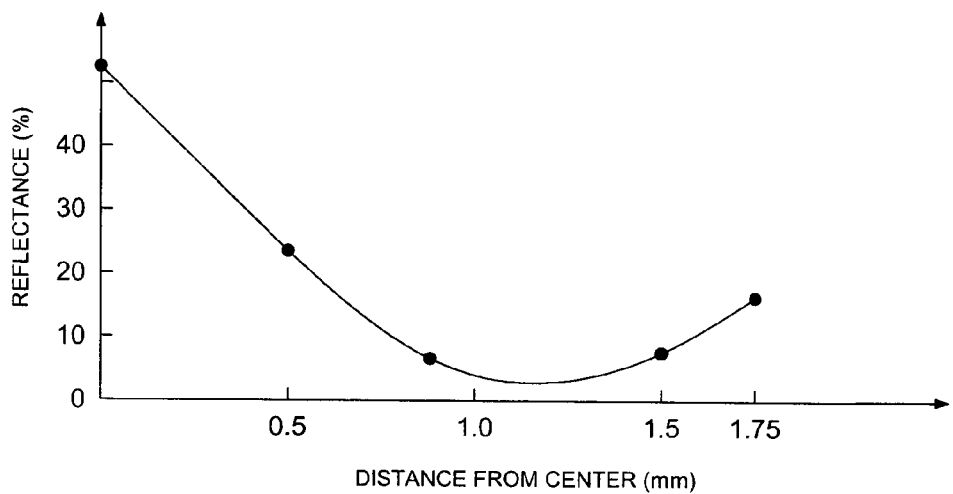
Figure 16:
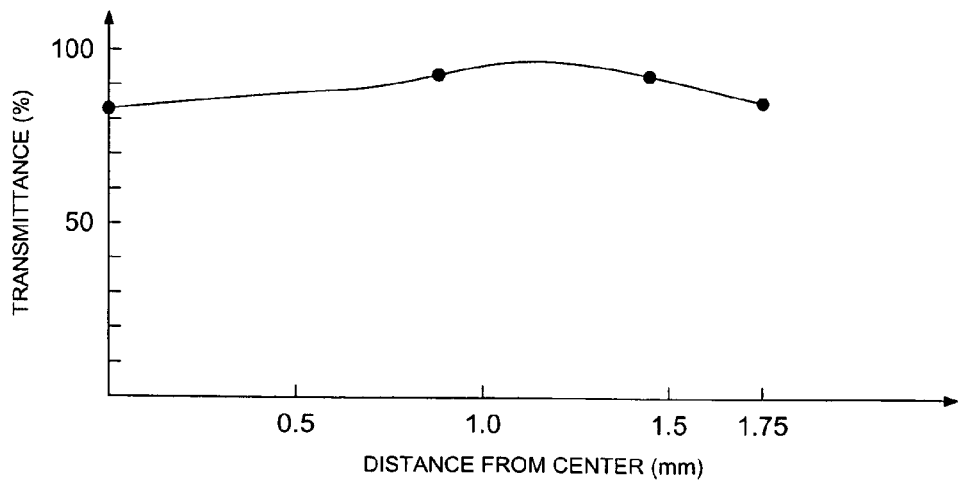

When the spectral reflectance at the central portion on lens surface S3 was measured in this case, it proved to be one shown in FIG. 16(a). As is shown in this diagram, the wavelength λ1 was 420 nm, the wavelength λ2 was 1085 (=2.58×λ1) nm, the wavelength λ1' was 351 nm and the wavelength λ2' was 890 (=2.53×λ1') nm.

Incidentally, when the spectral reflectance on lens surface S4 was measured, the wavelength λ1 was 400 nm and the wavelength λ2 was 1050 (=2.62×λ1) nm.

Further, reflectance distribution and transmittance distribution on lens surface S3 for light with wavelength 405 nm are shown in FIGS. 16(b) and 16(c). As shown in these figures, an area where the reflectance was minimum and the transmittance was maximum on the lens surface S3 was positioned on the outer peripheral portion of the lens surface S3.

On the other hand, in the objective lens in Comparative Example 6, when parallel rays of light having respectively wavelength 405 nm, wavelength 650 nm and wavelength 780 nm enter the lens, transmittance for the light having a wavelength of 405 nm was 89.9%, transmittance for the light having a wavelength of 650 nm was 92.4% and transmittance for the light having a wavelength of 780 nm was 91.1% and the transmission evaluation was on level CC, as shown in Table 9. Further, evaluation of a beam spot form was on level BB.

Figure 17:
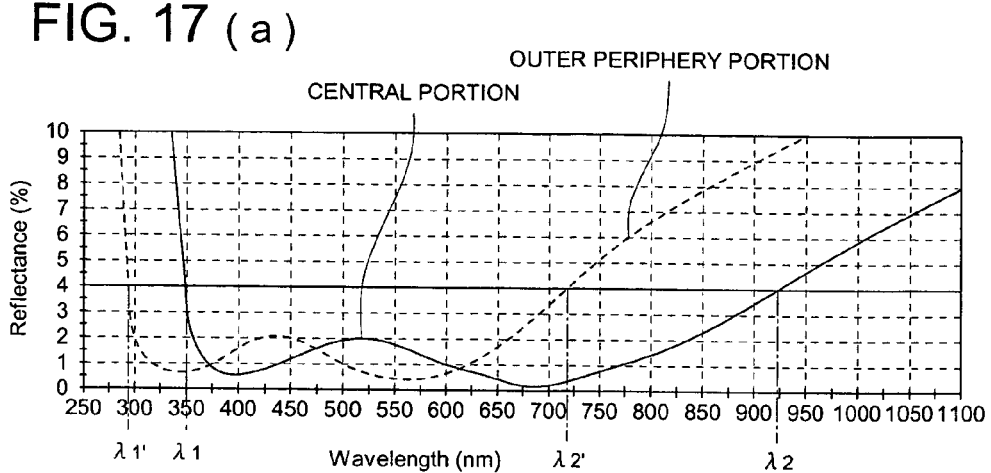
FIG. 17($a$) is a diagram showing a spectral reflection curve on the central portion of the objective lens in Comparative Example 6, and FIG. 17($b$) and FIG. 17($c$) are diagrams showing respectively reflectance distribution and transmittance distribution on lens surface S1.
Figure 17:
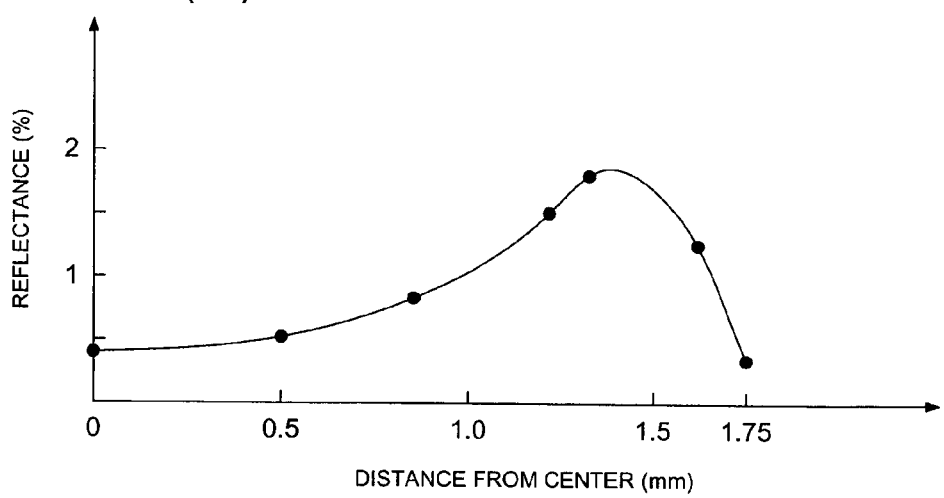
Figure 17:
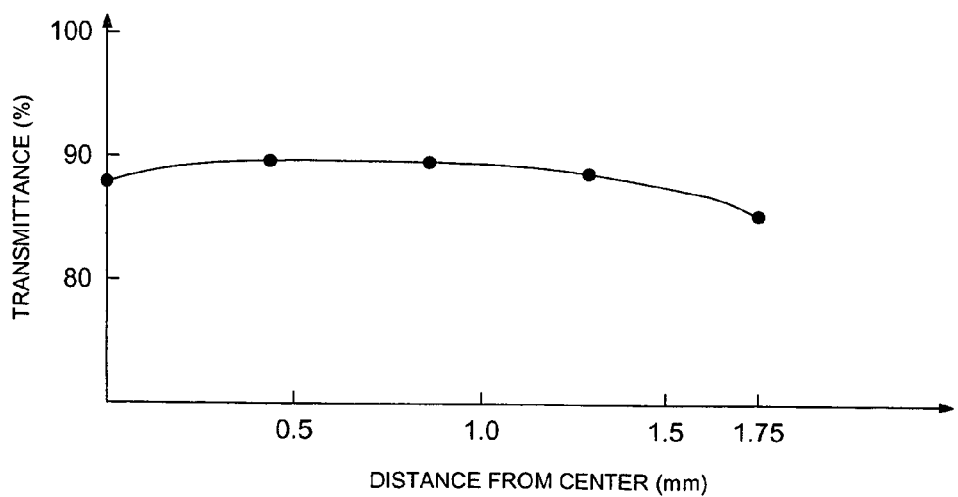

When the spectral reflectance on lens surface S3 was measured in this case, it proved to be one shown in FIG. 17 (a). As is shown in this diagram, the wavelength λ1 was 332 nm, the wavelength λ2 was 844 (=2.54×λ1) nm, the wavelength λ1' was 280 nm and the wavelength λ2' was 690 (=2.46×λ1') nm.

Further, reflectance distribution and transmittance distribution on lens surface S3 for light with wavelength 405 nm are shown in FIGS. 17(b) and 17(c). As shown in these figures, an area where the reflectance was minimum and the transmittance was maximum on the lens surface S3 was positioned at the center of the lens surface S3.

Further, in the objective lens in Comparative Example 7, when parallel rays of light having respectively wavelength 405 nm, wavelength 650 nm and wavelength 780 nm enter the lens, transmittance for the light having a wavelength of 405 nm was 87.8%, transmittance for the light having a wavelength of 650 nm was 96.2% and transmittance for the light having a wavelength of 780 nm was 96.3% and the transmission evaluation was on level CC, as shown in Table 9. Further, evaluation of a beam spot form was on level CC.

Figure 18:
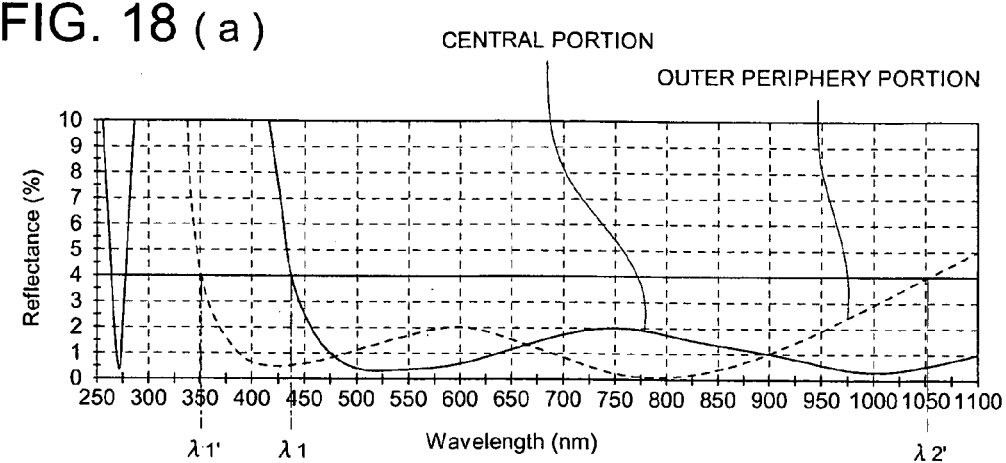
FIG. 18($a$) is a diagram showing a spectral reflection curve on the central portion of the objective lens in Comparative Example 7, and FIG. 18($b$) and FIG. 18($c$) are diagrams showing respectively reflectance distribution and transmittance distribution on lens surface S1.
Figure 18:
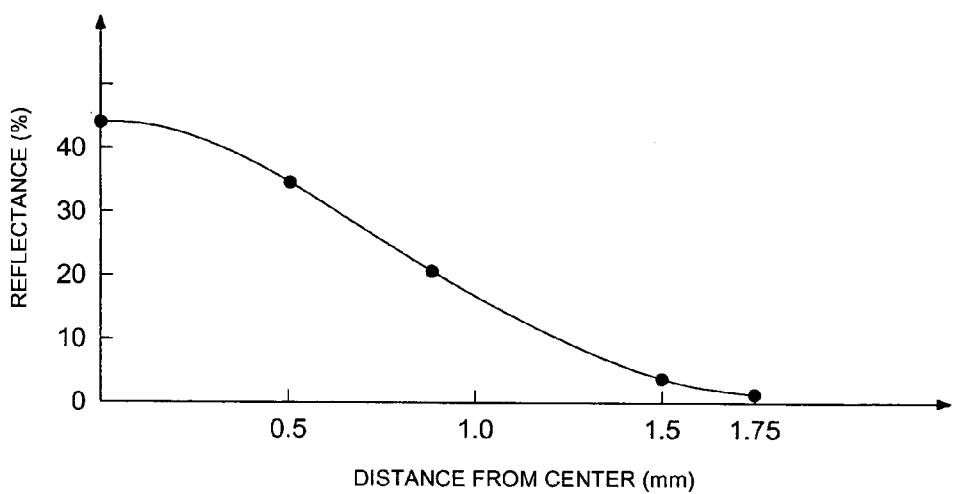
Figure 18:
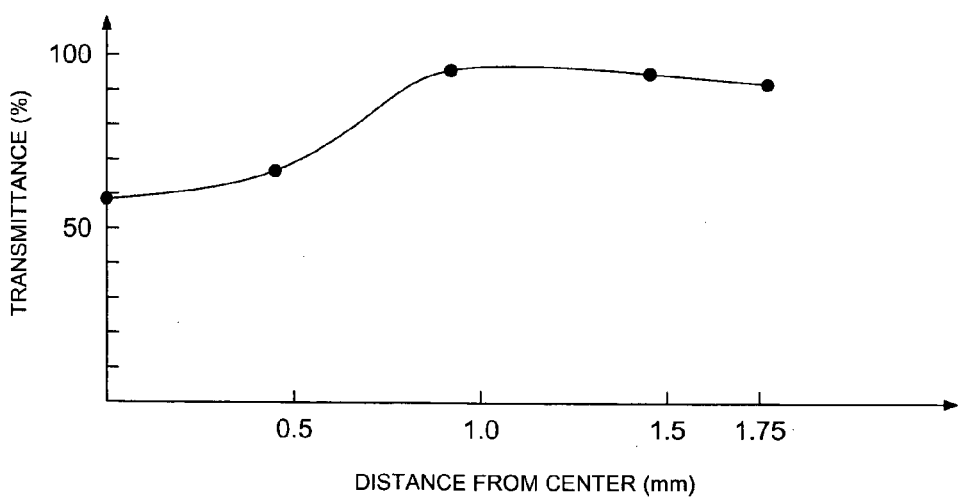

When the spectral reflectance on lens surface S3 was measured in this case, it proved to be one shown in FIG. 18(a). As is shown in this diagram, the wavelength λ1 was 483 nm, the wavelength λ2 was 1288 (=2.67×λ1) nm, the wavelength λ1' was 407 nm and the wavelength λ2' was 1063 (=2.61×λ1') nm.

Further, reflectance distribution and transmittance distribution on lens surface S3 for light with wavelength 405 nm are shown in FIGS. 18(b) and 18(c). As shown in these figures, an area where the reflectance was minimum and the transmittance was maximum on the lens surface S3 was at the position close to the outermost circumference of the lens surface S3.

Further, in the objective lens in Comparative Example 8, when parallel rays of light having respectively wavelength 405 nm, wavelength 650 nm and wavelength 780 nm enter the lens, transmittance for the light having a wavelength of 405 nm was 87.9%, transmittance for the light having a wavelength of 650 nm was 95.6% and transmittance for the light having a wavelength of 780 nm was 95.6% and the transmission evaluation was on level CC. Further, evaluation of a beam spot form was on level BB.

When the spectral reflectance on lens surface S1 was measured in this case, the wavelength λ1 was 468 nm and the wavelength λ2 was 1244 (=2.66×λ1) nm.

The foregoing shows that lenses in the Comparative Examples 6-8 are not suitable to be used as objective lens 5B for optical pickup device 1B that employs rays of light having respectively wavelength 405 nm, wavelength 650 and wavelength 780 nm, and that it is difficult to realize large capacity of recording on an optical recording medium with lenses in Comparative Examples 6-8.

4. Lens in Third Embodiment (2)

(Evaluation of Transmittance of Lens and Spot Forms)

As objective lens 5B in the aforesaid Third Embodiment, there were formed ones wherein antireflection coatings 51B of No. 3", No. 2" and No. 2" shown in Table 8 are provided respectively on lens surfaces S1 and S2 of lens main body 500 and on lens surface S4 of lens main body 501, and antireflection coatings 51B having respectively layer structures shown in FIG. 27 are provided respectively on lens surfaces S3 of lens main body 501.

Evaluation of transmittances of objective lenses 5B formed in the aforesaid manner for rays of light having respectively wavelengths 390-420 and evaluation of a beam spot form were conducted.

As a result, in the case of the wavelength of a laser beam used for optical pickup device 1 that is within a range of 390-420 nm, when the layer structure wherein the wavelength λ1 is within a range of 350-458 nm is applied as a layer structure or antireflection coating 51B to be provided on lens surface S3, the transmittance turned out to be 95% or more, which was preferable. Further, when the layer structure wherein the wavelength λ1 is within a range of 375-440 nm was applied, the transmittance turned out to be 96% or more, which was more preferable. In these cases, the spot form was also excellent.

Incidentally, when wavelength λ1 was in a range of 350-458 nm, the wavelength λ1' was in a range of 290-375 nm, and when wavelength λ1 was in a range of 375-440 nm, the wavelength λ1' was in a range of 318-360 nm. In these cases, λ2 was 2.30×λ1 or more.

The foregoing shows that it is preferable to apply No. 1"-No. 7" shown in Table 8, as a layer structure of antireflection coating 51B provided on lens surface S3, and it is more preferable to apply No. 4"-No. 6".

(Evaluation of Lens)

Objective lenses 5B were prepared (Example 8, Comparative Example 9) by forming, through a vacuum deposition method, antireflection coatings 51B each having a layer structure (numbers of the layer structure shown on each column correspond to Table 5 and 8) shown in the following Table 5 on lens surfaces S3 and S4 of lens main body 501 that is made to be in a lens form through processing. Incidentally, in the objective lens 5 in Example 8, antireflection coating 51B in No. 3" in FIG. 27 was provided on lens surface S1 of lens main body 500, and antireflection coating 51B in No. 2" was provided on lens surface S2 of lens main body 500, which, however, is not shown in the table. In the objective lens in Comparative Example 9, antireflection coating 51B in No. 3" in FIG. 27 was provided on lens surface S1 of lens main body 500, and antireflection coating 51B in No. 2" was provided on lens surface S2.

TABLE 11

|  |  | Example 8 | Comparative Example 9 |
|---|---|---|---|
| Laser beam wavelength (nm) |  | 405 | 405 |
| S3 surface | Surface angle θ, Effective diameter | 0 to 66° | 0 to 66° |
|  | Antireflection coating | No. 5" | No. 2' |
| S4 surface | Surface angle θ, Effective diameter | 0 to 3° | 0 to 3° |
|  | Antireflection coating | No. 2" | No. 3" |

In the objective lens with high NA in Example 8, when a parallel light having wavelength 405 nm enters the lens, transmittance for the light was 96.1%, and the transmittance evaluation was on level A. A beam spot form was also extremely excellent in practical use and the evaluation was on level AA.

When the spectral reflectance at the center portion on lens surface S3 was measured, the wavelength λ1 was 400 nm, the wavelength λ2 was 820 (=2.62×λ1) nm, the wavelength λ1' was 340 nm and the wavelength λ2' was 860 (=2.56×λ1') nm.

From the foregoing, it is understood that an objective lens having a high numerical aperture and an excellent light-converging function can be provided by Example 8. It is also understood that a large capacity of information recording can be realized by using the lens of Example 8 as an objective lens in optical pickup device 1B.

In the objective lens with high NA in Comparative Example 9, when a parallel light having wavelength 405 nm enters the lens, transmittance for the light was 94.5%, and the transmittance evaluation was on level CC. Evaluation of a beam spot form was also on level CC.

When the spectral reflectance at the center portion on lens surface S3 was measured, the wavelength λ1 was 332 nm, the wavelength λ2 was 844 (=2.80×λ1) nm, the wavelength λ1' was 280 nm and the wavelength λ2' was 690 (=2.46×λ1') nm.

Therefore, it is understood that the lens of Comparative Example 9 is unsuitable to be used as objective lens 5B of optical pickup device 1B that employs light with wavelength 405 nm, and it is difficult for the lens of Comparative Example 9 to realize a large capacity of recording of optical recording media.

Results of the Examples stated above are shown in Table 6.

TABLE 12

|  | Excellent conditions in practical use | Extremely excellent conditions in practical use |
|---|---|---|
| Lens in First Embodiment, Using one wavelength in 390-420 nm (single lens) | λ1: 348 to 460 nm<br>λ2/λ1: 1.9 nm or more<br>λ1': 289 to 382 nm | λ1: 375 to 441 nm<br>λ2/λ1: 1.9 nm or more<br>λ1': 312 to 366 nm |
| Lens (2) in Third Embodiment, Using one wavelength in 390-420 nm (double-lens) | λ1: 350 to 458 nm<br>λ2/λ1: 2.04 nm or more<br>λ1': 290 to 375 nm | λ1: 375 to 440 nm<br>λ2/λ1: 2.04 nm or more<br>λ1': 318 to 360 nm |
| Lens in Second Embodiment, Using two wavelengths in 390-420 nm and 630-680 nm (single lens) | λ1: 350 to 458 nm<br>λ2/λ1: 2.30 nm or more<br>λ1': 294 to 384 nm | λ1: 373 to 442 nm<br>λ2/λ1: 2.35 nm or more<br>λ1': 317 to 373 nm |
| Lens (1) in Third Embodiment, Using three wavelengths in 390-420 nm 630-680 nm and 770-800 nm (single lens) | λ1: 360 to 468 nm<br>λ2/λ1: 2.30 nm or more<br>λ1': 306 to 384 nm | λ1: 400 to 442 nm<br>λ2/λ1: 2.58 nm or more<br>λ1': 339 to 373 nm |
| Conditions for using as any of lenses (1) an (2) in First-Third Embodiments | λ1: 348 to 460 nm<br>λ2/λ1: 1.80 nm or more<br>λ1': 289 to 384 nm | |

As is shown in the table, for obtaining the transmittance and the spot form which are excellent in practical use as any objective lens among those from the lens in First Embodiment to the lens (2) in the Third Embodiment, it is necessary that the wavelength λ1 is in a range of 348-460 nm, the wavelength λ2 is 1.9×λ1 or more and the wavelength λ1' is in a range of 289-384 nm.

(Effect of the Invention)

In the structure described in Item 1, the balance between an amount of transmitted light on the outer peripheral portion and an amount of transmitted light on the central portion is improved, compared with that in the past. Therefore, a beam spot of light with wavelength 390-420 nm can be made smaller in terms of a diameter and an amount of transmitted light can be increased.

In the structure described in Item 2, the same effect as in the structure described in Item 1 can naturally be obtained, and a beam spot of light with wavelength 390-420 nm can surely be made smaller in terms of a diameter and an amount of transmitted light can surely be increased.

In the structure described in Item 3, the same effect as in the structure described in Item 1 or Item 2 can naturally be obtained, and an amount of transmitted light having wavelength 390-420 nm can surely be increased.

In the structures described in Items 4, the same effect as in the structure described in any one of Item 1-Item 3 can be obtained.

In the structure described in Item 5, the same effect as in the structure described in any one of Item 1-Item 4 can naturally be obtained, and the balance between an amount of transmitted light on the outer peripheral portion and an amount of transmitted light on the central portion is further improved, compared with that in the past.

In the structure described in Item 6, a beam spot of light with wavelength 390-420 nm can surely be made smaller in terms of a diameter and an amount of transmitted light can surely be increased.

In the structure described in Item 7, the same effect as in the structure described in Item 6 can naturally be obtained, a beam spot of light with wavelength 390-420 nm can surely be made smaller in terms of a diameter and an amount of transmitted light can surely be increased.

In the structure described in Item 8, the same effect as in the structure described in Item 6 or Item 7 can naturally be obtained, and an amount of transmitted light having wavelength 390-420 nm can surely be increased.

In the structure described in Item 9, it is possible to obtain the same effect as that of the structure described in either one of Item 6-Item 8.

In the structure described in Item 10, the same effect as in the structure described in any one of Items 6-9 can naturally be obtained, and the balance between an amount of transmitted light on the outer peripheral portion and an amount of transmitted light on the central portion is improved, compared with that in the past.

In the structure described in Item 11, the same effect as in the structure described in Item 1 can naturally be obtained, and a beam spot of light with wavelength 390-420 nm can surely be made smaller in terms of a diameter and an amount of transmitted light can surely be increased.

In the structure described in Item 12, it is possible to obtain the same effect as that of the structure described in Item 11.

In the structure described in Item 13, it is possible to obtain the same effect as that of the structure described in either one of Item 11-Item 12.

In the structure described in Item 14, it is possible to obtain the same effect as that of the structure described in either one of Item 11-Item 13.

In the structure described in Item 15, it is possible to obtain the same effect as that of the structure described in either one of Item 11-Item 14.

In the structure described in Item 16, the same effect as in the structure described in Item 1 can naturally be obtained, and recording and reproducing of information can be conducted by the use of a high density optical disc and DVD. Furthermore, it is possible to increase surely an amount of transmitted light with wavelength 390-420 nm, and to prevent reflection for light with plural wavelengths including those 630-680 nm.

In the structure described in Item 17, the same effect as in the structure described in Item 16 can naturally be obtained, and a beam spot of light with wavelength 390-420 nm and wavelength 630-680 nm can surely be made smaller in terms of a diameter and an amount of transmitted light can surely be increased.

In the structure described in Item 18, a beam spot of light with wavelength 390-420 nm and wavelength 630-680 nm can be made smaller in terms of a diameter and an amount of transmitted light can be increased.

In the structure described in Item 19, the same effect as in the structure described in Item 16 or Item 18 can naturally be obtained, and an amount of transmitted light having wavelength 390-420 nm and wavelength 630-680 nm can surely be increased.

In the structure described in Item 20, the same effect as in the structure described in any one of Item 16-Item 19 can naturally be obtained, and the balance between an amount of transmitted light on the outer peripheral portion and an amount of transmitted light on the central portion is further improved, compared with that in the past.

In the structure described in Item 21, it is possible to obtain the same effect as that of the structure described in any one of Item 16-Item 20.

In the structure described in Item 22, the same effect as in the structure described in any one of Item 16-Item 21 can naturally be obtained, an amount of transmitted light with wavelength 390-420 nm can surely be increased and reflection can be prevented for rays of light for plural wavelengths including wavelength 630-680 nm.

In the structure described in Item 23, it is possible to obtain the same effect as that of the structure described in Item 22.

In the structure described in Item 24, a beam spot of light with wavelength 390-420 nm and wavelength 630-680 nm can be made smaller in terms of a diameter and an amount of transmitted light can be increased.

In the structure described in Item 25, it is possible to obtain the same effect as that of the structure described in any one of Item 21-Item 24.

In the structure described in Item 26, it is possible to obtain the same effect as that of the structure described in any one of Item 21-Item 25.

In the structure described in Item 28, the same effect as in the structure described in Item 27 can naturally be obtained, and recording and reproducing of information can be conducted by using also CD. Furthermore, it is possible to increase surely an amount of transmitted light with wavelength 390-420 nm, and to prevent reflection for light with plural wavelengths including those 630-680 nm.

In the structure described in Item 29, the same effect as in the structure described in Item 27 can naturally be obtained, and a beam spot of light with wavelength 390-420 nm can surely be made smaller in terms of a diameter and an amount of transmitted light can surely be increased.

In the structure described in Item 30, the same effect as in the structure described in any one of Item 27-Item 29 can naturally be obtained, an amount of transmitted light with wavelength 390-420 nm can surely be increased and reflection can be prevented for rays of light for plural wavelengths including wavelength 630-680 nm.

The structure described in Item 31 makes it possible to obtain the same effect as that of the structure described in either one of Item 27-Item 30.

In the structure described in Item 32, it is possible to obtain the same effect as that of the structure described in either one of Item 27-Item 31.

In the structure described in Item 33, the same effect as in the structure described in Item 27 can naturally be obtained, an amount of transmitted light with wavelength 390-420 nm can surely be increased and reflection can be prevented for rays of light for plural wavelengths including wavelength 630-680 nm and wavelength 770-800 nm.

In the structure described in item 34, it is possible to obtain the same effect as that of the structure described in item 33.

In the structure described in item 35, it is possible to obtain the same effect as that of the structure described in Item 33 or Item 34.

In the structure described in item 36, it is possible to obtain the same effect as that of the structure described in either one of item 33-Item 35.

In the structure described in item 37, it is possible to obtain the same effect as that of the structure described in either one of item 1-Item 36.

What is claimed is:

1. An optical lens to be arranged in an optical information recording and/or reproducing apparatus for conducting at least one of recording information on an optical information recording medium and reproducing information recorded on the optical information recording medium and to converge a light flux emitted by a first laser light source with wavelength of 390 nm-420 nm onto the optical information recording medium, the optical lens comprising:
    at least one lens main body;
    an antireflective film arranged on a first lens surface which has the largest surface angle θ on an outer peripheral portion in an effective radius of lens surfaces on the lens main body;
    wherein for a light entering perpendicularly to a central portion of the first lens surface whose central portion has a surface angle θ of 0 degree, a spectral reflectance of the antireflective film has one or more regions in which the spectral reflectance is continuously 4% or below and the wavelength includes at least a part of a wavelength region of 300 to 1000 nm,
    the broadest wavelength region of the one or more wavelength regions extends from a wavelength λ1 to a wavelength λ2 and
    the wavelength λ1 is in a range of 348-460 nm.

2. The optical lens of claim 1, wherein the wavelength λ1 is in a range of 375-441 nm.

3. The optical lens of claim 1, wherein the wavelength λ2 satisfies 1.9×λ1 or more.

4. The optical lens of claim 1,
    wherein when the antireflective film includes a first layer, . . . and a n-th layer in the order from the far side of the first lens where n is a natural number of 2 or more,
    the first layer is made of a lower refractive index material and has a layer thickness of 81.2-113 nm;
    the second layer is made of a higher refractive index material and has a layer thickness of 108.7-153 nm;
    the third layer is made of a middle refractive index material and has a layer thickness of 108.7-153 nm;
    the fourth layer is made of a lower refractive index material and has a layer thickness of 21.6-30 nm; and
    the fifth layer is made of a middle refractive index material and has a layer thickness of 71.0-99 nm.

5. The optical lens of claim 1,
    wherein for a light entering perpendicularly to an outer peripheral portion of the first lens surface whose outer peripheral portion has a surface angle θ of 45 degrees, a spectral reflectance of the antireflective film has one or more regions which satisfies continuously 4% or below,
    the broadest wavelength region of the regions extends from a wavelength λ1' to a wavelength λ2' and
    the wavelength λ1' is in a range of 289-382 nm.

6. The optical lens of claim 1 comprising:
    at least two lens main bodies;
    an antireflective film arranged on a first lens surface which has the largest surface angle θ on an outer peripheral portion in an effective radius of lens surfaces on the lens main body;
    wherein for a light entering perpendicularly to a central portion of the first lens surface whose central portion has a surface angle θ of 0 degree, a spectral reflectance of the antireflective film has one or more regions in which the spectral reflectance is continuously 4% or below and the wavelength includes at least a part of a wavelength range of 300-1000 nm,
    the broadest wavelength region of the one or more wavelength regions extends from a wavelength λ1 to a wavelength λ2 and
    the wavelength λ1 is in a range of 350-458 nm.

7. The optical lens of claim 6, wherein the wavelength λ1 is in a range of 375-440 nm.

8. The optical lens of claim 6, wherein the wavelength λ2 satisfies 2.04×λ1 or more.

9. The optical lens of claim 6,
wherein when the antireflective film includes a first layer, . . . and a n-th layer in the order from the far side of the first lens where n is a natural number of 2 or more,
the first layer is made of a lower refractive index material and has a layer thickness of 91.6-122.2 nm;
the second layer is made of a higher refractive index material and has a layer thickness of 32.0-43.0 nm;
the third layer is made of a lower refractive index material and has a layer thickness of 37.5-50.0 nm;
the fourth layer is made of a higher refractive index material and has a layer thickness of 18.9-25.4 nm; and
the fifth layer is made of a lower refractive index material and has a layer thickness of 16.6-22.2 nm.

10. The optical lens of claim 6,
wherein for a light entering perpendicularly to an outer peripheral portion of the first lens surface whose outer peripheral portion has a surface angle θ of 45 degrees, a spectral reflectance of the antireflective film has one or more regions which satisfies continuously 4% or below,
the broadest wavelength region of the regions extends from a wavelength λ1' to a wavelength λ2' and
the wavelength λ1' is in a range of 290-375 nm.

11. The optical lens of claim 1 comprising:
an antireflective film arranged on a second lens surface which lies on the opposite side of the first lens surface;
wherein for a light entering perpendicularly to a central portion of the second lens surface whose central portion has a surface angle θ of 0 degree, a spectral reflectance of the antireflective film has one or more regions in which the spectral reflectance is continuously 4% or below and the wavelength includes at least a part of a wavelength range of 300-1000 nm,
the broadest wavelength region of the one or more wavelength regions extends from a wavelength λ1 to a wavelength λ2 and
the wavelength λ1 is in a range of 320-400 nm.

12. The optical lens of claim 11, wherein the wavelength λ1 is in a range of 335-400 nm.

13. The optical lens of claim 11, wherein the wavelength λ2 satisfies 1.9×λ1 or more.

14. The optical lens of claim 11,
wherein when the antireflective film includes a first layer, . . . and a n-th layer in the order from the far side of the second lens where n is a natural number of 2 or more,
the first layer is made of a lower refractive index material and has a layer thickness of 74.0-95.6 nm;
the second layer is made of a higher refractive index material and has a layer thickness of 95.9-129.8 nm;
the third layer is made of a middle refractive index material and has a layer thickness of 87.8-115.1 nm;
the fourth layer is made of a lower refractive index material and has a layer thickness of 19.7-25.4 nm; and
the fifth layer is made of a middle refractive index material and has a layer thickness of 63.9-83.7 nm.

15. The optical lens of claim 11,
wherein when the antireflective film includes a first layer, . . . and a n-th layer in the order from the far side of the second lens where n is a natural number of 2 or more,
the first layer is made of a lower refractive index material and has a layer thickness of 91.6-122.2 nm;
the second layer is made of a higher refractive index material and has a layer thickness of 32.0-43.0 nm;
the third layer is made of a lower refractive index material and has a layer thickness of 37.5-50.0 nm;
the fourth layer is made of a higher refractive index material and has a layer thickness of 18.9-25.4 nm; and
the fifth layer is made of a lower refractive index material and has a layer thickness of 16.6-22.2 nm.

16. The optical lens of claim 1, which converges a light emitted by a second laser source having a wavelength of 630-680 nm onto a optical information recording media, wherein the wavelength λ1 is in a range of 350-458 nm.

17. The optical lens of claim 16, wherein the wavelength λ1 is in a range of 373-458 nm.

18. The optical lens of claim 17, which further converges a light emitted by a third laser source having a wavelength of 770-800 nm onto a optical information recording media.

19. The optical lens of claim 16, wherein the wavelength λ2 satisfies 2.3×λ1 or more.

20. The optical lens of claim 16,
wherein for a light entering perpendicularly to an outer peripheral portion of the first lens surface whose outer peripheral portion has a surface angle θ of 45 degrees, a spectral reflectance of the antireflective film has one or more regions which satisfies continuously 4% or below,
the broadest wavelength region of the regions extends from a wavelength λ1' to a wavelength λ2' and
the wavelength λ1' is in a range of 294-384 nm.

21. The optical lens of claim 16,
wherein when the antireflective film includes a first layer, . . . and a n-th layer in the order from the far side of the first lens where n is a natural number of 2 or more,
the first layer is made of a lower refractive index material and has a layer thickness of 93.3-126.5 nm;
the second layer is made of a higher refractive index material and has a layer thickness of 35.6-49.2 nm;
the third layer is made of a lower refractive index material and has a layer thickness of 18.5-25.1 nm;
the fourth layer is made of a higher refractive index material and has a layer thickness of 54.0-74.7 nm;
the fifth layer is made of a lower refractive index material and has a layer thickness of 29.0-39.4 nm;
the sixth layer is made of a higher refractive index material and has a layer thickness of 16.5-22.8 nm; and
the seventh layer is made of a lower refractive index material and has a layer thickness of 18.0-24.4 nm.

22. The optical lens of claim 16 comprising:
an antireflective film arranged on a second lens surface which lies on the opposite side of the first lens surface;
wherein for a light entering perpendicularly to a central portion of the second lens surface whose central portion has a surface angle θ of 0 degree, a spectral reflectance of the antireflective film has one or more regions in which the spectral reflectance is continuously 4% or below and the wavelength includes at least a part of a wavelength range of 300-1000 nm,
the broadest wavelength region of the one or more wavelength regions extends from a wavelength λ1 to a wavelength λ2 and
the wavelength λ1 is in a range of 350-430 nm.

23. The optical lens of claim 22, wherein the wavelength %1 is in a range of 360-400 nm.

24. The optical lens of claim 23, which further converges a light emitted by a third laser source having a wavelength of 770-800 nm onto a optical information recording media.

25. The optical lens of claim 22, wherein the wavelength λ2 satisfies 2.3×λ1 or more.

26. The optical lens of claim 22,
wherein when the antireflective film includes a first layer, . . . and a n-th layer in the order from the far side of the second lens where n is a natural number of 2 or more, the first layer is made of a lower refractive index material and has a layer thickness of 93.3-118 nm;
the second layer is made of a higher refractive index material and has a layer thickness of 35.6-45.9 nm;
the third layer is made of a lower refractive index material and has a layer thickness of 18.5-23.4 nm;
the fourth layer is made of a higher refractive index material and has a layer thickness of 54.0-69.6 nm;
the fifth layer is made of a lower refractive index material and has a layer thickness of 29.0-36.8 nm;
the sixth layer is made of a higher refractive index material and has a layer thickness of 16.5-21.2 nm; and
the seventh layer is made of a lower refractive index material and has a layer thickness of 18.0-22.8 nm.

27. The optical lens of claim 16, which comprises at least two lens main bodies; and
an antireflective film arranged on a first lens surface which has the largest surface angle θ on an outer peripheral portion in an effective radius of lens surfaces on the lens main body;
wherein for a light entering perpendicularly to a central portion of the first lens surface whose central portion has a surface angle θ of 0 degree, a spectral reflectance of the antireflective film has one or more regions which satisfies continuously 4% or below and which includes at least a part of a wavelength range of 300-1000 nm,
the broadest wavelength region of the regions extends from a wavelength λ1 to a wavelength λ2 and
the wavelength λ1 is in a range of 360-458 nm.

28. The optical lens of claim 27, which converges a light emitted by a third laser source having a wavelength of 770-800 nm onto a optical information recording media.

29. The optical lens of claim 27, wherein the wavelength λ1 is in a range of 400-442 nm.

30. The optical lens of claim 27, wherein the wavelength λ2 satisfies 2.3×λ1 or more.

31. The optical lens of claim 27,
wherein for a light entering perpendicularly to an outer peripheral portion of the first lens surface whose outer peripheral portion has a surface angle θ of 45 degrees, a spectral reflectance of the antireflective film has one or more regions which satisfies continuously 4% or below,
the broadest wavelength region of the regions extends from a wavelength λ1' to a wavelength λ2' and
the wavelength λ1' is in a range of 306-384 nm.

32. The optical lens of claim 27,
wherein when the antireflective film includes a first layer, . . . and a n-th layer in the order from the far side of the first lens where n is a natural number of 2 or more,
wherein when the antireflective film includes a first layer, . . . and a n-th layer in the order from the far side of the second lens where n is a natural number of 2 or more,
the first layer is made of a lower refractive index material and has a layer thickness of 97.5-126.5 nm;
the second layer is made of a higher refractive index material and has a layer thickness of 37.3-49.2 nm;
the third layer is made of a lower refractive index material and has a layer thickness of 19.3-25.1 nm;
the fourth layer is made of a higher refractive index material and has a layer thickness of 56.6-74.7 nm;
the fifth layer is made of a lower refractive index material and has a layer thickness of 30.3-39.4 nm;
the sixth layer is made of a higher refractive index material and has a layer thickness of 17.3-22.8 nm; and
the seventh layer is made of a lower refractive index material and has a layer thickness of 18.8-24.4 nm.

33. The optical lens of claim 27 comprising:
an antireflective film arranged on a second lens surface which lies on the opposite side of the first surface;
wherein for a light entering perpendicularly to a central portion of the second lens surface whose central portion has a surface angle θ of 0 degree, a spectral reflectance of the antireflective film has one or more regions in which the spectral is continuously 4% or below and the wavelength includes at least a part of a wavelength range of 300-1000 nm,
the broadest wavelength region of the one or more wavelength regions extends from a wavelength λ1 to a wavelength λ2 and
the wavelength λ1 is in a range of 360-458 nm.

34. The optical lens of claim 33, wherein the wavelength λ1 is in a range of 387-430 nm.

35. The optical lens of claim 33, wherein the wavelength %2 satisfies 2.3×λ1 or more.

36. The optical lens of claim 33,
wherein when the antireflective film includes a first layer, . . . and a n-th layer in the order from the far side of the second lens where n is a natural number of 2 or more,
wherein when the antireflective film includes a first layer, . . . and a n-th layer in the order from the far side of the second lens where n is a natural number of 2 or more,
the first layer is made of a lower refractive index material and has a layer thickness of 97.5-126.5 nm;
the second layer is made of a higher refractive index material and has a layer thickness of 37.3-49.2 nm;
the third layer is made of a lower refractive index material and has a layer thickness of 19.3-25.1 nm;
the fourth layer is made of a higher refractive index material and has a layer thickness of 56.6-74.7 nm;
the fifth layer is made of a lower refractive index material and has a layer thickness of 30.3-39.4 nm;
the sixth layer is made of a higher refractive index material and has a layer thickness of 17.3-22.8 nm; and
the seventh layer is made of a lower refractive index material and has a layer thickness of 18.8-24.4 nm.

37. A information recording and/or reproducing apparatus comprising a laser light source and a light converging system including the optical lens of claim 1,
wherein converging a light flux emitted by the laser light source onto the optical information recording media by the optical lens conducts at least one of recording information on the optical information recording medium and reproducing information recorded on the optical information recording medium.

* * * * *

UNITED STATES PATENT AND TRADEMARK OFFICE
CERTIFICATE OF CORRECTION

PATENT NO. : 7,602,679 B2
APPLICATION NO. : 10/885038
DATED : October 13, 2009
INVENTOR(S) : Ohta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1444 days.

Signed and Sealed this

Fourteenth Day of December, 2010

David J. Kappos
*Director of the United States Patent and Trademark Office*